United States Patent
Fujimori et al.

(10) Patent No.: US 9,068,683 B2
(45) Date of Patent: Jun. 30, 2015

(54) MANUFACTURING APPARATUS OF CORE MATERIAL OF VACUUM HEAT INSULATING MATERIAL, MANUFACTURING METHOD OF VACUUM HEAT INSULATING MATERIAL, VACUUM HEAT INSULATING MATERIAL, AND REFRIGERATOR

(75) Inventors: Yosuke Fujimori, Tokyo (JP); Hideaki Nakano, Tokyo (JP); Kyoko Nomura, Tokyo (JP); Hiroshi Nakashima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 385 days.

(21) Appl. No.: 13/501,227

(22) PCT Filed: Feb. 16, 2010

(86) PCT No.: PCT/JP2010/052244
§ 371 (c)(1),
(2), (4) Date: Apr. 10, 2012

(87) PCT Pub. No.: WO2011/045946
PCT Pub. Date: Apr. 21, 2011

(65) Prior Publication Data
US 2012/0207962 A1 Aug. 16, 2012

(30) Foreign Application Priority Data
Oct. 16, 2009 (JP) ................................. 2009-239592

(51) Int. Cl.
*F16L 59/065* (2006.01)
*B65H 54/58* (2006.01)
(Continued)

(52) U.S. Cl.
CPC ............ *F16L 59/065* (2013.01); *Y10T 428/231* (2015.01); *F25D 23/06* (2013.01); *F25D 2201/14* (2013.01); *B65H 54/585* (2013.01); *B65H 54/62* (2013.01)

(58) Field of Classification Search
CPC .. B65H 54/62; B65H 54/585; F25D 2201/14; F25D 23/06; F16L 59/065; Y10T 428/231
USPC ......................................... 156/459, 443, 543
See application file for complete search history.

(56) References Cited

U.S. PATENT DOCUMENTS

| | | | |
|---|---|---|---|
| 1,641,288 | A | 9/1927 | Neidich |
| 3,368,934 | A | 2/1968 | Vosburgh, Sr. |

(Continued)

FOREIGN PATENT DOCUMENTS

| | | |
|---|---|---|
| CN | 101023291 A | 8/2007 |
| CN | 101086315 S | 12/2007 |

(Continued)

OTHER PUBLICATIONS

International Search Report dated Aug. 25, 2009 issued by the Japanese Patent Office in corresponding PCT/JP2009/062102.
(Continued)

*Primary Examiner* — Brent O'Hern
(74) *Attorney, Agent, or Firm* — Buchanan Ingersoll & Rooney PC

(57) ABSTRACT

A manufacturing apparatus of a core material of a highly reliable vacuum heat insulating material having excellent workability, usability, and heat insulating performance is provided. The manufacturing apparatus of a core material of a vacuum heat insulating material related to the present invention includes: a reel for winding up a fiber assembly which has a predetermined width and is wound on a substantially cylindrical original fabric roll which has been cut to have a predetermined width, at a predetermined number of times; cutting means for cutting the fiber assembly which has been wound on the reel; and a forming member for forming the fiber assembly into a flat-plate-shaped core material after removing from the reel the fiber assembly which has been wound up on the reel at the predetermined number of times and been cut.

6 Claims, 24 Drawing Sheets

(51) Int. Cl.
*B65H 54/62* (2006.01)
*F25D 23/06* (2006.01)

(56) References Cited

U.S. PATENT DOCUMENTS

| | | | |
|---|---|---|---|
| 3,537,226 | A | 11/1970 | Le Van et al. |
| 3,755,062 | A | 8/1973 | Schirmer |
| 3,979,245 | A * | 9/1976 | Bondra et al. ............... 156/184 |
| 4,055,268 | A | 10/1977 | Barthel |
| 5,731,248 | A | 3/1998 | Phillips et al. |
| 5,791,551 | A | 8/1998 | Parks et al. |
| 8,211,523 | B2 | 7/2012 | Fujimori et al. |
| 2003/0157284 | A1 | 8/2003 | Tanimoto et al. |
| 2003/0167789 | A1 | 9/2003 | Tanimoto et al. |
| 2003/0209002 | A1 | 11/2003 | Lancaster |
| 2004/0253406 | A1 | 12/2004 | Hayashi et al. |
| 2005/0023731 | A1 | 2/2005 | Kondo et al. |
| 2005/0175809 | A1 | 8/2005 | Hirai et al. |
| 2008/0095970 | A1 | 4/2008 | Takashima et al. |
| 2008/0279603 | A1 | 11/2008 | Chen |

FOREIGN PATENT DOCUMENTS

| | | |
|---|---|---|
| CN | 101363566 A | 2/2009 |
| CN | 100529504 C | 8/2009 |
| GB | 2 451 614 A | 2/2009 |
| JP | 60-091427 U | 6/1985 |
| JP | 62-45136 A | 3/1987 |
| JP | 62-45136 U | 3/1987 |
| JP | 62-141189 U | 9/1987 |
| JP | 62-204093 A | 9/1987 |
| JP | 07-091594 A | 4/1995 |
| JP | 7-103955 B | 11/1995 |
| JP | 08-028776 A | 2/1996 |
| JP | 10-253243 A | 9/1998 |
| JP | 2000-097390 A | 4/2000 |
| JP | 2000-249290 A | 9/2000 |
| JP | 2001-336691 A | 12/2001 |
| JP | 2002-188791 A | 7/2002 |
| JP | 2003-293256 A | 10/2003 |
| JP | 2004-245258 A | 9/2004 |
| JP | 2004-340197 A | 12/2004 |
| JP | 2005-061611 A | 3/2005 |
| JP | 2005-076725 A | 3/2005 |
| JP | 3656028 B2 | 6/2005 |
| JP | 2005-257232 A | 9/2005 |
| JP | 2005-344832 A | 12/2005 |
| JP | 2005-344870 A | 12/2005 |
| JP | 2006-017151 A | 1/2006 |
| JP | 2006-029456 A | 2/2006 |
| JP | 2006-029505 A | 2/2006 |
| JP | 2006-077790 A | 3/2006 |
| JP | 2006-112440 A | 4/2006 |
| JP | 2006-118808 A | 5/2006 |
| JP | 2006-125631 A | 5/2006 |
| JP | 2006-161939 A | 6/2006 |
| JP | 2006-162076 A | 6/2006 |
| JP | 2006-170303 A | 6/2006 |
| JP | 2006-183810 A | 7/2006 |
| JP | 2006-283817 A | 10/2006 |
| JP | 2006-292361 A | 10/2006 |
| JP | 2006-307921 A | 11/2006 |
| JP | 2007-056972 A | 3/2007 |
| JP | 2007-056974 A | 3/2007 |
| JP | 2007-092776 A | 4/2007 |
| JP | 2007-155065 A | 6/2007 |
| JP | 2007-155276 A | 6/2007 |
| JP | 2007-309478 A | 11/2007 |
| JP | 4012903 B2 | 11/2007 |
| JP | 2007-321925 A | 12/2007 |
| JP | 2008-157431 A | 7/2008 |
| JP | 2008-157516 A | 7/2008 |
| JP | 2008-185220 A | 8/2008 |
| JP | 2008-223922 A | 9/2008 |
| JP | 2008-232372 A | 10/2008 |
| JP | 2009-041592 A | 2/2009 |
| JP | 2009-121671 A | 6/2009 |
| JP | 2008-215632 A | 9/2009 |
| JP | 2009-228917 A | 10/2009 |
| WO | 01/11119 A1 | 2/2001 |

OTHER PUBLICATIONS

Office Action issued by the U.S. Patent and Trademark Office in U.S. Appl. No. 13/133,585, mailed Jan. 9, 2014, U.S. Patent and Trademark Office, Alexandria, VA. (8 pages).
The extended European Search Report dated Jan. 21, 2013, issued in corresponding European Patent Application No. 12179415.0. (7 pages).
Office Action issued on Feb. 28, 2014, by the Chinese Patent Office in corresponding Chinese Patent Application No. 201080046444.9 and an English translation of the Office Action. (16 pages).
Office Action dated Apr. 15, 2013, issued by the U.S. Patent and Trademark Office in corresponding U.S. Appl. No. 13/530,153. (20 pages).
Office Action issued by the U.S. Patent and Trademark Office in the U.S. Appl. No. 13/161,234, mailed Sep. 27, 2013, U.S. Patent and Trademark Office, Alexandria, VA. (9 pages).
Chinese Office Action (Text Portion of the Notification of the Third Office Action) dated Nov. 11, 2013, issued by the Chinese Patent Office in corresponding Chinese Patent Application No. 201110187463.X, and English language translation of Office Action. (8 pages).
Chinese Office Action (Text Portion of the Notification of the Third Office Action) dated Nov. 18, 2013, issued by the Chinese Patent Office in corresponding Chinese Patent Application No. 201080046442.X, and English language translation of Office Action. (12 pages).
Office Action issued by the U.S. Patent and Trademark Office in the U.S. Appl. No. 13/530,153, mailed Oct. 30, 2013, U.S. Patent and Trademark Office, Alexandria, VA. (11 pages).
Office Action issued by the U.S. Patent and Trademark Office in the U.S. Appl. No. 13/161,234, mailed Mar. 1, 2013, U.S. Patent and Trademark Office, Alexandria, VA. (13 pages).
Office Action dated Mar. 12, 2013, issued in corresponding Japanese Patent Application No. 2011-536052, and an English Translation of the Office Action. (6 pages).
International Search Report (PCT/ISA/210) issued on May 11, 2010, by Japanese Patent Office as the International Searching Authority for International Application No. PCT/JP2010/052245.
International Search Report (PCT/ISA/210) issued on Mar. 23, 2010, by Japanese Patent Office as the International Searching Authority for International Application No. PCT/JP2010/052246.
International Search Report (PCT/ISA/210) issued on Mar. 2, 2010, by Japanese Patent Office as the International Searching Authority for International Application No. PCT/JP2010/000528.
Office Action for U.S. Appl. No. 13/127,596 dated Oct. 13, 2011.
Chinese Office Action dated Jun. 20, 2013, issued by the Chinese Patent Office in corresponding Chinese Patent Application No. 201110187463.X, and English language translation of Office Action. (15 pages).
Chinese Office Action dated Jun. 18, 2013, issued by the Chinese Patent Office in corresponding Chinese Patent Application No. 201080046442.X, and English language translation of Office Action. (13 pages).
Communication Pursuant to Article 94(3) EPC, dated Jun. 13, 2013, issued by the European Patent Office in corresponding European Patent Application No. 09 834 568.9-1751. (6 pages).
Communication Pursuant to Article 94(3) EPC, dated Jun. 13, 2013, issued by the European Patent Office in corresponding European Patent Application No. 11 004 596.0-1751. (5 pages).
Office Action dated Dec. 4, 2013 issued by the Japanese Patent Office in corresponding Japanese Patent Application No. 2011-002839, and a partial English translation thereof.
Office Action dated Jun. 11, 2013 issued by the Japanese Patent Office in corresponding Japanese Patent Application No. 2011-002839, and a partial English translation thereof.

(56) References Cited

OTHER PUBLICATIONS

Office Action dated Jan. 29, 2013 issued by the Japanese Patent Office in corresponding Japanese Patent Application No. 2011-105767, and a partial English translation thereof.
Office Action dated Jun. 11, 2013 issued by the Japanese Patent Office in corresponding Japanese Patent Application No. 2011-105767, and a partial English translation thereof.
Advisory Action dated Jul. 11, 2013 issued in corresponding U.S. Appl. No. 13/530,153.
Office Action issued on Mar. 20, 2014, by the European Patent Office in corresponding European Patent Application No. 12 179 415.0 (5 pages).
Office Action (Restriction Requirement) issued in the U.S. Appl. No. 13/501,237, mailed on Apr. 17, 2014, U.S. Patent and Trademark Office, Alexandria, VA. (8 pages).
Advisory Action issued by the U.S. Patent and Trademark Office in the U.S. Appl. No. 13/161,234, mailed Dec. 31, 2013, U.S. Patent and Trademark Office, Alexandria, VA. (3 pages).
Office Action issued by the U.S. Patent and Trademark Office in U.S. Appl. No. 13/501,237, mailed Jun. 10, 2014. (8 pages).
Office Action issued by the U.S. Patent and Trademark Office in U.S. Appl. No. 13/530,153, mailed Jul. 17, 2014. (18 pages).
Office Action issued by the U.S. Patent and Trademark Office in U.S. Appl. No. 13/161,234, mailed Jul. 30, 2014. (11 pages).
Chinese Office Action (Notification of the Third Office Action) dated May 15, 2014, issued by the Chinese Patent Office in corresponding Chinese Patent Application No. 201080046442.X, and English language translation of Office Action. (15 pages).
Chinese Office Action (Decision of Rejection) dated Apr. 15, 2014, issued by the Chinese Patent Office in corresponding Chinese Patent Application No. 201110187463.X, and English language translation of Office Action. (18 pages).
Office Action issued on Apr. 28, 2014 by the U.S. Patent and Trademark Office in U.S. Appl. No. 13/501,200. (8 pages).

International Search Report (PCT/ISA/210) issued on Mar. 16, 2010, by Japanese Patent Office as the International Searching Authority for International Application No. PCT/JP2010/052244.
Chinese Office Action (Decision of Rejection) dated Sep. 4, 2014, issued by the Chinese Patent Office in corresponding Chinese Patent Application No. 201080046444.9, and an English translation thereof. (14 pgs).
U.S. Office Action dated Sep. 12, 2014, issued in corresponding U.S Appl. No. 13/501,237.
Extended Search Report issued on Jan. 8, 2014 by the European Patent Office, in corresponding European Patent Application No. 10823214.1 (6 pages).
Extended Search Report issued on Jan. 8, 2004 by the European Patent Office, in corresponding European Patent Application No. 10824676.0 (8 pages).
Extended Search Report issued on Jan. 15, 2014 by the European Patent Office, in corresponding European Patent Application No. 10823215.8 (7 pages).
Advisory Action issued on Dec. 16, 2014 by the U.S. Patent and Trademark Office in U.S. App. No. 13/501,237 (3 pages).
Office Action issued on Dec. 15, 2014 by the U.S. Patent and Trademark Office in U.S. Appl. No. 13/530,153 (19 pages).
Office Action issued on Feb. 2, 2015 by the U.S. Patent and Trademark Office in U.S. Appl. No. 13/501,237 (7 pages).
Office Action issued on Jan. 8, 2015 by the European Patent Office in corresponding European Patent Application No. 10 823 214.1 (5 pages).
Office Action issued on Jan. 8, 2015 by the European Patent Office in corresponding European Patent Application No. 10 823 215.8 (4 pages).
Office Action issued on Jan. 8, 2015 by the European Patent Office in corresponding European Patent Application No. 10 824 676.0 (4 pages).
Office Action issued May 4, 2015 by the European Patent Office in corresponding European Patent Application No. 11 004 596 (5 pages).

* cited by examiner ature 5 and Patent
MANUFACTURING APPARATUS OF CORE MATERIAL OF VACUUM HEAT INSULATING MATERIAL, MANUFACTURING METHOD OF VACUUM HEAT INSULATING MATERIAL, VACUUM HEAT INSULATING MATERIAL, AND REFRIGERATOR

TECHNICAL FIELD

The present invention relates to a manufacturing apparatus of core material of vacuum heat insulating material, a manufacturing method of vacuum heat insulating material, a vacuum heat insulating material and a refrigerator using the vacuum heat insulating material.

BACKGROUND ART

Conventionally, urethane foam has been used for heat insulating material used for the heat insulating box of the refrigerator, etc. Recently, according to requests from the market for energy-saving or space-saving and capacity-increasing, instead of the urethane foam, another structure, in which vacuum heat insulating material having heat insulating performance being better than the urethane foam is embedded in the urethane foam and used together, is used. Such vacuum heat insulating material is also used for the refrigerator, etc.

The vacuum heat insulating material is formed by inserting powder, foam, fiber body, etc. as a core material in an outer cover material made of a plastic laminated film, etc. in which aluminum foil is used for a gas barrier layer. Inside of the vacuum heat insulating material, the degree of vacuum is kept to no more than some Pa (pascal).

Further, in order to suppress degradation of the degree of vacuum which becomes a cause of decreasing the heat insulating performance of the vacuum heat insulating material, adsorption agent to sorb gas or water is provided in the outer cover material. For the core material of the vacuum heat insulating material, powder such as silica, foam such as urethane, and fiber body, etc. is used. Currently, glass fiber having excellent heat insulating performance is mainly used for the core material of the vacuum heat insulating material.

Elements of the fiber include inorganic fibers such as glass fiber, ceramic fiber, etc. (refer to Patent Literature 1 and Patent Literature 8, for example).

Further, there are organic fibers such as polypropylene fiber, polylactate fiber, aramid fiber, LCP (liquid crystalline polymer) fiber, polyethylene terephthalate fiber, polyester fiber, polyethylene fiber, cellulose fiber, etc. (refer to Patent Literature 2 and Patent Literature 7, for example).

Shapes of the fiber body include cottonlike, lamination of sheets (refer to Patent Literature 3 and Patent Literature 4, for example), and lamination of sheets with alternating fiber orientations of sheets (refer to Patent Literature 5 and Patent Literature 6, for example).

Further, methods of laminating sheets include lamination by folding a continuous belt-like sheet-shaped member alternatively in different directions so as to form the lamination (for example, refer to Patent Literature 9).

CITATION LIST

Patent Literature

[Patent Literature 1] JP 8-028776A
[Patent Literature 2] JP 2002-188791A
[Patent Literature 3] JP 2005-344832A
[Patent Literature 4] JP 2006-307921A
[Patent Literature 5] JP 2006-017151A
[Patent Literature 6] JP 7-103955B
[Patent Literature 7] JP 2006-283817A
[Patent Literature 8] JP 2005-344870A
[Patent Literature 9] JP 62-204093A

SUMMARY OF INVENTION

Technical Problem

Like the above, for the currently used vacuum heat insulating material, the glass fibers are mainly used as the core material. However, since the glass fiber is stiff and brittle, at the time of manufacturing the vacuum heat insulating material, powder dust scatters to cause to stick to skin/mucous membrane of a worker, which may cause stimulus, and a problem exists in the usability and workability.

Further, from the viewpoint of recycling, for example, the refrigerator is demolished for each product in a recycle factory. At this time, the glass fiber is mixed with urethane waste, etc. and supplied to thermal recycle. There is a problem that the recyclability of the glass fiber is not good such that it causes to degrade the combustion efficiency, to remain as residue, etc.

On the other hand, in case of using polyester fiber for the core material, the usability and the recyclability are excellent. However, the vacuum heat insulating material using polyester fiber shows the heat conductivity which is an index representing the heat insulating performance is around 0.0030 [W/mK] (refer to Patent Literature 7, for example). There is a problem that the vacuum heat insulating material using polyester fiber for the core material, compared with the general vacuum heat insulating material using the glass fiber for the core material (the heat conductivity: around 0.0020 [W/mK]), shows worse heat insulating performance.

Because of this, it is possible to improve the heat insulating performance by making the organic fiber layer thin and directing the orientation of the fibers in the direction being orthogonal to the heat transfer direction. However, in such a case, the number of laminated sheets exceeds some hundreds, so that the productivity is bad. Further, for the bending process, since the number of laminated sheets is large, the bending is not easy, and the usability and the productivity are bad.

Further, in case of manufacturing the vacuum heat insulating material by inserting the core material such as glass fiber into the outer cover material such as aluminum foil laminated film, etc., and decompressing and sealing the inside, when the core material is inserted into the outer cover material such as aluminum foil laminated film, etc., in particular when the inorganic fiber such as glass fiber is used for the core material, there may be possibilities of the glass fiber penetrating the outer cover material to damage or break the outer cover material, so that the core material of the glass fiber is not directly inserted into the outer cover material, but inserted into the outer cover material while being set in a plastic bag, etc., which additionally requires the plastic bag, etc., complicates the manufacturing process of the core material or the vacuum heat insulating material, and further increases the manufacturing cost.

Further, as shown in Patent Literature 9, it is considered to form the core material by folding the continuous belt-like sheet-shaped member (waste paper) alternatively in different directions with making folding lines so as to laminate like layering; however, a folding apparatus is required for folding with making folding lines, and the folding apparatus has a complicated structure and is expensive, thereby increasing the cost.

Further, when the glass fiber is used for the core material of the vacuum heat insulating material, the glass fiber is excellent in heat insulating performance. However, since the glass fiber is hard and brittle, it is difficult to do folding processing after vacuuming.

Further, when the glass fiber is used for the core material of the vacuum heat insulating material, the glass fiber is excellent in heat insulating performance. However, since the glass fiber is hard and brittle, if the piping such as a condensation piping, etc. is inserted between the vacuum heat insulating material and the vacuum heat insulating material for insulating heat, the vacuum heat insulating material cannot be deformed into a tubular shape, and thus there exists a gap corresponding to the diameter of the piping between the vacuum heat insulating materials. Accordingly, heat leakage may occur from the gap between the vacuum heat insulating materials, which degrades the heat insulating performance drastically.

Further, in case of using the organic fiber for the core material, when a plurality of sheets are laminated to form the core material, the vacuum heat insulating material becomes harder as the number of laminated layers increases. Accordingly, when it is necessary to do folding process after vacuuming, there is a problem that it is difficult to fold a part which needs to be folded, and the part which is not desired to be folded may be deformed.

The present invention is provided to solve the above problems and aims to provide a manufacturing apparatus of core material of the vacuum heat insulating material including at least any of the features which will be shown below, a manufacturing method of the vacuum heat insulating material, the vacuum heat insulating material, and a refrigerator using the vacuum heat insulating material:

(1) having high heat insulating performance and excellent productivity (in particular, productivity of the core material);
(2) having high heat insulating performance, and excellent usability and recyclability;
(3) in case of using the organic fiber assembly for the core material, having excellent productivity; and
(4) being capable of manufacturing the core material according to the size of the curve of folding process, and having easy manufacturability.

Solution to Problem

A manufacturing apparatus of a core material of a vacuum heat insulating material related to the present invention includes: a reel winding up a fiber assembly which has a predefined width and is wound on a substantially cylindrical original fabric roll which has been cut to have a predetermined width at a predetermined number of times; cutting means cutting the fiber assembly which has been wound on the reel; and forming member forming the fiber assembly into a flat-plate-shaped core material after removing from the reel the fiber assembly which has been wound up on the reel at the predetermined number of times and cut.

Advantageous Effects of Invention

According to the manufacturing apparatus of the core material of the vacuum heat insulating material of the present invention, it is possible to manufacture the core material and the vacuum heat insulating material with a simple structure, and to reduce the manufacturing time. Further, since the winding is continuously done in the winding direction, it is unnecessary to cut the edge face in a length direction, thereby simplifying the equipment, and reducing the cutting time.

Further, by using the core material manufactured by the manufacturing apparatus of the vacuum heat insulating material of the present invention, it is possible to provide the vacuum heat insulating material having excellent usability, heat insulating performance, or productivity, and equipment which mounts this vacuum heat insulating material such as a refrigerator, etc.

DESCRIPTION OF EMBODIMENTS

Embodiment 1

Figure 1:
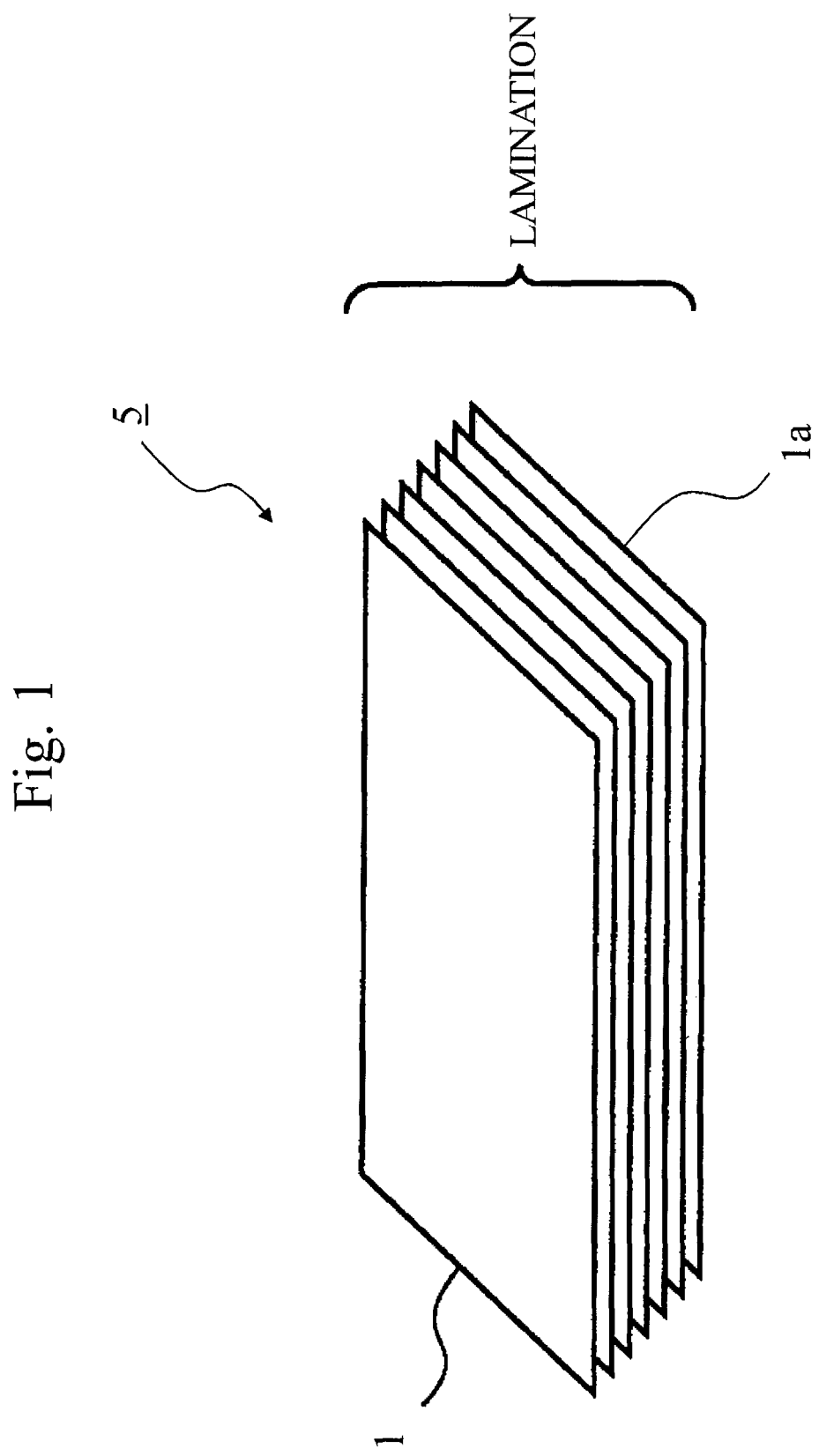
FIG. 1 shows the first embodiment and is a pattern diagram of a vacuum heat insulating material 7, and is a perspective view of a core material 5 of the vacuum heat insulating material 7 made by laminating a plurality of non-woven cloth sheets.
Figure 2:
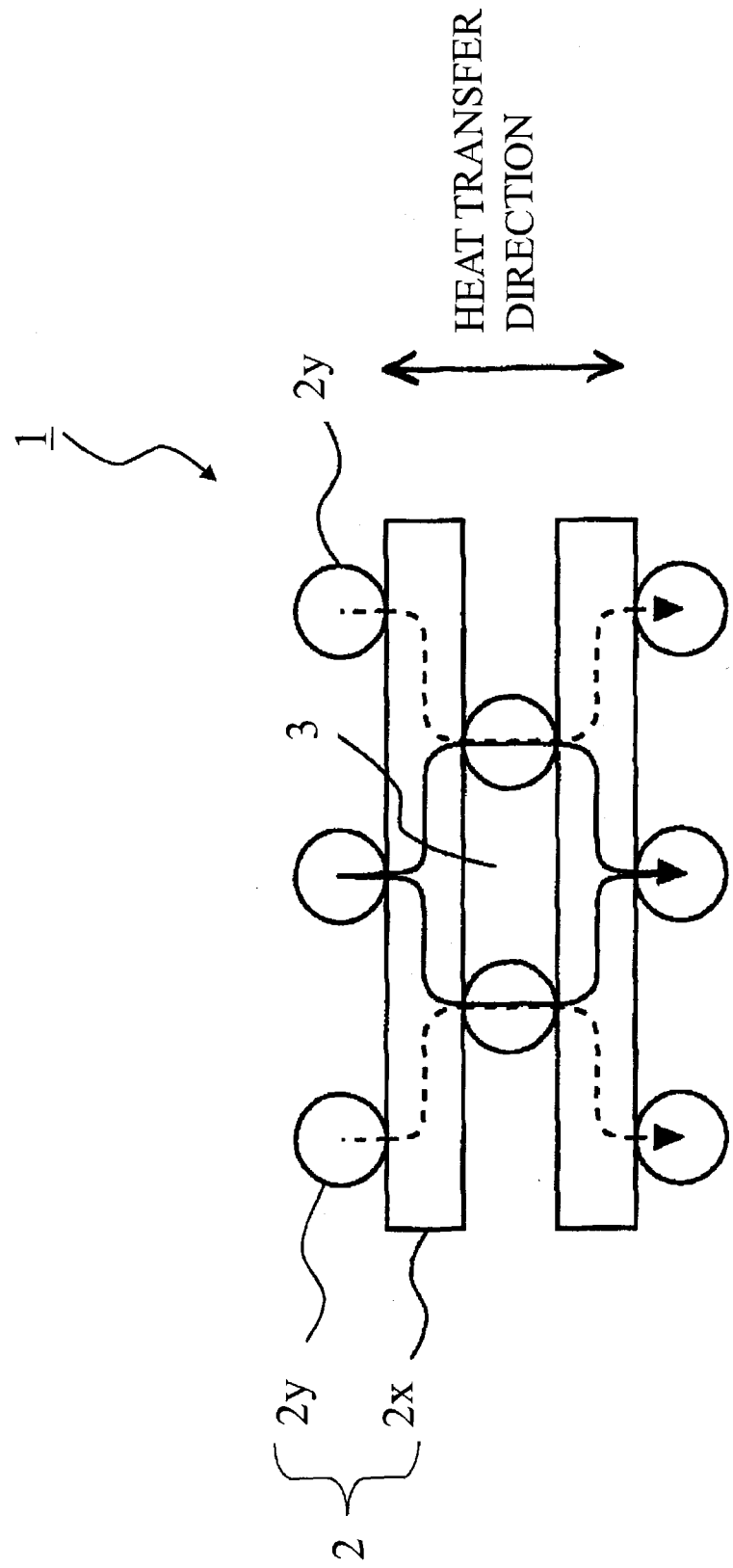
FIG. 2 shows the first embodiment and is a pattern diagram of the vacuum heat insulating material 7, and is a side view showing orientation of fiber in one non-woven cloth sheet.
Figure 3:
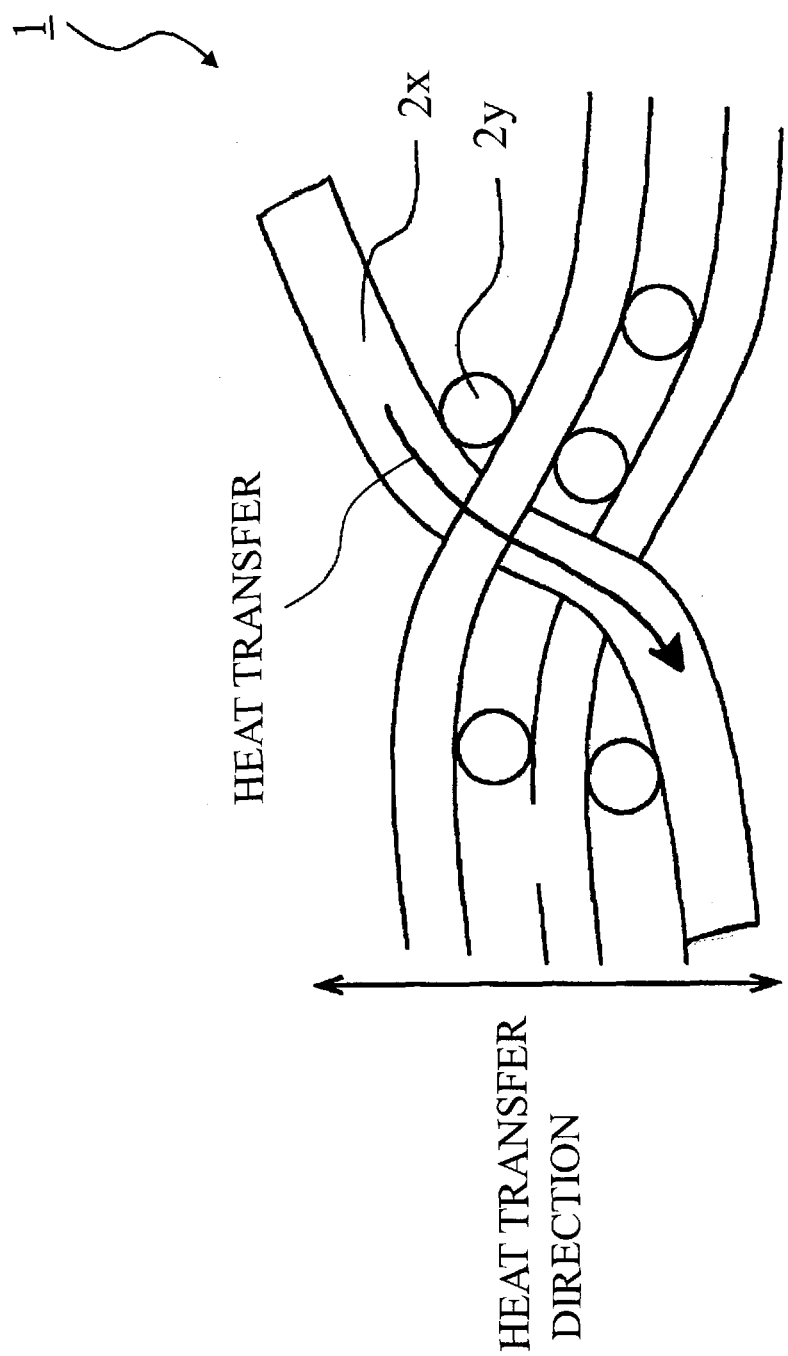
FIG. 3 shows the first embodiment and is a pattern diagram of the vacuum heat insulating material 7, and is a side view showing orientation situation of fiber when the core material 5 is thick.
Figure 4:
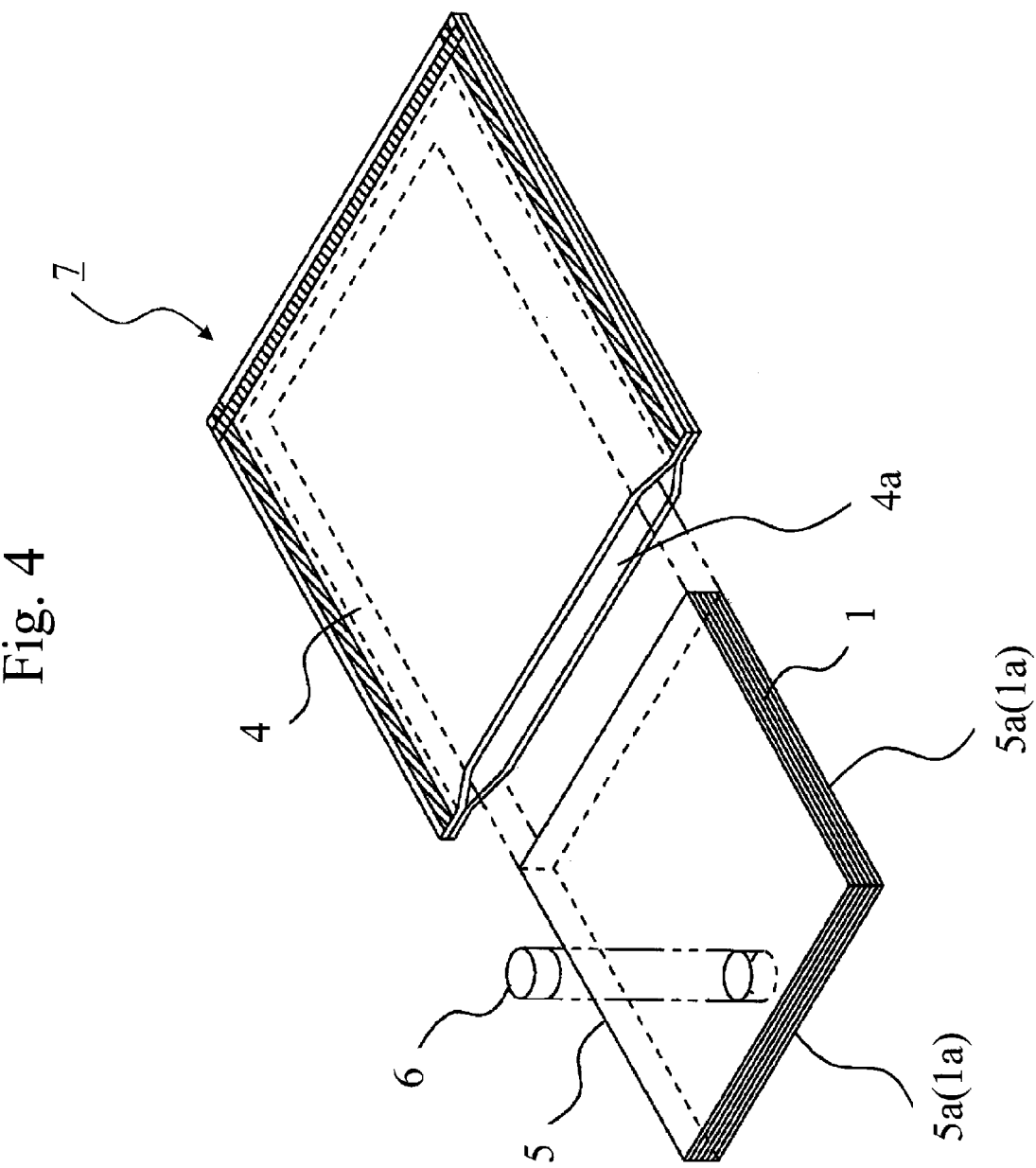
FIG. 4 shows the first embodiment and is an exploded perspective view showing a structure of the vacuum heat insulating material 7.

FIGS. 1 through 4 show the first embodiment; FIG. 1 is a pattern diagram of a vacuum heat insulating material 7 and is a perspective view of a core material 5 of the vacuum heat insulating material 7 made by laminating a plurality of non-woven cloth sheets; FIG. 2 is a pattern diagram of the vacuum heat insulating material 7, and is a side view showing an orientation of fabric in one sheet of non-woven cloth; FIG. 3 is a pattern diagram of the vacuum heat insulating material 7, and is a side view showing an orientation situation of fabric when the core material 5 is thick; and FIG. 4 is an exploded perspective view showing a structure of the vacuum heat insulating material 7.

(Laminated Structure)

In FIG. 1, the core material 5 has a laminated structure made by laminating sheet-shaped organic fiber assembly (hereinafter, "organic fiber assembly 1"), of which, for example, at least one end face 1a is cut off. That is, the core material 5 shown in FIG. 1 is formed to be sheet-shaped by laminating a plurality of layers of substantially rectangular organic fiber assembly 1 and then cutting four sides of the substantially rectangular shape. Or, the substantially rectangular sheet-shape is formed by cutting the four sides of the substantially rectangular organic fiber assembly 1 and then laminating a plurality of layers.

In FIG. 2, the organic fiber assembly 1 is formed by a plurality of organic fibers 2x which are arranged with a predetermined interval and a plurality of organic fibers 2y which are arranged with a predetermined interval in a direction being approximately orthogonal to the organic fibers 2x.

At this time, the organic fibers 2x and the organic fibers 2y make approximate point contact. Among the organic fibers 2y, an air layer 3 being a heat insulated room is formed.

As a collective term of the organic fibers 2x and the organic fibers 2y, the organic fibers 2 are used.

Here, as shown in FIG. 3, if the thickness of one sheet (the organic fiber assembly 1) is increased, the fiber tends to be orientated to a thickness direction which is a heat transfer direction. In particular, when the organic fibers 2 (sometimes called simply as a fiber) is a short fiber having a short fiber length (for example, the fiber length is around 5 to 150 mm), the short fiber tends to be orientated to the thickness direction which is the heat transfer direction. Through this short fiber, heat is transferred from a front surface of the sheet to a rear surface (shown by the arrow in FIG. 3), and heat insulating performance is degraded.

Accordingly, by thinly laminating the organic fiber assembly 1 to make it thin-sheet-shaped, it is possible to prevent the fiber from being made orientated to the heat transfer direction (the laminating direction of fibers of the organic fiber assembly 1; the thickness direction of the sheet-shaped organic fiber assembly 1). Thereby, degradation of heat insulating performance caused by heat transfer through the fiber orientated to the heat transfer direction can be suppressed. Therefore, a heat conductivity of the core material 5 can be made small, which enables to increase the heat insulating performance.

In FIG. 2, an arrow in a solid line and an arrow in a broken line show the heat transfer direction. Since the organic fibers 2x and the organic fibers 2y are substantially orthogonal, a contacting part of the organic fibers 2x and the organic fibers 2y become point contact, and thus heat resistance is increased and the heat insulating performance is improved.

Here, the above shows a case when the organic fibers 2x and the organic fibers 2y intersect substantially orthogonal, however, the present embodiment is not limited to this case. The organic fibers 2x and the organic fibers 2y can be intersect with each other at an angle other than a right angle. It is sufficient that all of the organic fibers 2x and all of the organic fibers 2y are not placed in parallel. Only if the degradation of heat insulating performance caused by the heat transfer through the fiber orientated to the heat transfer direction can be suppressed a little bit, it is possible to improve the heat insulating performance.

In FIG. 4, the vacuum heat insulating material 7 has a gas barrier container ("an outer cover material 4", hereinafter) having air barrier properties, a core material 5 and an adsorption agent 6 (gas absorbent or water absorbent (CaO), for example) sealed inside of the outer cover material 4. The inside of the outer cover material 4 is decompressed to a predetermined degree of vacuum (some Pa (pascal) to some hundreds Pa).

(Organic Fiber)

As for material used for the organic fibers 2 which forms the core material 5 of the vacuum heat insulating material 7, polyester, and others such as polypropylene, polylactate, aramid, LCP (liquid crystalline polymer), PPS (polyphenylene sulfide), polystyrene, etc. can be used. Further, if the heat-resistant properties of the core material 5 are desired to be increased, heat-resistant resin such as LCP (liquid crystalline polymer), PPS (polyphenylene sulfide), etc. should be used for the organic fibers 2. Further, if the compressive creep properties are desired to be increased, fibers having a large fiber diameter should be used. Further, if the above resins are mixed and used, the vacuum heat insulating material 7 having excellent compressive creep properties, high heat-resistance, and high heat insulating properties can be obtained. Polystyrene has small solid heat conductivity, and it is expected that the heat insulating performance can be improved, and the manufacturing can be done with a low cost.

Since polypropylene has low hygroscopic property, it is possible to reduce time for drying or vacuuming by using polypropylene and the productivity can be improved. Further, since polypropylene has small solid heat conductivity, it is possible to expect the improvement of heat insulating performance of the vacuum heat insulating material 7.

Further, since polylactate has biodegradability, after use of the product, the disorganized and sorted core material can be processed by disposal by landfill.

Further, since aramid or LCP has high stiffness, shape retention capacity is good when is vacuum-packed and is applied with air pressure, and the porosity can be increased, and there is a merit that it is possible to expect the improvement of the heat insulating performance, etc.

The core material 5 serves, for example, in the vacuum heat insulating material 7 which uses a plastic laminating film for the outer cover material 4, a role to secure a space within the vacuum heat insulating material 7 for supporting air pressure, and another role to reduce the heat conduction of gas by precisely dividing the space. Here, from a view point of heat conduction control of gas, it is desirable that spatial distance should be made smaller than free travel distance of air molecule at the degree of vacuum.

In this embodiment, since the organic fibers 2, for example, are used for the core material 5 of the vacuum heat insulating material 7, when compared with a case in which hard and brittle glass fiber is used as the core material, at the time of manufacturing the vacuum heat insulating material 7, powder dust does not scatter and does not stick to the skin/mucosal membrane of a worker to cause irritation, and thus usability and workability can be improved.

(Manufacturing Method of Fiber Assembly Material (Original Fabric Roll Material))

The organic fiber assembly 1 (organic fiber assembly, the same as the sheet-shaped assembly) which forms the core material 5 is manufactured by making heated and melted polyester resin or polystyrene resin fall freely on a conveyer from a number of nozzles aligned with respect to a width which is desired to be produced and with feeding the conveyer at an arbitrary speed, compressing the heated and melted polyester resin or polystyrene resin by a pressure roller and winding up on a cylindrical original fabric roller to manufacture a substantially cylindrical original fabric roll material. The bulk density of the organic fiber assembly 1 is adjusted by discharge amount of the melted resin and the speed of the conveyer, and it is possible to obtain fiber assemblies having different thickness.

Further, as for long fiber non-woven cloth which is the organic fiber assembly 1, continuous fiber melted and extruded by an extruder from a spinning nozzle is collected on the conveyer, the conveyer is fed at an arbitrary speed to get sheet-shaped form, and long fibered non-woven cloth which can be wound up on the original fabric roller is obtained. Since the continuous sheet-shaped organic fiber assembly 1 formed out of the continuous organic fiber 2 is obtained, it is possible to wind up on the cylindrical original fabric roller continuously, which enables to obtain the original fabric roll of the long fibered non-woven cloth.

Further, for fiber spinning, a method can be used, after cooling the resin by cold air, etc. directly under the nozzle, by stretching the resin with compressed air, etc. to fiberize; and another method by blowing, from the side of a nozzle hole, the resin with high-temperature air which is as high as the melting temperature of the resin.

Here, the organic fiber assembly 1 obtained by the above methods may be difficult to handle at the time of manufacturing the vacuum heat insulating material 7, since organic fibers 2 are disjointed with each other. Then, at the time of applying pressure, the organic fibers 2 can be heat-deposited. At this time, applying excessive pressure, or excessive heat-deposition may increase a contacting area between the organic fibers 2, increase heat transfer, and generate heat conduction from the welding unit, which degrades the heat insulating performance. Therefore, the contacting area between the organic fibers 2 should be made small as much as possible. The contacting area between the organic fibers 2 is desired to be no more than 20% of the total area (the sheet area), preferably no more than 15%, more preferably no more than 8%.

Since it is confirmed that when a rate occupied by the heat deposition exceeds 20% of the total area (the sheet area), the heat conductivity becomes large, and the heat insulating performance is degraded, the rate occupied by the heat deposition is preferably no more than 20% of the total area (the sheet area). Here, if the rate of the occupied by the heat deposition to the total area (the sheet area) is made small, the heat insulating performance is extremely improved, so that it is desired that the rate occupied by the heat deposition is suppressed to be no more than 15% of the total area (the sheet area), and further, no more than 8% of the total area (the sheet area).

As for the heat deposition, an embossing is done by, for example, adding dotted welded spots with a heat roller, etc., long-fibered non-woven cloth (the organic fiber assembly 1) which is windable and has a good heat insulating performance can be obtained, while securing handling strength. Here, in the present embodiment, the temperature of the heat roller can be about 195 degrees Celsius.

Here, instead of the heat deposition, needlepunching method can be used to form to be sheet-shaped by repeating piercing and raising vertically multiple pins with a hook to get fibers entangled with each other, thereby preventing fibers from being dispersed. However, it is preferable to form to be sheet-shaped by the heat deposition (for example, the embossing), since it can be implemented with simple equipment and working is easy on a conveyer.

(Fiber Diameter)

In this first embodiment, as the fiber assembly, for example, the organic fiber assembly 1 is used. The fiber diameter of the organic fiber assembly 1 is adjusted by the nozzle diameter for forming the assembly so as to be about 15 μm. As for the heat insulating performance, the smaller the fiber diameter is, the better the heat insulating performance is. Theoretically, the fiber diameter is desired to be small due to the relation between the degree of internal vacuum of the vacuum heat insulating material 7 with the spatial distance segmented by fibers, and with a free travel distance of gas molecule. The fiber diameter is desired to be no more than 15 μm, preferably no more than 10 μm; the average fiber diameter of around 9 μm can be suitably used.

The measurement of the average fiber diameter can be done by measuring diameters of some to some tens of positions (ten positions, for example) using a microscope, and an average value can be employed. Further, fabric weight (weight (g) of fiber per 1 $m^2$) can be obtained as a weight per unit area of one sheet by measuring an area and a weight of one sheet.

In the present embodiment, by regulating an orientation direction of fiber to substantially orthogonal to the thickness direction which is heat insulating direction, a plurality of the organic fiber assemblies 1 are laminated to form a multi-layered structure.

Further, when short fibered non-woven cloth is used for the organic fiber assembly 1, since the fiber length is short, the organic fibers 2x and the organic fibers 2y tend to be orientated in the heat insulating direction (the thickness direction of sheet). In order to suppress degradation of the heat insulating performance due to the heat transfer through the fibers orientated in the heat insulating direction, long-fibered non-woven cloth, which uses long fiber, is used for the organic fiber assembly 1.

In the present embodiment, as for the fiber length, at least substantially the same length as the length of the sheet is used, and thus it is prevented that fiber may be torn halfway in the sheet and a part (a mid) or an end of the fiber may be orientated in the heat insulating direction so that the heat insulating performance is not degraded.

(Laminating Method of Fiber Assembly, Manufacturing Method 1 of Core Material)

Next, the obtained sheet-shaped organic fiber assembly 1 is cut (cut out) with an end face 1a so as to be, for example, a predetermined size (width 210 mm×length 297 mm). By laminating these into a plurality of layers (twenty-five layers, for example), the core material 5 is formed, which has a predetermined size and a predetermined thickness, and of which an end surface 5a is cut. The core material 5 can be formed by cutting an end face 5a to become a predetermined size after laminating a plurality of layers of the sheet-shaped organic fiber assembly 1. Here, the number of sheets to be laminated can be set arbitrarily based on the thickness of the organic fiber assembly 1 obtained and the thickness of the vacuum heat insulating material 7 which is desired to be manufactured.

(Outer Cover Material)

For the outer cover material 4 (FIG. 4) of the vacuum heat insulating material 7, a laminated film having the thickness of at least 5 µm and no more than 100 µm is used. In the present embodiment, for example, a gas-barrier plastic laminated film structured by nylon (6 µm), aluminum evaporated PET (polyethylene telephthalate) (10 µm), aluminum foil (6 µm), and high-density polyethylene (50 µm) is used.

Other than the above, if the laminated film without including a aluminum foil such as polypropylene, polyvinyl alcohol, or polypropylene structure, etc. is used for the outer cover material 4 of the vacuum heat insulating material 7, it is possible to suppress the degradation of the heat insulating performance caused by heat bridge. Here, three sides out of four sides of the outer cover material 4 are heat-sealed by a seal packaging machine. The remaining one side is heat-sealed after the core material 5 is inserted.

(Manufacturing Method 1 of Vacuum Heat Insulating Material)

As for manufacturing the vacuum heat insulating material 7, first, the core material 5 having a predetermined size and thickness is inserted into a bag-shaped outer cover material 4 having an opening part 4a. The outer cover material is fixed so as not to close the opening part 4a, and dried in a constant temperature reservoir at the temperature of about 105 degrees Celsius for a half day (about 12 hours). Then, in order to absorb remained gas after vacuum packaging, outgassing from the core material 5 over time, and gas permeating through a seal layer of the outer cover material 4, adsorption agent 6 (gas adsorption agent or water adsorption agent, etc.) is inserted in the outer cover material 4 (a filmed bag), and vacuuming (decompression treatment) is done using Kashi-wagi-style vacuum packaging machine (KT-650 manufactured by NPC Incorporated). The vacuuming is done until the degree of vacuum in the chamber becomes about 1 to 10 Pa, and then the opening part 4a of the outer cover material 4 (the filmed bag) is heat-sealed in the chamber, thereby obtaining a plate-shaped vacuum heat insulating material 7.

(Laminating Method of Fiber Assembly, Manufacturing Method 2 of Core Material)

As has been discussed, the core material 5 can be formed by cutting the sheet-shaped organic fiber assembly 1 into the predetermined size and laminating a plurality of layers of the sheet-shaped organic fiber assembly 1 to manufacture the vacuum heat insulating material 7, and also the core material 5 can be made by laminating a plurality of layers of the sheet-shaped organic fiber assemblies 1 and then cutting the end face 5a to form into the predetermined size to manufacture the vacuum heat insulating material 7. Here, another manufacturing method of the core material 5 will be explained. A manufacturing method of the core material 5 by continuously winding up the continuous sheet-shaped fiber assembly (for example, the organic fiber assembly 1) will be explained.

Figure 5:
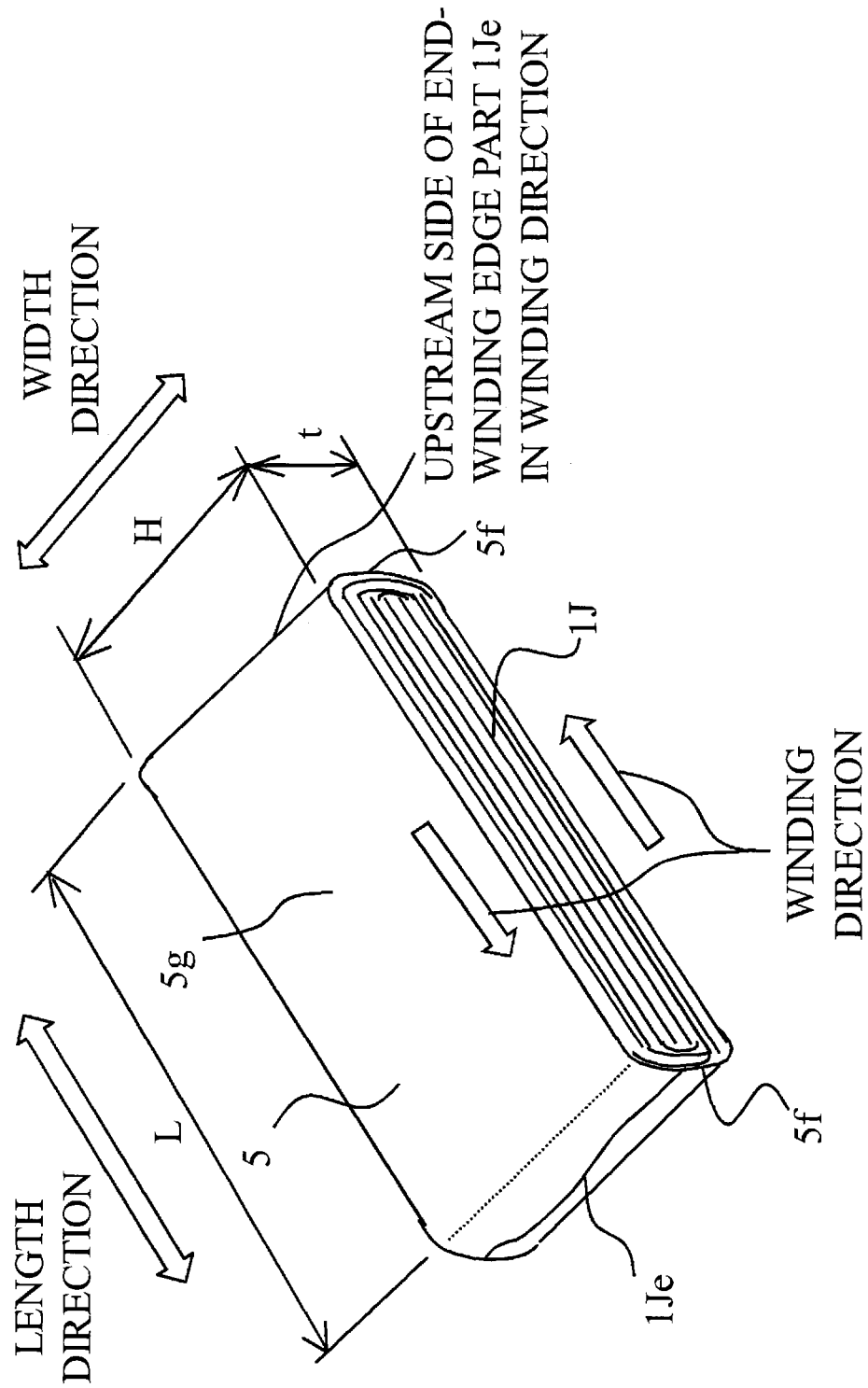
FIG. 5 shows the first embodiment and is a perspective view showing by pattern a lamination state of the core material 5 that forms the vacuum heat insulating material 7.
Figure 6:
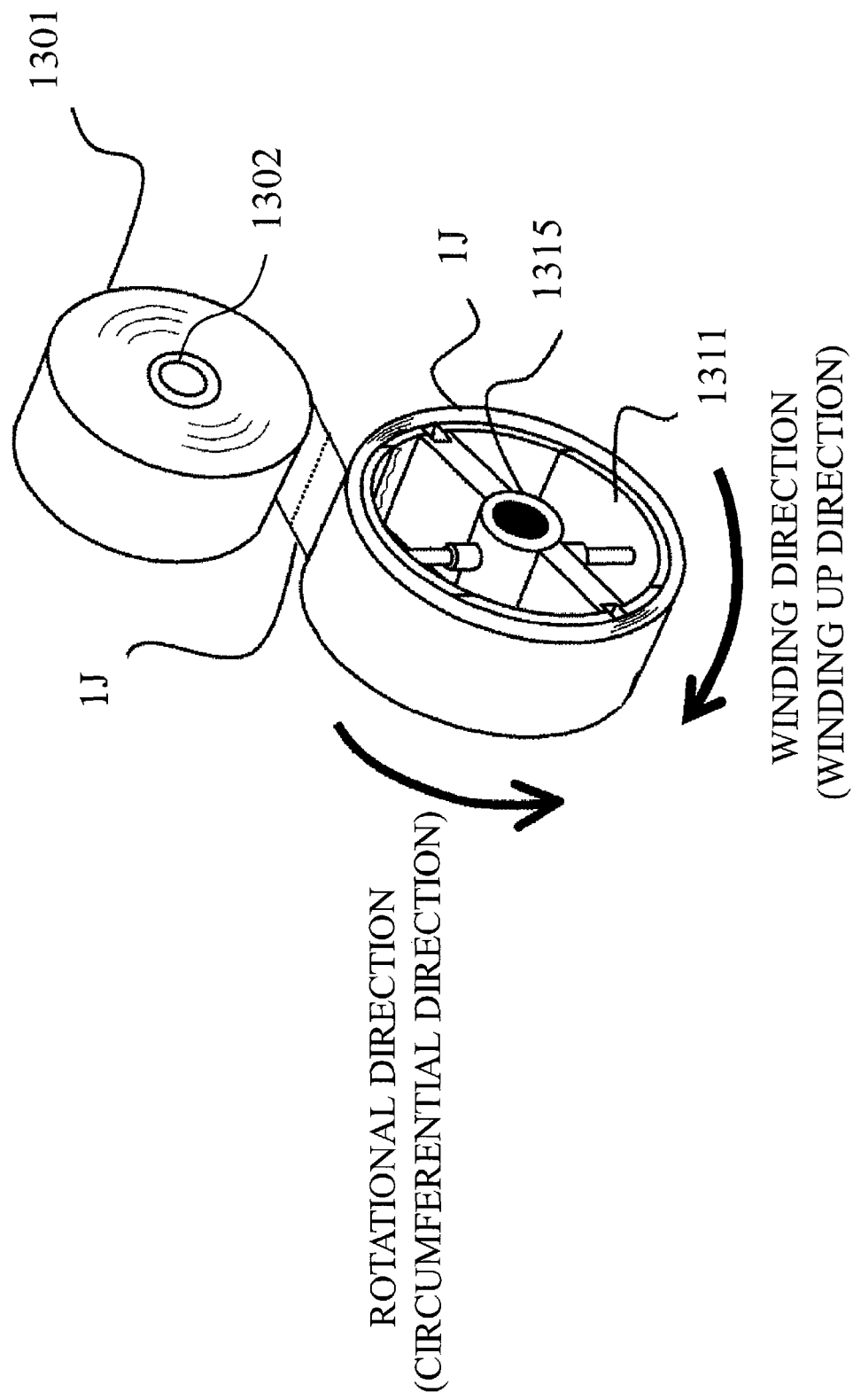
FIG. 6 shows the first embodiment and is a perspective view showing by pattern an original fabric roller and a reel of a laminating device of the core material 5 which forms the vacuum heat insulating material 7.

FIGS. 5 and 6 show the first embodiment; FIG. 5 is a perspective view showing by pattern a laminating state of the core material 5 that forms the vacuum heat insulating material 7, and FIG. 6 is a perspective view showing by pattern an original fabric roller and a reel of a laminating device of the core material 5 that forms the vacuum heat insulating material 7.

In FIGS. 5 and 6, the continuous sheet-shaped fiber assembly 1J (for example, the organic fiber assembly 1, the thickness of which is at least around 30 µm and no more than around 500 µm, preferably at least around 80 µm and no more than around 300 µm) formed by continuous fiber (for example, the organic fiber 2) is wound up on the reel 1311 (after continuously winding up on the reel 1311) with a predetermined tensional force. The predetermined tensional force is sufficient to prevent the continuous sheet-shaped fiber assembly 1J from being cut while being wound or, even if the fiber assembly is not cut, from being too much stretched to keep its properties which are necessary as a fiber. The continuous sheet-shaped fiber assembly 1J is formed into a flat plate shape, and the core material 5 is produced. That is, the core material 5 is constituted by a laminated structure of the continuous sheet-shaped fiber assembly 1J formed by winding up the sheet-shaped fiber assembly 1J which is continuous in the length direction (the winding direction) continuously from the inside toward the outside. Here, it is assumed that the width of the flatly formed core material 5 is H, the length is L, and the thickness is t (refer to FIG. 5). Further, an end portion of end-winding of the core material 5 is called as an end-winding end portion 1Je.

The core material 5 is formed by, for example, winding up the continuous sheet-shaped fiber assembly 1J (the original fabric roll 1301), having the predetermined width wound on the substantially cylindrical original fabric roller 1302, on the reel 1311 continuously at a plurality of times (in the state of being continuously wound up at a predetermined number of times), taking off the reel 1311 from the continuous sheet-shaped fiber assembly 1J in the shaft center direction of the reel 1311 (in the shaft center direction of a rotating shaft 1315 which is displaced by around 90 degrees from the winding direction), and flattening (into a sheet shape) the continuous sheet-shaped fiber assembly 1J wound substantially cylindrically. The flat core material 5 is formed in a flat plate shape (sheet-shaped, smooth) including a flat part 5g (a smooth part) made by laminating a plurality of layers of the continuous sheet-shaped fiber assembly 1J to become flat (smooth) and a folding end portion 5f (a folding part) formed by folding the continuous sheet-shaped fiber assembly 1J at both end sides in the length direction of the flat part 5g (since the continuous sheet-shaped fiber assembly 1J is continuously wound in the winding direction, the continuous sheet-shaped fiber assembly 1J is folded and wound at the both end sides of the flat shape in the winding direction).

At this time, the number of times R of winding on the reel 1311 is determined so as to have the predetermined thickness t when the core material 5 is formed in a flat plate shape and sealed in the outer cover material 4 in a substantially vacuum state. For example, if the necessary thickness t of the core material 5 (the predetermined thickness of the core material 5) is 8 mm and the thickness of one sheet of the continuous sheet-shaped fiber assembly 1J is 80 µm, the necessary number of laminating sheets becomes 100 sheets (8 mm/80 µm), and the necessary predetermined number of times R of winding on the reel 1311 becomes 50 times which corresponds to 50 sheets of the continuous sheet-shaped fiber assembly 1J. Since the core material 5 is formed by flattening the core material 5 (cylindrical) when the reel 1311 is taken off so as to form into a flat plate shape (sheet-shaped), the thickness t of the core material 5 becomes the thickness of 100 sheets corresponding to twice of 50 times which is the number of times R wound on the original fabric roll 1301, and the core material 5 is formed into a laminated structure having a plurality of layers of the continuous sheet-shaped fiber assembly 1J (lamination of 100-sheet layers which is the predetermined number of sheets).

Further, the necessary width (the predetermined width) H of the core material 5 is appropriately adjusted according to the width of the continuous sheet-shaped fiber assembly 1J (the original fabric roll 1301) wound on the original fabric roller 1302 or the width of the reel 1311. For example, if the necessary width H (the predetermined width) of the core material 5 is 1500 mm, the width of the reel 1311 can be set to around 1500 mm which is the predetermined width, or the width (for example, around 1520 mm) being slightly larger than 1500 mm which is the predetermined width, and unnecessary parts (both ends in the widthwise direction) can be cut off.

Figure 7:
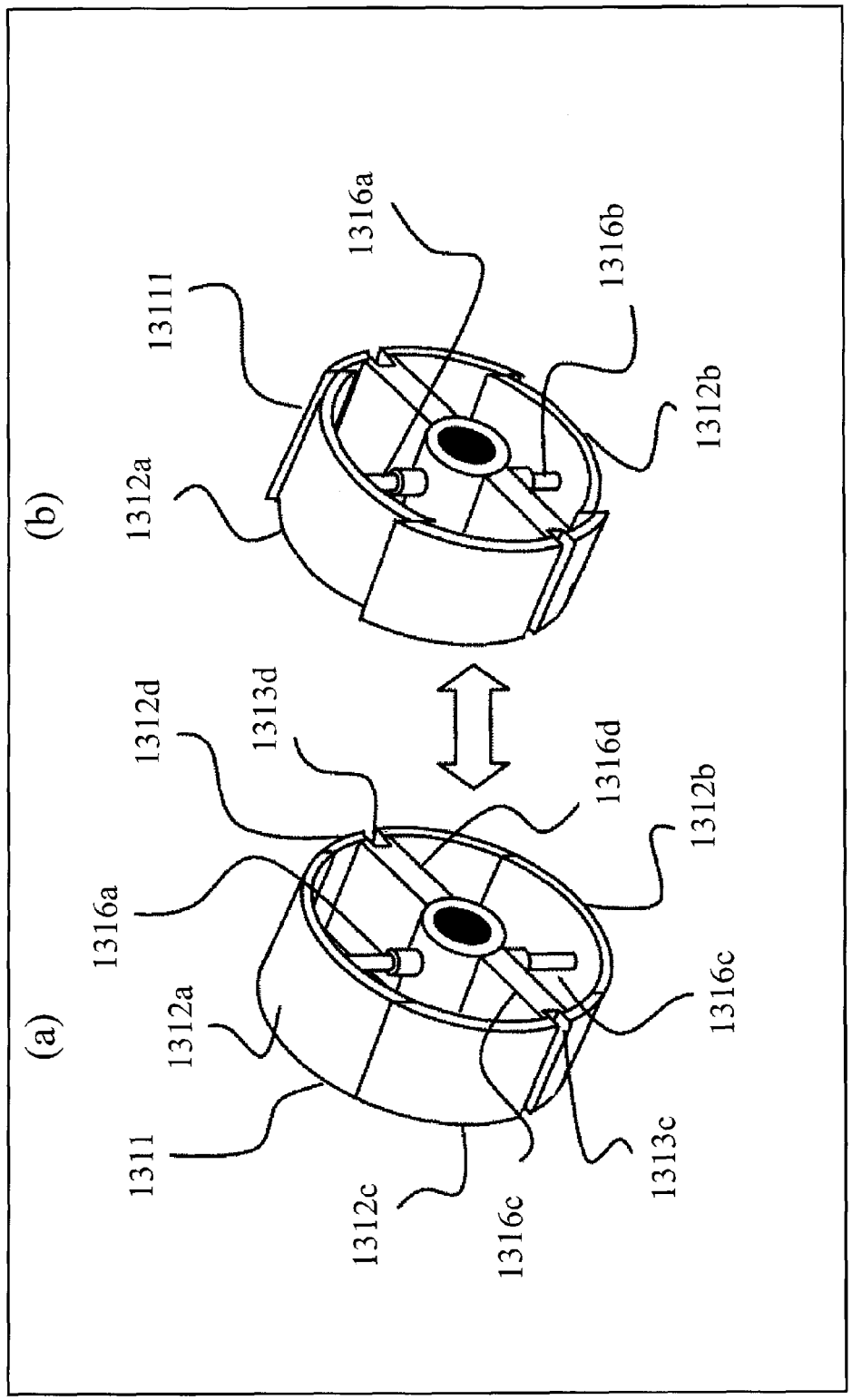
FIG. 7 shows the first embodiment and is a diagram showing a structure of a reel of a vacuum heat insulating material manufacturing apparatus, in which (a) of FIG. 7 shows a state of the reel when winding up an organic fiber assembly; and (b) of FIG. 7 shows a state of the reel when removing (separating) the reel from a sheet-shaped fiber assembly 1J after winding up the continuous sheet-shaped fiber assembly 1J.
Figure 8:
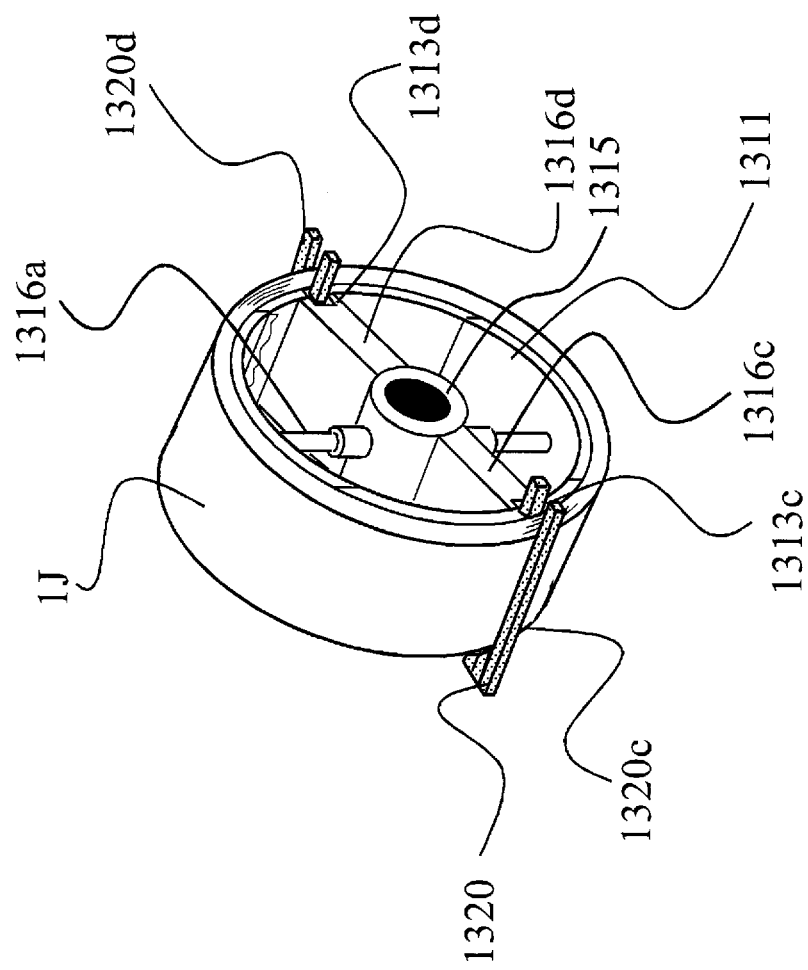
FIG. 8 shows the first embodiment and is a diagram showing a clamp member for clamping an organic fiber assembly wound up on the reel of the vacuum heat insulating material manufacturing apparatus.

FIGS. 7 and 8 show the first embodiment; FIG. 7 is a diagram showing a structure of the reel of the vacuum heat insulating material manufacturing apparatus, in which (a) of FIG. 7 shows a state of the reel when winding up the continuous sheet-shaped fiber assembly 1J, and (b) of FIG. 7 shows a state of the reel when removing (separating) the reel from the continuous sheet-shaped fiber assembly 1J after winding up the continuous sheet-shaped fiber assembly 1J; FIG. 8 is a diagram showing a clamp member for clamping the organic fiber assembly wound up on the reel of the vacuum heat insulating material manufacturing apparatus.

In the present embodiment, the reel 1311 is, for example, substantially cylindrical, which is divided by, for example, a plurality of circumferential members 1312 in the circumferential direction. For example, the reel 1311 is divided into four by circumferential members 1312a, 1312b, 1312c, and 1312d. In FIG. 7, the circumferential members 1312 are not shown; the circumferential members 1312a, 1312b, 1312c, and 1312d are called generally as "the circumferential member 1312". Here, in the circumferential member 1312, at around substantially center of the inner circumferential side of the plurality of divided circumferential members 1312a, 1312b, 1312c, and 1312d in the respective circumferential direction, circumferential member retaining shafts 1316 (circumferential member retaining shafts 1316a, 1316b, 1316c, and 1316d) connected to the rotating shaft 1315 of the reel 1311 are respectively provided. That is, the plurality of circumferential members 1312 are connected to or retained by the rotating shaft 1315 of the reel 1311 through the circumferential member retaining shafts 1316. To the rotating shaft 1315 of the reel 1311, a drive shaft driven by a motor, etc. is inserted or connected.

At least one circumferential member (in the present embodiment, two circumferential members 1312a and 1312b opposing in the radial direction) of the plurality of divided circumferential members 1312 (in the present embodiment, four circumferential members 1312a, 1312b, 1312c, and 1312d), the circumferential member retaining shafts 1316 (in the present embodiment, the circumferential member retaining shafts 1316a and 1316b) which is extendable/contractable or movable in the radial direction are provided. Thus, the circumferential member retaining shafts 1316a and 1316b are moved in the contracting direction toward the center side of radial direction after winding up the continuous sheet-shaped fiber assembly 1J on the reel 1311, thereby releasing the tensional force of the continuous sheet-shaped fiber assembly 1J which is wound substantially cylindrically on the reel 1311 with the predetermined tensional force, and further taking off the continuous sheet-shaped fiber assembly 1J wound substantially cylindrically from the reel 1311 in the shaft core direction of the rotating shaft 1315. That is, the tensional force of the continuous sheet-shaped fiber assembly 1J which is wound on the reel 1311 with the predetermined tensional force is released, thereby easily taking off the continuous sheet-shaped fiber assembly 1J which is wound on the reel 1311 from the reel 1311. The continuous sheet-shaped fiber assembly 1J can be easily removed without damage.

Here, at least one clamp member 1320 for retaining or fixing the substantially cylindrical organic fiber assembly 1 after taking off the reel 1311 is provided at the reel 1311. In the present embodiment, the clamp members 1320 are provided detachably at clamp member setting parts 1313c and 1313d, which are respectively provided at least two positions (at two opposing positions) of the circumferential members 1312c and 1312d, or circumferential member retaining shafts 1316c and 1316d. Further, two clamp member setting parts 1313c and 1313d are provided at different positions (for example, different circumferential member retaining shafts 1316c and 1316d) from the circumferential member retaining shafts 1316 (in the present embodiment, the circumferential member retaining shafts 1316a and 1316b) which are extendable/contractable and movable in the radial direction.

The clamp member 1320 is provided between the inner circumferential side of the substantially cylindrical continuous sheet-shaped fiber assembly 1J and the outer circumferential side of the reel 1311 for retaining or fixing (for example, retaining or fixing by holding) the continuous sheet-shaped fiber assembly 1J when the continuous sheet-shaped fiber assembly 1J is wound on the reel 1311 substantially cylindrically. The clamp member 1320 is, for example, rod-shaped or plate-shaped. The clamp member 1320 can be provided at the reel 1311 side with being detachable from the reel 1311 before the continuous sheet-shaped fiber assembly 1J is wound. The clamp member 1320 can be provided, while the continuous sheet-shaped fiber assembly 1J is wound on the reel 1311, at, for example, two clamp member setting parts 1313 (for example, the clamp member setting parts 1313c and 1313d respectively provided at the circumferential members 1312c and 1312d or the circumferential member retaining shafts 1316c and 1316d) between the continuous sheet-shaped fiber assembly 1J (the inner circumferential side) and the reel 1311 (the outer circumferential side), so as to be inserted from the axial direction of the rotating shaft 1315, to retain the continuous sheet-shaped fiber assembly 1J. The clamp member 1320 can be also provided to retain by holding the continuous sheet-shaped fiber assembly 1J at two positions using the two clamp member setting parts 1313 (for example, the clamp member setting parts 1313c and 1313d). Here, although the clamp member setting part 1313 is not shown in FIG. 8, the clamp member setting parts 1313c and 1313d are generally called as "the clamp member setting part 1313".

Here, in the present embodiment, on the reel 1311, at the outer circumferential face side of the circumferential member 1312 (for example, the circumferential members 1312c and 1312d which are not movable in the radial direction) at which the clamp member 1320 is provided, the clamp member setting part 1313 (for example, a concave part or a notch, etc. provided to have, for example, a predetermined width (or a length) toward the direction of the rotating shaft 1315), which can contain or insert the clamp member in the axial direction of the rotating shaft 1315 of the reel 1311, is provided.

The clamp member 1320 which is contained or inserted in the clamp member setting part 1313 (for example, 1313c, 1313d) is, for example, rod-shaped or plate-shaped. The clamp member 1320 can be provided at the clamp member setting part 1313 (the clamp member setting parts 1313c and 1313d) before the continuous sheet-shaped fiber assembly 1J is wound up on the reel 1311. After winding up the continuous sheet-shaped fiber assembly 1J on the reel 1311, the circumferential members 1312a and 1312b are moved to the center direction (the contracting direction) in the radial direction, and the tensional force of the substantially cylindrical continuous sheet-shaped fiber assembly 1J which is wound up on the reel 1311 with the predetermined tensional force is released. The continuous sheet-shaped fiber assembly 1J is clamped by the clamp member 1320 (clamped at least two positions (the clamp member setting parts 1313c and 1313d) in the present embodiment), and the continuous sheet-shaped fiber assembly 1J can be removed from the reel 1311.

In another way, after the continuous sheet-shaped fiber assembly 1J is wound up on the reel 1311 with the predetermined tensional force substantially cylindrically, at least one clamp member 1320 is inserted from the axial direction of the rotating shaft 1315 of the reel 1311 to a concave part or a notch, etc. of the clamp member setting part 1313 (the clamp member setting parts 1313c and 1313d) provided at the circumferential members 1312c and 1312d, which are not movable, of the reel 1311, located between the inner circumferential side of the continuous sheet-shaped fiber assembly 1J and the outer circumferential side of the reel 1311. The substantially cylindrical continuous sheet-shaped fiber assembly 1J is clamped (clamped at least two positions (the clamp member setting parts 1313c and 1313d) in the present embodiment). Then the circumferential members 1312a and 1312b are moved to the center direction (the contracting direction) in the radial direction, thereby releasing the tensional force of the substantially cylindrical continuous sheet-shaped fiber assembly 1J which is wound up on the reel 1311 with the predetermined tensional force, and removing the reel 1311.

Here, at least one clamp member 1320 (in the present embodiment, two clamp members 1320c and 1320d) is provided so as to be detachable from the reel 1311, namely, it is provided at least one circumferential member (in the present embodiment, two circumferential members 1312c and 1312d), which is not movable, of the reel 1311.

In this manner, at least one movable circumferential member 1312a or 1312b is moved in the direction of releasing the tensional force, thereby easily releasing the tensional force of the substantially cylindrical continuous sheet-shaped fiber assembly 1J which is wound up on the reel 1311 with the predetermined tensional force. Therefore, the continuous sheet-shaped fiber assembly 1J can be easily removed from the reel 1311 without breaking or damaging the continuous sheet-shaped fiber assembly 1J or the organic fiber 2. It is possible to obtain the highly reliable winding device with a simple structure, further the highly reliable continuous sheet-shaped fiber assembly 1J or the vacuum heat insulating material 7 with a low cost.

Here, the positions, at which the continuous sheet-shaped fiber assembly 1J is clamped, are at two positions which divide the circumferential length of the cross-sectional circle of the substantially cylindrical fiber assembly 1J into substantially two equal parts with substantially the same length in the circumferential direction (the cross sectional shape of the cross section at substantially right angle with respect to the axial direction of the rotating shaft 1315 of the reel 1311 (in case of the substantially cylindrical fiber assembly, the cross sectional shape becomes a substantially circular shape), two positions (in case of a circle, two positions intersecting a circumference) at which a straight line passing the center of rotation of the rotating shaft 1315 of the reel 1311 intersect with the cross sectional shape (an external shape of the cross section; a circumference in case of a circle).

Therefore, since the clamping positions are two positions which divide the circumferential length of the external shape (in case of the substantially cylindrical fiber assembly, a circle) of the cross section of the substantially cylindrical shape into substantially two equal parts, while keeping a state in which the continuous sheet-shaped fiber assembly 1J is clamped by the two clamp members 1320 (the clamp members 1320c and 1320d), the continuous sheet-shaped fiber assembly 1J is separated from the reel 1311, the two clamp members 1320c and 1320d are made movable or moved in the opposite sides directions of substantially straight line direction (at substantially 180 degrees in the opposite direction). The continuous sheet-shaped fiber assembly 1J being wound up a plurality of times and laminating a plurality of layers is pulled by the two clamp members 1320c and 1320d in the opposite directions, and thus the continuous sheet-shaped fiber assembly 1J is formed in a flat plate shape with being folded at the parts clamped by the clamp members 1320c and 1320d. Then, the clamp members 1320 (the clamp members 1320c and 1320d) are removed from the continuous sheet-shaped fiber assembly 1J formed in a flat plate shape by laminating a plurality of layers, the plurality of layers of the continuous sheet-shaped fiber assembly 1J are laminated while being continuously sheet-shaped, and the flat core material 5 having the predetermined width H and the predetermined length L is formed, that is folded at a folding end portion 5f and that has a flat plate (sheet) shaped flat part 5g.

(Manufacturing Method 2 of Vacuum Heat Insulating Material)

Figure 9:
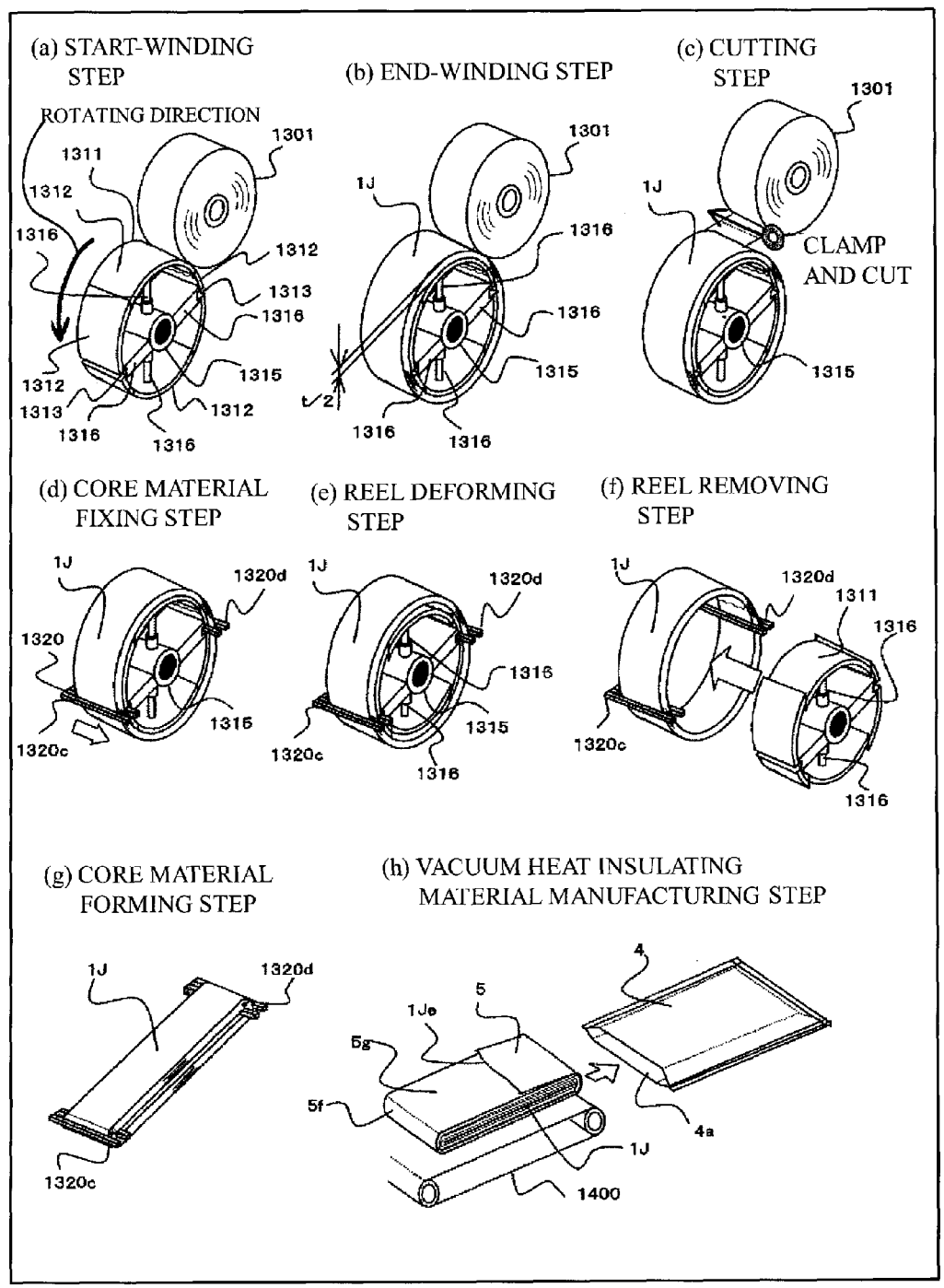
FIG. 9 shows the first embodiment and is a diagram showing a manufacturing method of the vacuum heat insulating material.

Next, based on FIG. 9, the manufacturing method of the vacuum heat insulating material 7 according to the present embodiment will be explained. FIG. 9 shows the first embodiment and shows the manufacturing method of the vacuum heat insulating material. In FIG. 9, (a) to (h) of FIG. 9 show processes of manufacturing the vacuum heat insulating material 7. (a) of FIG. 9 shows a start-winding step for starting winding up the continuous sheet-shaped fiber assembly 1J

(for example, the organic fiber assembly 1 produced by the continuous organic fiber 2, a non-woven cloth sheet) on the reel 1311. The original fabric roll 1301, being formed by winding up the continuous sheet-shaped fiber assembly 1J at a plurality of times and cut to have the predetermined width, and the reel 1311, having the predetermined width for winding up the continuous sheet-shaped fiber assembly 1J wound on the original fabric roll 1301, are provided. The original fabric roll 1301 and the reel 1311 are rotated, thereby starting winding up on the reel 1311 of the continuous sheet-shaped fiber assembly 1J wound on the original fabric roll 1301. This process is the start-winding step.

(b) of FIG. 9 is an end-winding step for finishing winding up after the continuous sheet-shaped fiber assembly 1J is wound up on the reel 1311 at the predetermined number of times R. At the start-winding step, the continuous sheet-shaped fiber assembly 1J is wound up on the reel 1311 from the original fabric roll 1301; at this time, a thickness a (not shown) of the continuous sheet-shaped fiber assembly 1J wound up on the reel 1311 becomes the thickness t/2 which corresponds to a half of the necessary predetermined thickness t of the core material 5. After winding up at the predetermined number of times R corresponding to the predetermined thickness a, the rotations of the original fabric roll 1301 and the reel 1311 halt, thereby finishing the winding up of the continuous sheet-shaped fiber assembly 1J. This process is the end-winding step.

(c) of FIG. 9 is a cutting step for cutting the continuous sheet-shaped fiber assembly 1J (for example, the organic fiber assembly 1). At the end-winding step, the continuous sheet-shaped fiber assembly 1J is wound up on the reel 1311, and when the number of times R of winding reaches the number corresponding to the thickness t/2 which is a half of the necessary predetermined thickness t of the core material 5, the rotations of the original fabric roll 1301 and the reel 1311 halt. The cutting step is a step for cutting the continuous sheet-shaped fiber assembly 1J at a predetermined position, which is a step for separating the original fabric roll 1301 from the reel 1311 by cutting the continuous sheet-shaped fiber assembly 1J at the predetermined cut position between the original fabric roll 1301 and the reel 1311 while being clamped at the front and back of the predetermined cut part.

Here, the substantially cylindrical continuous sheet-shaped fiber assembly 1J wound up on the reel 1311 is clamped and retained by the clamp members 1320 (the clamp members 1320c and 1320d) (refer to (d) of FIG. 9). At this time, in order not to disperse an end-winding end portion 1Je which is cut (the cut end face) of the continuous sheet-shaped fiber assembly 1J wound on the reel 1311, or in order to arrange the end-winding end portion 1Je (the cut end face) at the folding end portion 5f (namely, not to arrange at the flat part 5g) when the core material 5 is formed as shown in FIG. 5, it is preferable to cut the continuous sheet-shaped fiber assembly 1J at the position in the back of the position at which the continuous sheet-shaped fiber assembly 1J is clamped by the clamp member 1320 (for example, at directly after the clamped position).

(d) of FIG. 9 is a core material fixing step for clamping the substantially cylindrical continuous sheet-shaped fiber assembly 1J (for example, the organic fiber assembly 1) by the clamp member 1320. At the cutting step, the continuous sheet-shaped fiber assembly 1J is cut. Then, the clamp member 1320 is inserted into the clamp member setting part 1313 (the clamp member setting parts 1313c and 1313d) such as a concave part or a notch, etc. provided at the reel 1311. The neighborhood of the end-winding end portion 1Je (the cut end face) is clamped so as not to disperse or detach the end-winding end portion 1Je (the cut end face) of the continuous sheet-shaped fiber assembly 1J.

(e) of FIG. 9 is a reel deforming step for releasing the tensional force of the continuous sheet-shaped fiber assembly 1J wound up on the reel 1311 by moving/deforming at least one circumferential member (1312a, 1312b), out of a plurality of circumferential members (1312a to 1312d) provided at the reel 1311 in the circumferential direction, in the radial center direction. At the core material fixing step, the neighborhood of the end-winding end portion 1Je (the cut end face) is clamped. At the reel deforming step, while the continuous sheet-shaped fiber assembly 1J is wound up on the reel 1311 at the number of times R corresponding to the predetermined thickness (t/2) and is clamped by the clamp member 1320 (the clamp members 1320c and 1320d), at least one circumferential member (in the present embodiment, two circumferential members 1312a and 1312b facing in the radial direction) out of the plurality of circumferential members 1312 (the circumferential member 1312a to 1312d) of the reel 1311 is moved in the contracting direction toward the center side of radial direction of the reel 1311. That is, after the continuous sheet-shaped fiber assembly 1J is wound up on the reel 1311, the circumferential member retaining shafts 1316a and 1316b are moved in the contracting direction toward the center side of radial direction, thereby also moving the circumferential members 1312a and 1312b in the contracting direction toward the center side of radial direction.

Therefore, the circumferential members 1312a and 1312b are moved in the contracting direction toward the center side of radial direction, thereby releasing the tensional force of the continuous sheet-shaped fiber assembly 1J wound substantially cylindrically on the reel 1311 with the predetermined tensional force. The continuous sheet-shaped fiber assembly 1J wound substantially cylindrically can be easily taken off from the reel 1311 (the continuous sheet-shaped fiber assembly 1J clamped from the shaft core direction of the rotating shaft 1315 of the reel 1311 can be easily taken off). That is, the tensional force of the continuous sheet-shaped fiber assembly 1J (for example, the organic fiber assembly 1) which is wound on the reel 1311 with the predetermined tensional force is released, thereby easily taking off from the reel 1311 the continuous sheet-shaped fiber assembly 1J wound on the reel 1311.

(f) of FIG. 9 is a reel separating step for separating the reel from the substantially cylindrical continuous sheet-shaped fiber assembly 1J by taking off the reel 1311 from the continuous sheet-shaped fiber assembly 1J wound up on the reel 1311. At the reel deforming step, at least one circumferential member 1312 (the circumferential members 1312a and 1312b) of the reel 1311 is moved/deformed in the center side of radial direction, thereby releasing the tensional force caused by the winding of the continuous sheet-shaped fiber assembly 1J wound on the reel 1311. At the reel separating step, the substantially cylindrical continuous sheet-shaped fiber assembly 1J of which the tensional force is released is taken off from the reel 1311 in the shaft center direction of the rotating shaft 1315. In another way, the reel 1311 also can be taken off from the substantially cylindrical continuous sheet-shaped fiber assembly 1J while being clamped.

(g) of FIG. 9 is a core material forming step for forming the flat core material 5 by pulling the substantially cylindrical continuous sheet-shaped fiber assembly 1J removed from the reel 1311 with the clamp members 1320 (the clamp members 1320c and 1320d) which are forming members in the substantially opposite directions (inverse directions). At the reel separating step, the continuous sheet-shaped fiber assembly 1J is separated from the reel 1311 while being clamped by the clamp members 1320 which are the forming members. At the core material forming step, the substantially cylindrical continuous sheet-shaped fiber assembly 1J, taken off from the reel 1311 while being clamped by the two clamp members 1320c and 1320d, is pulled by the two clamp members 1320c and 1320d to the opposite sides of the substantially straight line direction, that is, pulled in the inverse directions. The substantially cylindrical continuous sheet-shaped fiber assembly 1J is folded at the positions clamped by the clamp members 1320 which are the forming members, thereby forming the flat (sheet-shaped) core material 5 having the folding end portions 5f and the flat part 1311g. The core material 5 structured by the continuous sheet-shaped fiber assembly 1J formed in a flat plate shape by the clamp members 1320 which are the forming members is transferred to a conveyer 1400 while being clamped by the two clamp members 1320 at the folding end portions 5f. Then, the core material 5 is formed by removing the clamp members 1320. That is, the continuous sheet-shaped fiber assembly 1J (for example, the organic fiber assembly 1) made by continuous fiber (for example, the organic fiber 2) and continuously flat (sheet-shaped) is wound continuously from the inside toward the outside, the flat core material 5 is formed and produced, and moved on the conveyer 1400.

(h) of FIG. 9 is a vacuum heat insulating material manufacturing step for manufacturing the vacuum heat insulating material 7 by inserting the core material 5 formed on the conveyer 1400 into a gas-barrier outer cover material 4, which has an opening part 4a at one end, decompressing the inside and sealing substantially hermetically. The core material 5, which is made by laminating a plurality of layers of the continuous sheet-shaped fiber assembly 1J and winding up continuously from the inside toward the outside to form in a flat plate shape, is inserted into the gas-barrier outer cover material 4 at least one end of which has the opening part 4a. The core material 5 inserted in the gas-barrier outer cover material 4 is carried into a vacuum furnace. A sealing part (for example, the opening part 4a) of the outer cover material 4 is heat-sealed in a substantially vacuum state, and the vacuum heat insulating material 7 is completed.

Here, since the circumferential member 1312 of the reel 1311 forms a substantially continuous cylindrical shape in the winding direction (in a circumferential direction, a rotational direction), the tensional force caused by the winding when the continuous sheet-shaped fiber assembly 1J is wound up on the reel 1311 becomes substantially uniform in the winding direction (in the circumferential direction), and at the time of winding, there occurs no damage nor cut off on the continuous sheet-shaped fiber assembly 1J, thereby obtaining the core material 5 and the vacuum heat insulating material 7 with high reliability.

In the present embodiment, although the circumferential member 1312 which forms the substantially continuous cylindrical shape in the winding direction (in the circumferential direction) is used for the reel 1311, the shape is not necessarily the substantially cylindrical shape, but can be polygonal (octagonal, hexagonal, flat-plate shaped, etc.).

Figure 10:
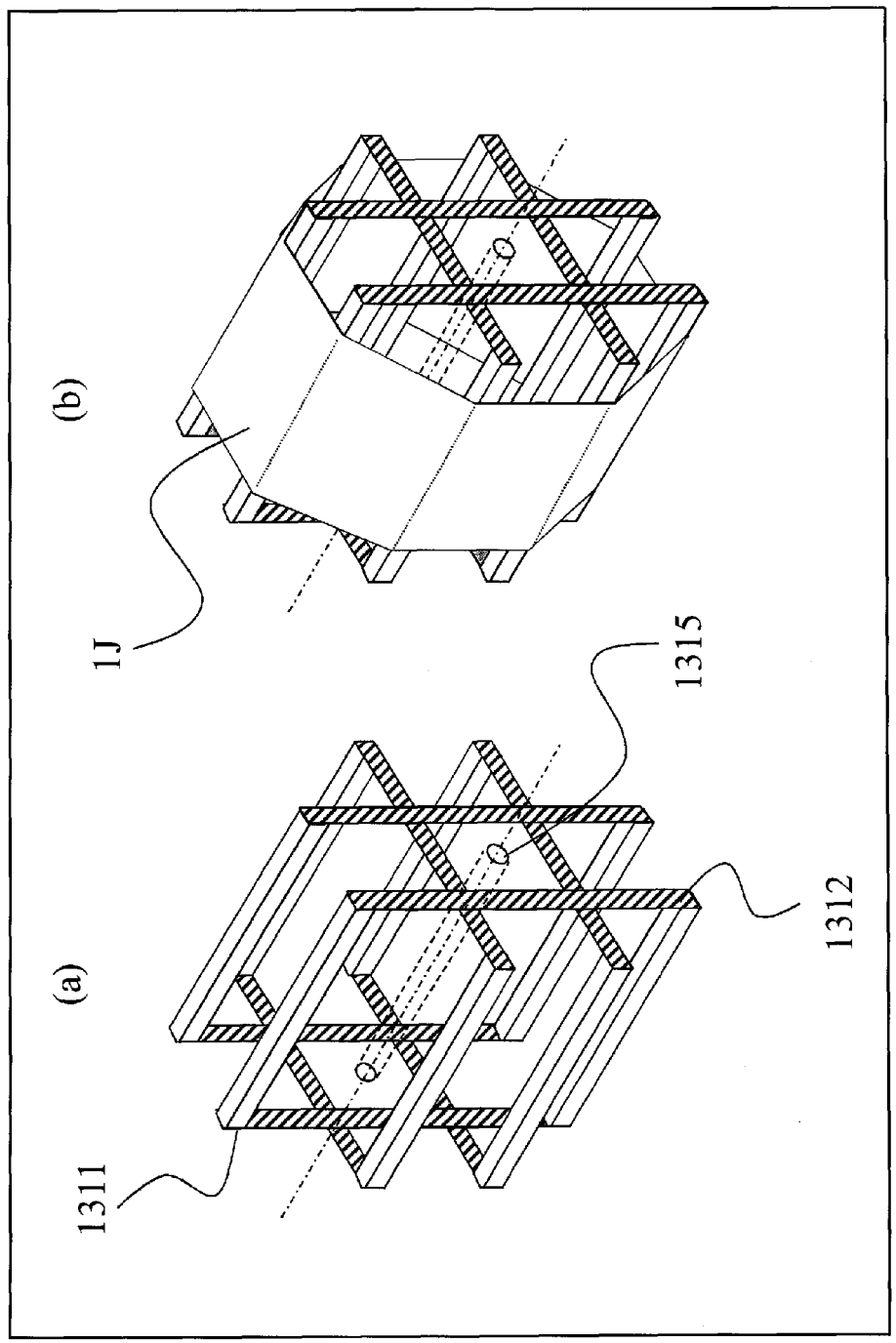
FIG. 10 shows the first embodiment and is a pattern diagram showing another reel.

FIG. 10 shows the first embodiment and is a pattern diagram showing another reel. In FIG. 10, (a) shows an example of an octagonal reel, and (b) shows a state in which the continuous sheet-shaped fiber assembly 1J is wound up on the octagonal reel. As shown in the figure, the circumferential member 1312 is not necessarily continuous in the winding direction (in the circumferential direction). In FIG. 10, the reel 1311 is provided with rod-shaped (for example, a prism or a column) circumferential members 1312 in the circumferential direction at eight positions with a substantially equal interval, and the reel 1311 rotates around the rotating shaft 1315, thereby winding up the continuous sheet-shaped fiber assembly 1J from the original fabric roll 1301. As shown in FIG. 10, for example, when a plurality of (for example, eight) circumferential members 1312 are not continuous in the winding direction, it becomes possible to clamp the continuous sheet-shaped fiber assembly 1J which is wound up on the reel 1311 by inserting the clamp member 1320 (refer to FIG. 8, not shown in FIG. 10) between the plurality of circumferential members 1312 (space between the circumferential member 1312 and the circumferential member 1312) which are prismatic or columnar, etc. provided with substantially equal intervals in the winding direction. The clamp member setting part 1313 is unnecessary, and thereby the light, simple-structured, and low-cost reel 1311 can be obtained.

In the present embodiment, the original fabric roll 1301 of the long fibered non-woven cloth obtained by continuously winding up on the substantially cylindrical original fabric roller 1302 the continuous sheet-shaped fiber assembly 1J made by the continuous organic fiber 2, and the reel 1311 having the predetermined width, which is provided separately with the original fabric roll 1301, for winding up the continuous sheet-shaped fiber assembly 1J of the long fibered non-woven cloth of the original fabric roll 1301 are provided. The continuous sheet-shaped fiber assembly 1J (for example, the organic fiber assembly 1), wound on the original fabric roller 1302, is wound on the reel 1311 at the predetermined number of times R (corresponding to the thickness t/2 which is a half of the necessary predetermined thickness t of the core material 5). The continuous sheet-shaped fiber assembly 1J is laminated with the necessary predetermined thickness t of the core material 5. Thus it is not necessary to laminate the non-woven cloth sheet (fiber assembly) which is cut into the predetermined size (the width or the length) sheet by sheet, and the core material 5 can be simply manufactured by inexpensive manufacturing equipment with a low cost.

That is, the core material 5 is formed in a flat plate shape by winding up the continuous sheet-shaped fiber assembly 1J (for example, the organic fiber assembly 1) formed by continuous fiber (for example, the organic fiber 2) continuously from the inside toward the outside. Out of four end faces of the core material 5, which is substantially rectangular and flat-plate-shaped, end portions in the length direction (the folding end portion 5f) are formed by folding (bending) the continuous sheet. Since the two folding end portions 5f to which the folding processing is done (bending processing) are not the portions where the end faces thereof are cut off, the organic fiber 2 is not protruded from the folding end portions 5f, and cutting the end faces is unnecessary since the end faces are not ragged. Further, the cutting part (region) is reduced, thereby obtaining the core material 5 and vacuum heat insulating material 7 which can be easily processed with a low cost. Further, when the original fabric roll 1301 is used by cutting into the necessary predetermined width, out of four end faces of the substantially rectangular flat core material 5, two end faces in the width direction correspond to the end faces in the width direction of the core material 5. That is, the two end faces of the core material 5 in the width direction have been previously cut into the predetermined width in the form of the original fabric roll 1301. The cutting after forming as the core material 5 is unnecessary, and thus the manufacturing line of the core material 5 is simplified, thereby obtaining the core material 5 and vacuum heat insulating material 7 with a low cost.

Further, since the fiber does not protrude from the end face of the core material 5, or the end face is not ragged, it becomes unnecessary to cut the end face. Further, it is possible to avoid damaging sealability of the sealing part of the outer cover material 4 caused by the protrusion of the remaining fiber from the cut end face which may occur when the fiber length of the remaining fiber is shortened by cutting the end face.

Figure 24:
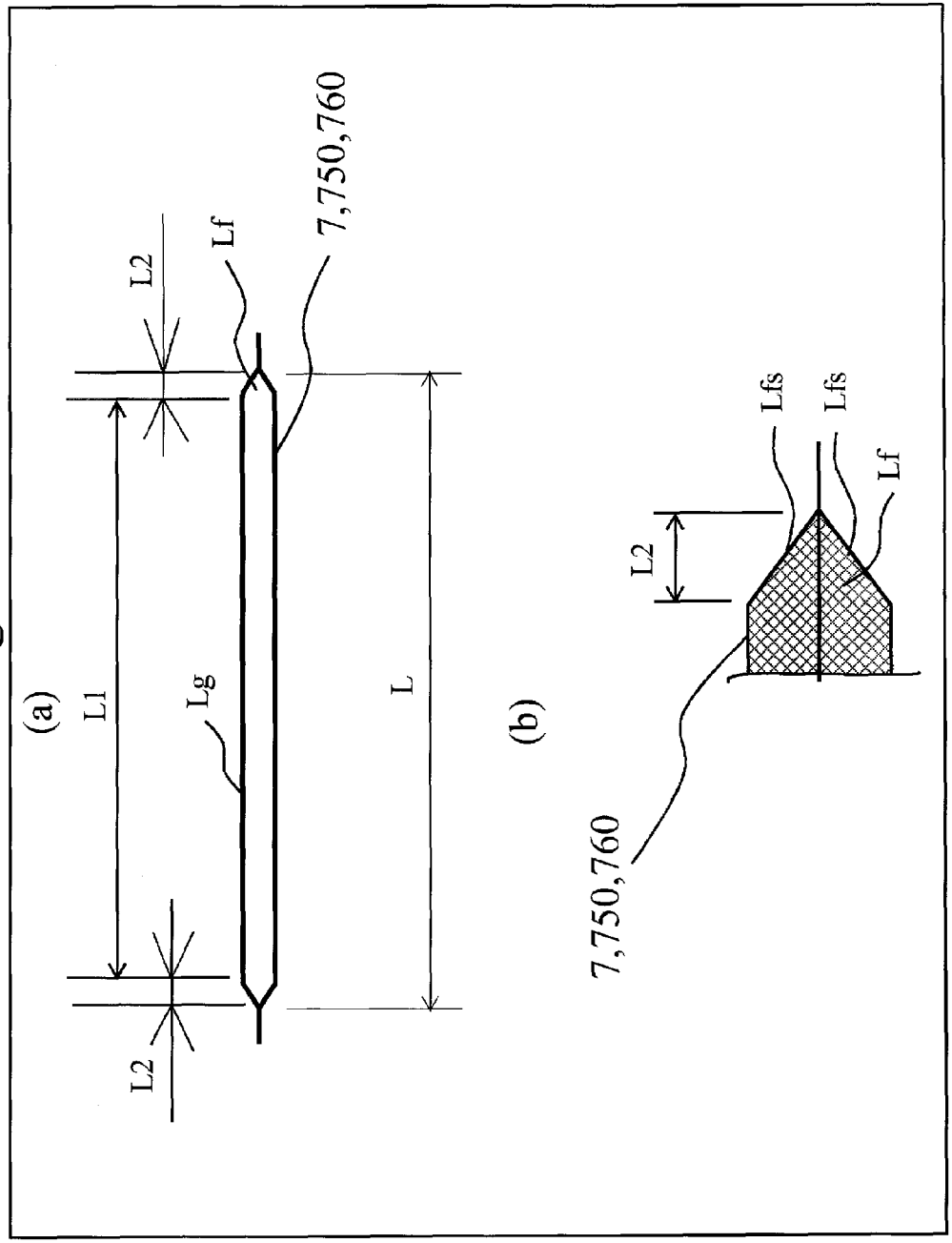
FIG. 24 shows the first embodiment and is a pattern diagram showing a shape of the vacuum heat insulating material.

Further, as shown in FIG. 24, when the core material 5, 550, or 560 laminated by continuously winding up from the inside toward the outside to form in a flat plate shape is used for the vacuum heat insulating material 7, 750, or 760, a shape of the cross section in the length direction (a cross section at right angles to the width direction) of the end portion in the length direction (the folding end portion 5f) of the core material 5 becomes substantially triangular. FIG. 24 shows the first embodiment and is a pattern diagram showing a shape of the vacuum heat insulating material. (a) of FIG. 24 is a view of the cross section in the length direction (a cross section at right angles to the width direction) of the vacuum heat insulating material 7, 750, or 750, and (b) of FIG. 24 is a main part front view of the end portion in the length direction of the vacuum heat insulating material 7, 750, or 760 which is viewed from the direction at right angles to the length direction.

In FIG. 24, when the core material 5 laminated by continuously winding up from the inside toward the outside to form in a flat plate shape is used for the vacuum heat insulating material 7, 750, or 760, the vacuum heat insulating material is constituted by a flat smooth part Lg (a part of a length L1) and both end portions Lf (parts of a length L2) having a substantially triangular cross section in the length direction. At this time, the both end portions (the folding end portions 5f) of the core material 5 in the length direction are inserted into the outer cover material 4, and the outer cover material 4 is decompressed and sealed in that state. The cross sectional shape (the cross sectional shape being at right angles (vertical) to the width direction) of the both end portions Lf in the length direction, of which the thickness is gradually reduced toward the outside direction with respect to the length direction, that is, the cross sectional shape in the length direction (the cross sectional shape being at right angles (vertical) to the width direction) becomes a substantially triangular shape. Thus the outer cover material 4 is hardly shrunk, or hardly broken, thereby obtaining the highly reliable vacuum heat insulating material. Namely, the vacuum heat insulating material includes the core material 5 of the laminated structure formed in a flat plate shape by winding up the sheet-shaped fiber assembly which has the predetermined width and is continuous in the length direction from the inside toward the outside; and the gas-barrier outer cover material 4 which contains the core material 5 inserted from the opening part 4a to the inside, and while the inside is decompressed, the opening part 4a is sealed. The vacuum heat insulting material is obtained, of which, while the core material 5 is decompressed in the outer cover material 4, the cross sectional shape being at right angles to the width direction of the end portions in the length direction of the core material 5 (the folding end portions 5f which are both end portions in the length direction) is the substantially triangular shape, in which the thickness is gradually reduced toward the outside in the length direction. Further, when one vacuum heat insulating material 7, 750, or 760 is processed by folding to be cylindrical, when the end faces in the length direction are faced with each other to use connectedly, when the end faces of a plurality of vacuum heat insulating materials 7, 750, or 760, the number of which is two or over, are faced to use, slope face parts (slope face part Lfs of FIG. 24) of the substantially triangular end face of the plurality of vacuum heat insulating materials 7, 750, or 760 are connected so as to be contacted each other. It is possible to reduce a jointing thickness of contacting parts, further to decrease heat leakage from the contacting parts, thereby obtaining the vacuum heat insulating material 7, 750, or 760 with high performance, and equipment such as the refrigerator, etc. which mounts the vacuum heat insulating material 7, 750, or 760.

(Laminating Method of Fiber Assembly, Manufacturing Method 3 of Core Material)

Figure 11:
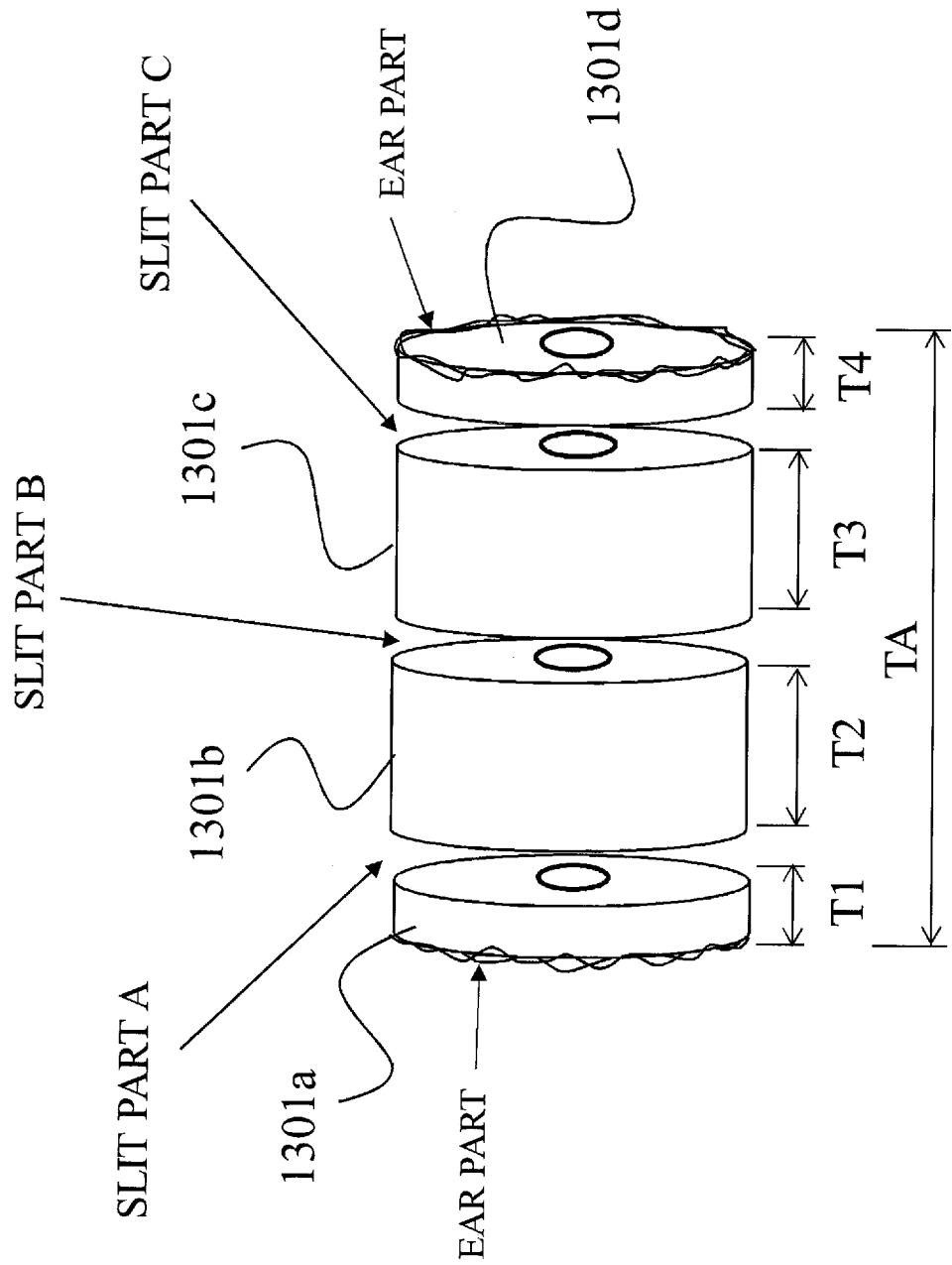
FIG. 11 shows the first embodiment and is a diagram showing a structure of a combined original fabric roll having a large width made by combining a plurality of original fabric rolls.
Figure 12:
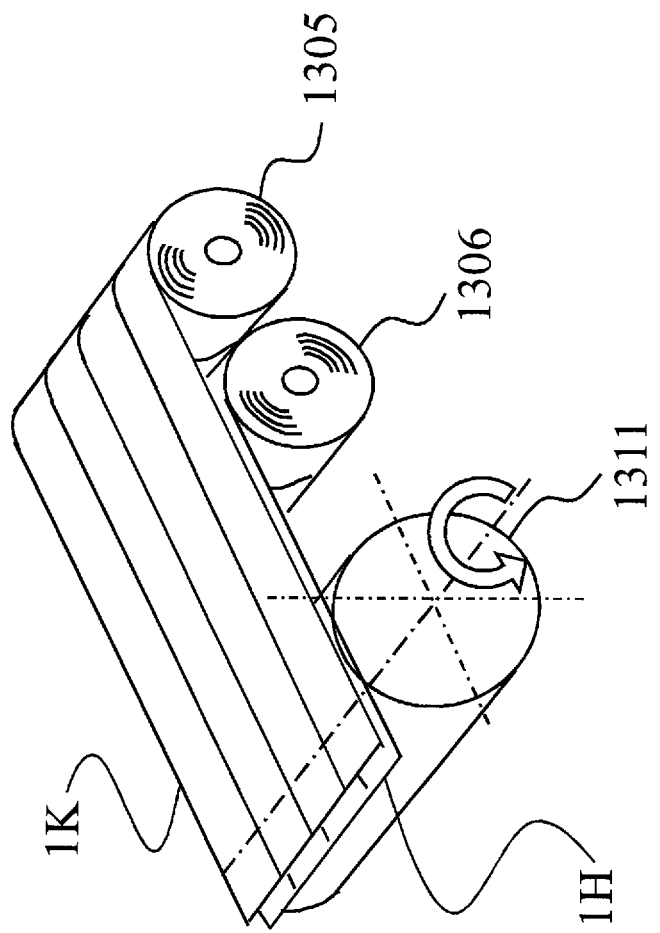
FIG. 12 shows the first embodiment and is a pattern diagram of a winding device when the winding device uses two combined original fabric rolls and winds up the combined original rolls on a reel.
Figure 13:
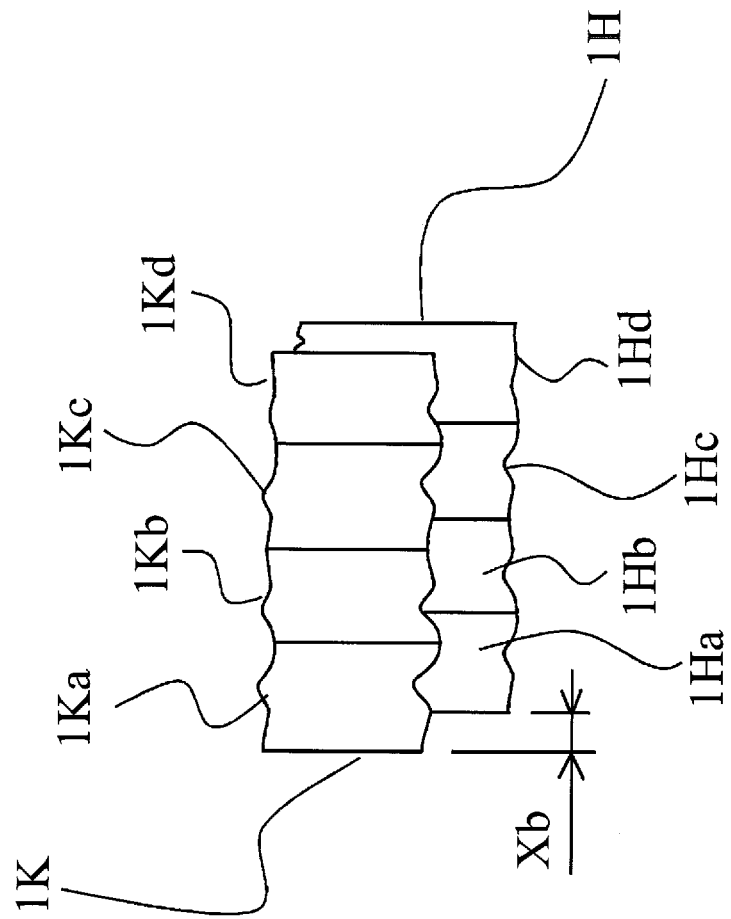
FIG. 13 shows the first embodiment and is a pattern diagram showing a structure of an organic fiber assembly wound by the winding device using two combined original fabric rolls (the upper side original fabric roll and the lower side original fabric roll).
Figure 14:
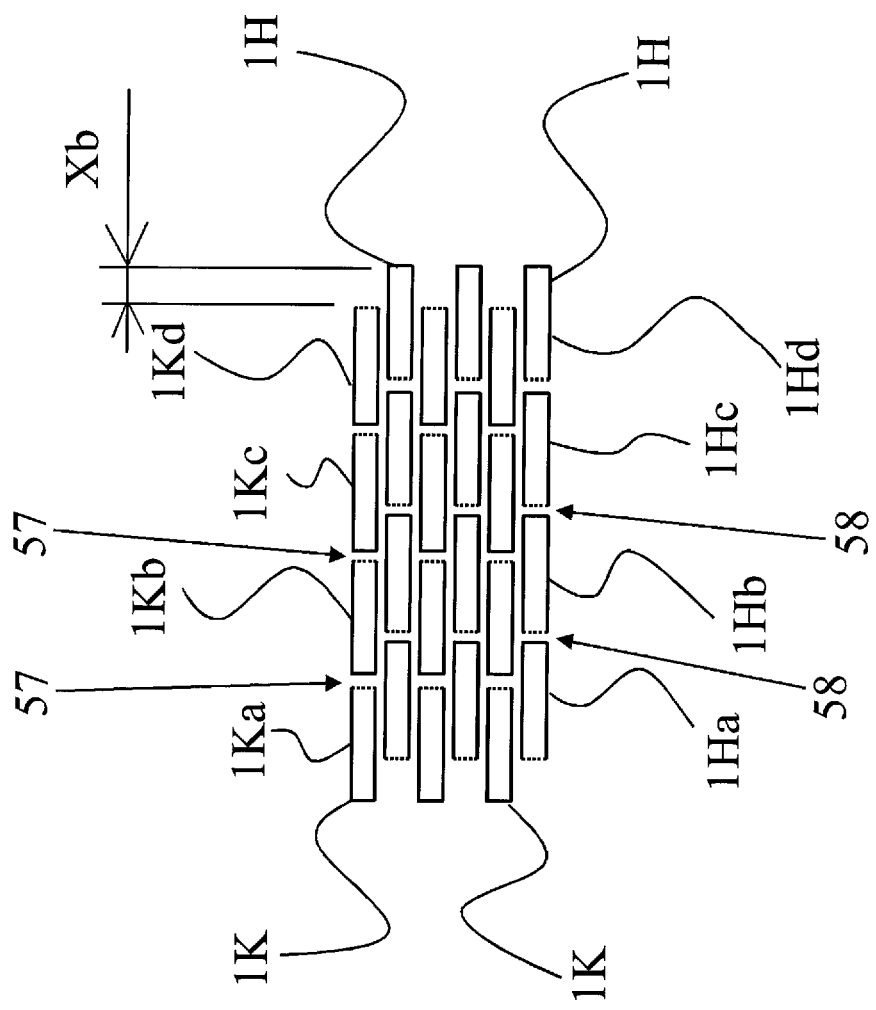
FIG. 14 shows the first embodiment and is a cross sectional view of the core material wound by the winding device using two combined original fabric rolls.

Next, a manufacturing method of the core material 5 by combining a plurality of original fabric rolls 1301 will be explained. FIGS. 11 through 14 show the first embodiment. FIG. 11 is a diagram showing a structure of a combined original fabric roll having a large width made by combining a plurality of the original fabric rolls. FIG. 12 is a pattern diagram showing a structure of a winding device when the winding device uses two combined original fabric rolls for winding up on a reel. FIG. 13 is a pattern diagram showing a structure of the organic fiber assembly wound up by the winding device using two combined original fabric rolls (the upper side original fabric roll and the lower side original fabric roll). FIG. 14 is a cross sectional view of the core material wound up by the winding device using two combined original fabric rolls.

For example, a plurality of original fabric rolls (for example, a main body part A 1301a, a main body part B 1301b, a main body part C 1301c, a main body part D 1301d) being wound up at substantially the same number of windings (the same number of laminated sheets) should be combined so as to be next to each other (without a gap, preferably; a predetermined gap may be provided as will be discussed later if the gap is necessary) in the width direction (the lateral direction), and the first original fabric roll 1305 (the upper side roll) having the predetermined width is produced. Further, similar to the first original fabric roll 1305, a plurality of original fabric rolls (for example, a main body part E 1301e, a main body part F 1301f, a main body part G 1301g, a main body part H 1301h, all not shown) being wound up at substantially the same number of windings (the same number of laminated sheets) should be combined so as to be next to each other (without a gap, preferably; a predetermined gap may be provided) in the width direction (the lateral direction), and the second original fabric roll 1306 (the lower side roll) having the predetermined width is produced.

Here, the widths of a plurality of original fabric rolls (for example, the main body part A 1301a, the main body part B 1301b, the main body part C 1301c, and the main body part D 1301d) can be the same or different. In the same manner, the widths of a plurality of original fabric rolls (for example, the main body part E 1301e, the main body part F 1301f, the main body part G 1301g, the main body part H 1301h, all not shown) can be the same or different. The number of the plurality of original fabric rolls used for the first original fabric roll 1305 and the number of the plurality of original fabric rolls used for the second original fabric roll 1306 can be the same or different.

As for both of the first original fabric roll 1305 and the second original fabric roll 1306, the plurality of original fabric rolls (for example, the plurality of main body parts) are aligned in the width direction so as to be next to each other. There exists a gap (a minute gap, a predetermined gap) between the neighboring main body parts (for example, the main body part A 1301a and the main body part B 1301b, etc.), and the neighboring main body parts (for example, the main body part A 1301a and the main body part B 1301b, etc.) are not continuous but discontinuous; that is, there exists a slit portion (for example, a slit portion A between the main body part A 1301a and the main body part B 1301b, a slit portion B between the main body part B 1301b and the main body part C 1301c, a slit portion C between the main body part C 1301c and the main body part D 1301*d*, etc.). Further, in the present embodiment, at least one of the first original fabric roll 1305 and the second original fabric roll 1306 includes an ear part original fabric roll having an ear part with a ragged ridge line which is generated at the time of cutting the original fabric roll material into the predetermined width is used for the original fabric roll (for example, the main body part A 1301*a* or the main body part D 1301*d*, the main body part E 1301*e* or the main body part H 1301*h*, etc.) arranged at the end side in the width direction of the plurality of original fabric rolls (refer to FIG. 11).

In the present embodiment, the number of the plurality of original fabric rolls (four including the main body part A 1301*a*, the main body part B 1301*b*, the main body part C 1301*c*, and the main body part D 1301*d*) used for the first original fabric roll 1305 is made the same as the number of the plurality of original fabric rolls (four including the main body part E 1301*e*, the main body part F 1301*f*, the main body part G 1301*g*, and the main body part H 1301*h*) used for the second original fabric roll 306. Further, the plurality of original fabric rolls (the main body part A 1301*a*, the main body part B 1301*b*, the main body part C 1301*c*, and the main body part D 1301*d*) used for the first original fabric roll 1305 and a plurality of original fabric rolls (the main body part E 1301*e*, the main body part F 1301*f*, the main body part G 1301*g*, and the main body part H 1301*h*) used for the second original fabric roll 1306 are arranged while being displaced in the width direction by a predetermined amount Xb (refer to FIG. 14). The first (organic) fiber assembly 1K wound on the first original fabric roll 1305 and the second (organic) fiber assembly 1H wound on the second original fabric roll 1306 are wound up together on the reel 1311 so as to be overlapped vertically (at substantially right angles to the sheet face) while being displaced in the width direction of the sheet face by the predetermined amount Xb. For example, the first (organic) fiber assembly 1K can be the organic fiber assembly, or can be another fiber assembly (for example, the inorganic fiber assembly). The same can be said for the second (organic) fiber assembly 1H. At this time, the first original fabric roll 1305 and the second original fabric roll 1306 are arranged in the longitudinal direction, the vertical direction, or the oblique direction with respect to the moving direction (winding up direction)) of the first (organic) fiber assembly 1K and the second (organic) fiber assembly 1H. The widths of the plurality of original fabric rolls of the second original fabric roll 1306 corresponding to the plurality of original fabric rolls of the first original fabric roll 1305 are made substantially the same and arranged while being displaced by the predetermined amount Xb.

That is, the widths of respective original fabric rolls (for example, the main body part A 1301*a*) which constitute the first original fabric roll 1305 and respective original fabric rolls (for example, the main body part E 1301*e*) which constitute the second original fabric roll 1306 arranged in the back of (or below, etc.) the first original fabric roll 1305 are made substantially the same. In the same manner, the respective original fabric rolls (the main body part B 1301*b* and the main body part F 1301*f*, the main body part C 1301*c* and the main body part G 1301*g*, the main body part D 1301*d* and the main body part H 1301*h*) are set to have substantially the same width. However, the predetermined width of the first original fabric roll 1305 (the upper roll) is preferably the same with the predetermined width of the second original fabric roll 1306 (the lower side roll).

Further, in the present embodiment, as shown in FIG. 12, as for the arrangement of the first original fabric roll 1305 (the upper side roll) and the second original fabric roll 1306 (the lower side roll) of the manufacturing apparatus of the core material, the first original fabric roll 1305 (the upper roll) is arranged in the backward side (or the upper side or the upper oblique side, etc.) to the second original fabric roll 1306 (the lower side roll) in the direction of the reel 1311 (the feeding direction of the continuous sheet-shaped fiber assembly 1J). That is, toward the direction of the reel 1311, the second original fabric roll 1306 (the lower side roll) and the first original fabric roll 1305 (the upper side roll) are arranged in order. At this time, the first (organic) fiber assembly 1K wound on the first original fabric roll 1305 (the upper side roll) is arranged at the upper side to the second (organic) fiber assembly 1H wound on the second original fabric roll 1306 (the lower side roll). Since they are wound up on the reel 1311, the first (organic) fiber assembly 1K wound on the first original fabric roll 1305 (the upper side roll) is wound up so that the first (organic) fiber assembly 1K should be always located outside the second (organic) fiber assembly 1H wound on the second original fabric roll 1306 (the lower side roll) in the radial direction of the reel 1311. Here, the first original fabric roll 1305 (the upper side roll) and the second original fabric roll 1306 (the lower side roll) are arranged so that the first (organic) fiber assembly 1K and the second (organic) fiber assembly 1H are vertically overlapped and wound up on the reel 1311.

Here, when a predetermined width which is necessary for the product is small (for example, around 100 mm or 200 mm), it is easy to manufacture the original fabric roll (the first original fabric roll 1305 (the upper side roll), the second original fabric roll 1306 (the lower side roll), etc.), since the manufacturing does not require a large space. On the contrary, when a predetermined width which is necessary for the product is large (for example, 1100 mm or 2000 mm, etc.), it becomes difficult to manufacture the original fabric roll (the first original fabric roll 1305 (the upper side roll), the second original fabric roll 1306 (the lower side roll), etc.). Further, some product requires the vacuum heat insulating material 7 having different width. In such a case, if it is dealt with only one original fabric roll, a number, which corresponds to the number of necessary predetermined widths, of the original fabric rolls is required. Not only manufacturing the original fabric rolls is difficult, but also the number of types of the original fabric rolls is increased, which increases the manufacturing cost. Therefore, in the present embodiment, a plurality of original fabric rolls are combined so as to be next to each other in the width direction, and used as the combined roll (for example, the first original fabric roll 1305 or the second original fabric roll 1306).

Like the present embodiment, if the original fabric rolls (for example, the main body part A 1301*a*, the main body part B 1301*b*, the main body part C 1301*c*, and the main body part D 1301*d*) having a plurality of widths (different widths) are arranged so as to be next to each other in the width direction to form one original fabric roll (for example, the first original fabric roll 1305) having the large width for use, the width of respective original fabric rolls can be small. It is possible to easily manufacture the original fabric roll (for example, the main body part A 1301*a* and the main body part B 1301*b*, etc.) without much considering about the manufacturing place. Moreover, when the original fabric roll having a large width is required, one original fabric roll having the large width (for example, the first original fabric roll 1305, the second original fabric roll 1306, etc.) can be produced by combining a plurality of original fabric rolls having the small width. Thus, the manufacturing place of the original fabric roll can be anywhere, and the number of types of the original fabric rolls can be reduced, thereby obtaining the core material 5 and the vacuum heat insulating material 7 having a large degree of freedom with a low cost. For example, one original fabric roll having the large width can be produced by combining a plurality of original fabric rolls with different widths (the main body part A 1301a, the main body part B 1301b, etc.), or by combining a plurality of small original fabric rolls with the substantially same widths (for example, one original fabric roll with the same width such as the main body part B 1301b, etc.).

Further, in the present embodiment, the first (organic) fiber assembly 1K wound on the first original fabric roll 1305 (the upper roll) which is the combined original fabric roll constituted by the plurality of original fabric rolls (for example, the main body part A 1301a, the main body part B 1301b, the main body part C 1301c, and the main body part D 1301d) and the second (organic) fiber assembly 1H wound on the second original fabric roll 1306 (the lower roll) which is the combined original fabric roll constituted by the plurality of original fabric rolls (for example, the main body part E 1301e, the main body part F 1301f, the main body part G 1301g, and the main body part H 1301h) are arranged while being displaced by predetermined amount Xb (for example, around 5 mm to 40 mm, preferably 10 mm to 20 mm) in the width direction (the lateral direction) because of the following.

(1) For example, out of the plurality of original fabric rolls (the main body part A 1301a, the main body part B 1301b, the main body part C 1301c, and the main body part D 1301d) which constitute the first original fabric roll 1305, in the connecting region of the original fabric rolls (for example, the main body part A 1301a, the main body part B 1301b, etc.) which are located next to each other in the width direction, there actually exists a slight gap or even if there exists no gap, the neighboring region includes a slit portion (for example, a slit portion A between the main body part of A and the main body part of B) and is not continuous. If the plurality of sheets of the first (organic) fiber assembly 1 and the second (organic) fiber assembly 1H are laminated without being displaced by the predetermined amount Xb, the slit portions (a connecting part, a neighboring part) are located in the substantially same position, and thus the lamination may be divided by the slit portions. That is, since the lamination is not continuous at the slit portion (the connecting part, the neighboring part) and may be bended or broken at the slit portion, bending strength which is necessary for the core material 5 cannot be obtained. The lamination is not continuous but slit at the slit portion (the neighboring part), and the lamination may be torn to cause to break the outer cover material 4 and so on, which prevents obtaining the core material 5 with the necessary width, and further the performance of the vacuum heat insulating material 7. In the present embodiment, the plurality of layers of the first original fabric roll 1305 and the second original fabric roll 1306 are laminated so that the second original fabric roll 1306 (the lower roll) is displaced with respect to the first original fabric roll 1305 (the upper roll) by the predetermined amount Xb. Thus, the lamination is not torn or divided by friction, etc. generated at the displaced part of the predetermined amount Xb at the slit portion (a neighboring region), thereby obtaining the core material 5 of the necessary predetermined size having the necessary heat insulating performance.

(2) Although the first original fabric roll 1305 (the upper roll) and the second original fabric roll 1306 (the lower roll) are lapped while being displaced by the predetermined amount Xb at the neighboring region, because the slit portion (the neighboring region) exists, the first (organic) fiber assembly 1K and the second (organic) fiber assembly 1H are not continuous on the same plane. Therefore, the slit portion is easily bendable. In the conventional vacuum heat insulating material, a specific processing is provided to implement a concave groove formation, etc. for folding, which increases the manufacturing cost. On the contrary, in the present embodiment, the neighboring region (the slit portion) is form to be easily foldable in the manufacturing process, and the easily foldable region is effectively used by arranging at a region which is necessary to be folded. For example, in case of a refrigerator, it is considered that the vacuum heat insulating material 7 is provided by bridging between a rear face wall and a top face wall, etc. which are arranged with a predetermined angle (substantially 90 degrees, for example). In such a case, a large vacuum heat insulating material 7 is necessary, and moreover, the vacuum heat insulating material 7 needs to be foldable. Therefore, a large facility for manufacturing the original fabric roll material is necessary, which limits the manufacturing place, and the manufacturing is difficult. The specific processing for folding is necessary, which increases the cost, and the dealing is difficult. As for the vacuum heat insulating material 7 of the present embodiment, it is possible to use a plurality of original fabric rolls as one large original fabric roll by arranging the plurality of original fabric rolls so as to be next to each other in the width direction, and moreover, it is sufficient to arrange the slit portion (the neighboring part) at a region which is necessary to be folded. The width of the original fabric roll can be selected freely by combining the original fabric rolls having the small width, and further, the specific processing to folding is unnecessary. Further, the core material 5 having a large width can be produced by combining a plurality of original fabric rolls having a small width. Thus, it becomes possible to dispose the vacuum heat insulating material 7 to the walls arranged with the predetermined angle of the refrigerator, etc. by bridging the walls to which it has been difficult to dispose the vacuum heat insulating material conventionally.

(3) End portions of both sides in the width direction of the original fabric roll material before cutting both ends in the width direction are called as ear parts, in which sufficient amount of fiber of the organic fiber assembly 1 or the continuous sheet-shaped fiber assembly 1J may not exist for the necessary thickness, the thickness may be uneven, and the ridge line of the end face in the width direction may be ragged. When used as the original fabric roll, the both sides of the original fabric roll material are previously cut off into the necessary predetermined width for using as the original fabric roll. Therefore, an ear part original fabric roll which has been cut off from the ear part of the both sides in the width direction of the original fabric roll material has weak strength and a ragged end face (the ridge line), which has been disposed of conventionally. In the present embodiment, the ear part original fabric roll which has been conventionally disposed of (in the present embodiment, for example, it corresponds to the main body part A 1301a or the main body part D 1301d) is used for the original fabric roll (for example, the main body part A 1301a or the main body part D 1301d, etc.) used for the both sides in the width direction among the plurality of original fabric rolls which constitute the first original fabric roll 1305 or the second original fabric roll 1306 as shown in FIG. 11. Since the plurality of layers of the first original fabric roll 1305 and the second original fabric roll 1306 are laminated while being displaced by the predetermined amount Xb, the ear part and the part which is not the ear part are alternatively laminated, positions of the ear parts are arranged while being displaced, and the ear parts are never laminated consecutively. Accordingly, even if the ear part original fabric roll is used, the strength necessary for the core material 5 can be obtained.

Here, as shown in FIG. 11, in the first original fabric roll 1305, the main body part A 1301a, the main body part B 1301b, the main body part C 1301c, and the main body part D 1301d are arranged so as to be next to each other in the width direction. Here, the widths of the main body part A 1301a, the main body part B 1301b, the main body part C 1301c, and the main body part D 1301d are respectively T1, T2, T3, and T4, and the width of the first original fabric roll 1305 becomes TA (TA=T1+T2+T3+T4). Therefore, the width of respective original fabric rolls (T1, T2, T3, and T4) of the first original fabric roll 1305 can be decided according to the predetermined width necessary for the product. In the same manner, the widths of respective original fabric rolls of the second original fabric roll 1306 can be decided. That is, the widths of the main body part A 1301a, the main body part B 1301b, the main body part C 1301c, and the main body part D 1301d (the widths of the main body part E 1301e, the main body part F 1301f, the main body part G 1301g, and the main body part H 1301h) can be decided. At this time, the widths T1, T2, T3, and T4 can be the same or different.

Therefore, the widths of the plurality of original fabric rolls (for example, the main body part A 1301a, the main body part B 1301b, the main body part C 1301c, the main body part D 1301d, the main body part E 1301e, the main body part F 1301f, the main body part G 1301g, and the main body part H 1301h) can be appropriately selected respectively, and the degree of freedom of designing is increased, thereby obtaining the low-cost core material 5, the vacuum heat insulating material 7, and the equipment such as the refrigerator, etc. Further, since the core material 5 is manufactured by winding up the first original fabric roll 1305 and the second original fabric roll 1306 on the reel 1311 while being displaced by the predetermined amount Xb, the folding can be easily done at the slit portion. Thus, it is easy to manufacture the foldable vacuum heat insulating material 7 without specific processing, etc., and it is easy to provide the vacuum heat insulating material 7 at the heat insulating wall of the equipment such as a refrigerator, etc. having the heat insulating wall face which is curved with a predetermined angle. The coverage of the vacuum heat insulating material 7 can be increased, and the vacuum heat insulating material and the equipment with a high performance and a low cost can be obtained.

As shown in FIG. 13, when the continuous sheet-shaped fiber assembly 1J is wound up on the reel 1311, the first (organic) fiber assembly 1K (the first (organic) fiber assemblies 1Ka to 1Kd, the upper side organic fiber assembly) from the first original fabric roll 1305 (the upper side roll) and the second (organic) fiber assembly 1H (the second (organic) fiber assemblies 1Ha to 1hd, the lower side the organic fiber assembly) from the second original fabric roll 1306 (the lower side roll) are wound up on the reel 1311 while being displaced by the predetermined amount Xb. At the cross section vertical to the winding direction, the first (organic) fiber assembly 1K and the second (organic) fiber assembly 1H wound on the reel 1311 are alternatively laminated while being displaced by the predetermined amount Xb as shown in FIG. 14. The lamination is done by winding up continuously from the inside toward the outside. Therefore, since the first (organic) fiber assembly 1K and the second (organic) fiber assembly 1H are displaced by the predetermined amount Xb, the distance between the first slit portion 57 (the upper side slit portion) of the first (organic) fiber assembly 1K (the upper side organic fiber assembly) and the second slit portion 58 (the lower side slit portion) of the second (organic) fiber assembly 1H (the lower side the organic fiber assembly) corresponds to the displaced amount Xb. The first (organic) fiber assembly 1K and the second (organic) fiber assembly 1H are overlapped and laminated with the amount of Xb. Thus, it is difficult to separate the first (organic) fiber assembly 1K from the second (organic) fiber assembly 1H because of friction, etc.

Here, the core material 5 made by laminating the plurality of layers of the organic fiber assembly 1 (the continuous sheet-shaped fiber assembly 1J, the first (organic) fiber assembly 1K, and the second (organic) fiber assembly 1H) becomes harder to be folded, as the thickness t becomes thicker in the vacuum state (in the decompressed state). However, in the present embodiment, since there exist two slit portions (the first slit portion 57 and the second slit portion 58) at positions with the distance of the predetermined amount Xb, it is possible to easily fold (obtain a predetermined folding angle) the core material 5 by folding with two steps at the two slit portions (the first slit portion 57 and the second slit portion 58) even if the thickness becomes thick.

In the present embodiment, a lapping area Xb is decided according to the thickness of the core material 5. That is, when the thickness of the core material 5 is small, the predetermined amount Xb can be small; on the contrary, when the thickness of the core material 5 is large, the core material 5 becomes hard to be folded, and thus the predetermined amount Xb is made appropriately large correspondingly. Here, when the predetermined amount Xb is too small, the overlapping length (the lapping area) becomes too short to obtain the frictional force. Thus, the first (organic) fiber assembly 1K and the second (organic) fiber assembly 1H may be separated at the lapped part (between the main body parts), which prevents obtaining the core material 5 with the predetermined width. In the present embodiment, the lapping area Xb is made at least 7 mm (preferably at least 10 mm). When the lapping area is 5 mm, since the lapping area is too short to obtain necessary frictional force. The respective organic fiber assemblies (the first (organic) fiber assemblies 1Ka to 1Kd of the first (organic) fiber assembly 1K, or the second (organic) fiber assemblies 1Ha to 1Hd of the second (organic) fiber assembly 1H) are separated at the slit portions, and thus the core material 5 having the predetermined width cannot be obtained. Here, when the lapping area Xb is at least 10 mm, even if the ear part is used for the lapping part, the frictional force can be stably obtained, and moreover, it is found that the reduction of the heat conductivity can be suppressed to small.

Further, the larger the lapping area Xb becomes, the larger the necessary frictional force can be obtained, which is preferable for the core material 5 since the reliability is improved. However, when the lapping area Xb is too large with respect to the thickness of the vacuum heat insulating material 7, the distance between the two slit portions at the time of folding becomes large, and the folding becomes harder. When the vacuum heat insulating material 7 is folded, it is preferable that the lapping area Xb should be no more than around three times of the thickness of the vacuum heat insulating material 7 (for example, when the thickness t of the vacuum heat insulating material is 10 mm, it is preferable the lapping area Xb should be no more than around 30 mm).

Figure 15:
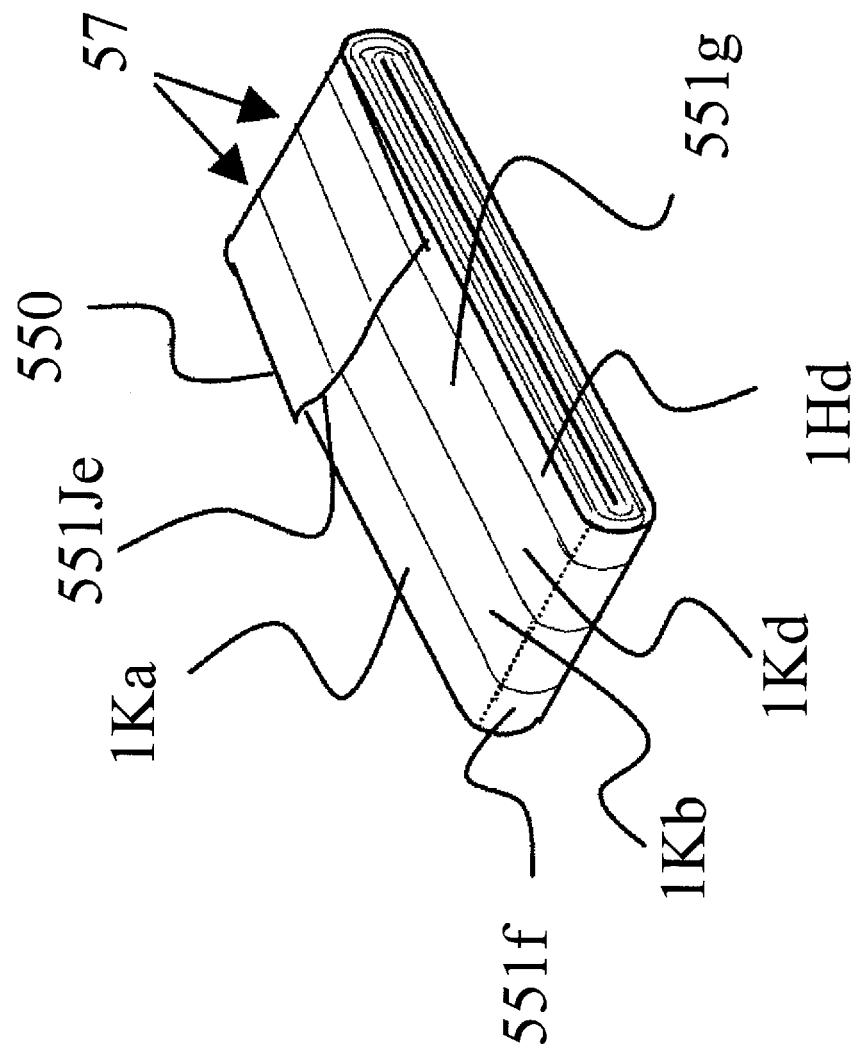
FIG. 15 shows the first embodiment and is a perspective view of a core material 550 when the core material 550 is produced by using and winding up three combined original fabric rolls on the reel.

FIG. 15 shows the first embodiment and is a perspective view of a core material 550 when the core material 550 is produced by winding up on the reel the combined original fabric roll made by combining three original fabric rolls. In FIG. 15, in the core material 550, in the same manner to the core material 5 shown in FIG. 11 to FIG. 14, the first (organic) fiber assembly 1K (the first (organic) fiber assemblies 1Ka, 1Kb, and 1Kd) (the upper side organic fiber assembly) from the first original fabric roll 1305 (the upper side roll) and the second (organic) fiber assembly 1H (the second (organic) fiber assemblies 1Ha, 1Hb, and 1Hd) (the lower side organic fiber assembly) from the second original fabric roll 1306 (the lower side roll) are laminated by winding up on the reel 1311 continuously from the inside toward the outside while being displaced by the predetermined amount Xb. Then, the lamination is clamped at two positions by the two clamp members 1320, and folded at the clamped parts, thereby producing the flat core material 550. Here, in FIG. 15, signs other than the ones shown in the figure are omitted. A vacuum heat insulating material 702 (not shown) is manufactured by using the core material 550.

The core material 550 is constituted by two folding parts 551*f* (folding end portions) folded (bended) by the clamp members 1320 and a flat part 551*g* (a smooth part) provided between the two folding parts 551*f*. Further, the neighboring part of the respective first (organic) fiber assemblies 1Ka, 1Kb, and 1Kd of the first (organic) fiber assembly 1K (the upper side organic fiber assembly) is the first slit portion 57 (the upper side slit portion) shown in FIG. 14, and the neighboring part of the respective second (organic) fiber assemblies 1Ha, 1Hb, and 1Hd of the second (organic) fiber assembly 1H (the lower side organic fiber assembly) is the second slit portion 58 (the lower side slit portion). The distance (the length) between the first slit portion 57 and the second slit portion 58 in the width direction corresponds to the displaced amount Xb. Therefore, the folding processing can be easily implemented using the first slit portion 57 and the second slit portion 58.

Here, in FIG. 15, the end-winding end portion 551Je is arranged above the flat part 551*g*; however, it is preferable to arrange in the neighborhood of the folding part 551*f*. It is not preferable to arrange the flat part 551*g* at the end-winding end portion 551Je, because a difference in level may occur on the flat part 551*g* when the flat part 551*g* is arranged at the end-winding end portion 551Je. Further, since the end-winding end portion 551Je is separated from the position of the clamp member 1320, when the core material 551 is formed in a flat plate shape using the clamp members 1320, the length between the position of the clamp member 1320 and the end-winding end portion 551Je becomes long. Since the part between the position of the clamp member 1320 and the end-winding end portion 551Je of the first (organic) fiber assembly 1K and the second (organic) fiber assembly 1H is not clamped, the part may be dispersed and bended from the core material 550. Thus, it is preferable to cut the end-winding end portion 551Je so as to be close to the folding part 551*f* where the lamination can be clamped by the clamp member 1320. It is preferable to cut after (preferably, just after) the lamination is clamped by the clamp member 1320, and also preferable to cut within a range so that no difference in level may occur at the flat part 551*g* around the folding part 551*f*. The above operation decreases possibility to get dispersed and to bend, and moreover, there hardly occurs a difference in level at the flat part 551*g*, and thus such a difference in level may not be caught, and the appearance may be improved.

Figure 16:
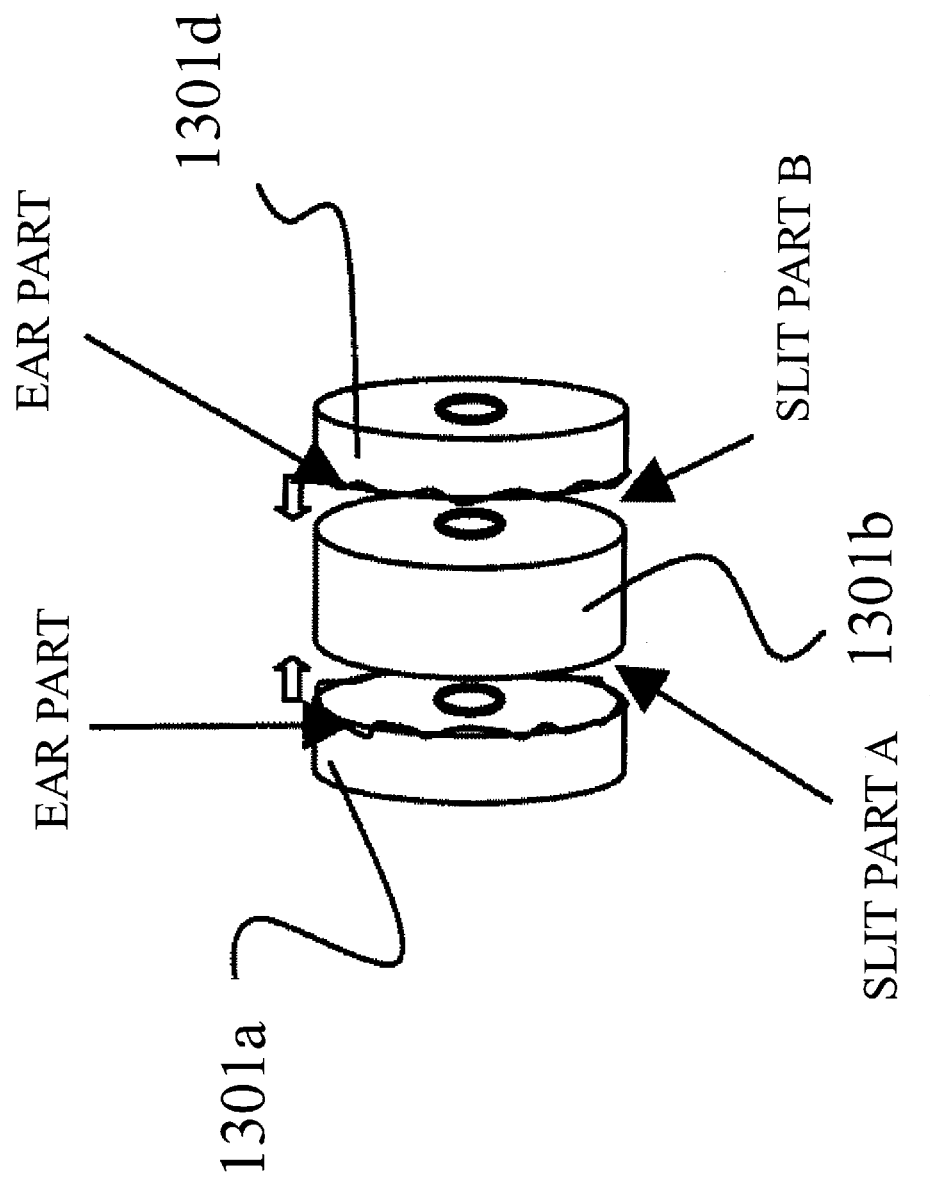
FIG. 16 shows the first embodiment and is a diagram explaining a structure of another combined original fabric roll.

FIG. 16 shows the first embodiment and is a diagram explaining a structure of another combined original fabric roll. Here, as shown in FIG. 16, when three original fabric rolls (the main body part A 1301*a*, the main body part B 1301*b*, and the main body part D 1301*d*) are used for the first original fabric roll 1305 and the second original fabric roll 1306 which are the combined original fabric roll constituted by the plurality of original fabric rolls, an ear part original fabric roll of which one side is an ear part can be used for the original fabric rolls of the both sides in the width direction (the main body part A 11301*a* or the main body part D 1301*d*1). At this time, the ear part of the ear part original fabric roll can be arranged so as to face the side of the main body part B 11301*b* which is the main body part original fabric roll without having the ear part arranged at the center.

In FIG. 16, the first original fabric roll 1305 (the upper side roll) which is the combined original fabric roll is constituted by the main body part A 1301*a*, the main body part B 1301*b*, and the main body part D 1301*d*, and they are arranged in order so as to be next to each other from the main body part A 1301*a*, the main body part B 1301*b*, and the main body part D 1301*d* in the width direction. That is, the main body part B 1301*b* which is the main body part of the original fabric roll without having the ear part is arranged at the central position in the width direction, and the main body part A 1301*a* and the main body part D 1301*d* which are the ear part original fabric rolls having the ear parts are arranged at the both sides of the main body part B 1301*b*, and the ear part side of the ear part original fabric roll is arranged so as to be next to the side of the main body part B 1301*b* without having the ear part which is arranged at the central position. Although not shown in the figure, the second original fabric roll 1306 (the lower side roll) which is the combined original fabric roll has the same structure as the first original fabric roll 1305 (the upper side roll). That is, the main body part F 1301*f* which is the main body part of the original fabric roll without having the ear part is arranged at the central position in the width direction, the main body part E 1301*e* and the main body part H 1301*h* which are the ear part original fabric rolls having the ear parts are arranged at the both sides of the main body part F 1301*f*, and the ear part side of the ear part original fabric roll is arranged so as to be next to the side of the main body part F 1301*f* without having the ear part arranged at the central position. Although not shown in the figure, the lamination formed by the original fabric roll of FIG. 16 can be also used as the core material 550, and the vacuum heat insulating material 702 is manufactured using the core material 550.

As discussed above, the ear part of the ear part organic fiber assembly wound on the ear part original fabric roll is arranged so as not to be at both sides in the width direction of the first original fabric roll 1305 or the second original fabric roll 1306, which are the combined rolls. When the core material 550 is formed by winding up on the reel 1311, both sides in the width direction are not the ear parts but the cutoff faces, and thus it becomes unnecessary to cut off the both sides in the width direction of the core material 550, thereby obtaining the vacuum heat insulating material 702 with a low cost. At this time, when the main body part of the original fabric roll without having the ear part (the main body part B 1301*b*) is arranged at the central position in the width direction, and the ear part original fabric rolls having the ear parts (the main body part A 1301*a* and the main body part D 1301*d*) are arranged at both sides of the original fabric roll without having the ear part (the main body part B 1301*b*), out of the ear parts of the ear part original fabric rolls (the main body part A 1301*a* and the main body part D 1301*d*), either ear part can be arranged so as to be next to the side of the main body part of the original fabric roll (the main body part B 1301*b*) at the central position. The ear part original fabric roll can be arranged so that the ear part is placed at only one side of the combined original fabric roll. At this time, compared with a case in which the ear part original fabric rolls are arranged at the both sides of the combined original fabric roll, the cutting should be done at only one side in the width direction, thereby obtaining the vacuum heat insulating material 702 with a low cost. As a matter of course, even if it is the ear part original fabric roll having the ear part (the main body part A 1301*a* or the main body part D 1301*d*), the ear part includes the necessary thickness of fiber and the thickness is not so uneven, the end face position (the ridge line) is not so ragged; that is, if the level of unevenness is not too bad to cause a problem in the heat insulating performance or the manufacturing process of the core material 550 or the vacuum heat insulating material 702, it is not necessary to cut the end face in the width direction even when the ear part original fabric roll is used for the end side of the combined original fabric roll in the width direction.

Therefore, in the present embodiment, in manufacturing the core material 550, there is no need to laminate the sheets one by one, and the manufacturing can be done by simple equipment which only winds up the fiber assembly IJ. It is possible to easily use the ear part fiber assembly having the ear part (for example, the fiber assembly wound on the main body part A 1301a or the main body part D 1301da which is the ear part original fabric roll) with the ragged ridge line (not cutoff face) in the width direction, which has been conventionally disposed of for at least one of the plurality of fiber assemblies (for example, the first (organic) fiber assemblies 1Ka to 1Kd and the second (organic) fiber assemblies 1Ha to 1Hd) which constitute the first (organic) fiber assembly 1K (for example, the first (organic) fiber assemblies 1Ka to 1Kd) which are the combined fiber assembly IJ or the second (organic) fiber assembly 1H (for example, the second (organic) fiber assemblies 1Ha to 1Hd). Accordingly, without cutting the ear part fiber assembly (the fiber assembly wound on the ear part original fabric roll) having the ear part, which conventionally has been disposed of the ear part original fabric roll can be used as it is, thereby generating no waste. Therefore, it is possible to obtain the core material 550 and the vacuum heat insulating material 702 with a low cost.

Figure 17:
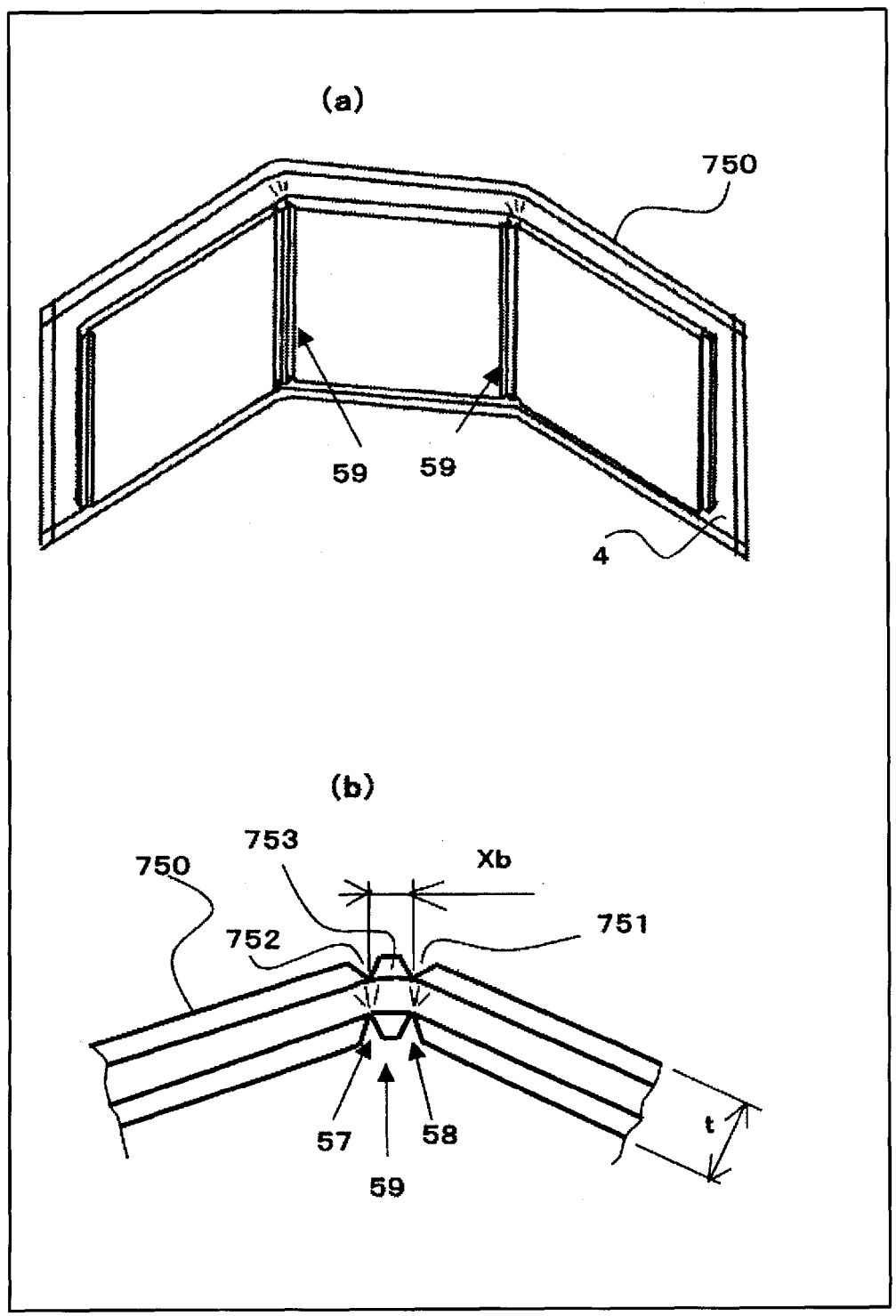
FIG. 17 shows the first embodiment and is a perspective view showing a state in which a vacuum heat insulating material 750 is folded.

FIG. 17 shows the first embodiment and is a perspective view showing a state where the vacuum heat insulating material 750 is folded. In FIG. 17, (a) of FIG. 17 is a perspective view of the vacuum heat insulating material 750 in the folded state. (b) of FIG. 17 is an enlarged view of the main part of the folding part of the vacuum heat insulating material 750. In the vacuum heat insulating material 750, the core material 550 is inserted into the outer cover material 4 having the gas barrier property, and the inside is decompressed and sealed in that state. The vacuum heat insulating material 750 is folded with two steps at the first slit portion 57 and the second slit portion 58 of the core material 550 to form folding parts 59. At this time, the folding is done so that the width of the folding part 59 should be the width of the lapping area Xb. The width of the lapping area Xb corresponds to and is substantially the same length as the distance (the length) between the first slit portion 57 and the second slit portion 58.

Further, the vacuum heat insulating material 750 is made by overlapping and laminating two sheets of the organic fiber assembly 1 and the continuous sheet-shaped fiber assembly 1J while being displaced by the lapping area Xb in the width direction. Because of the displacement by the lapping area Xb, when the first slit portion 57 and the second slit portion 58 are inserted and decompressed in the outer cover material 4, the outer cover material 4 is concaved at the first slit portion 57 and the second slit portion 58 respectively to form concave parts 751 and 752. Further, a substantially trapezoidal projected part 753 is formed to be projected between the two concave parts 751 and 752 which are two parts concaved at the first slit portion 57 and the second slit portion 58. The folding part 59 includes the concave parts 751 and 752 concaved at two parts of the first slit portion 57 and the second slit portion 58, and the substantially trapezoidal projected part 753 formed to be projected between two concave parts 751 and 752. The folding can be easily done using the concave parts 751 and 752 as a base point and by using the slopes of the substantially trapezoidal projected part 753. Further, since the concave parts 751 and 752 at the parts of the first slit portion 57 and the second slit portion 58 and the trapezoidal projected part 753 formed between the concave parts 751 and 752 are formed at both sides in the thickness direction of the vacuum heat insulating material 750, for example, even if the thickness of the vacuum heat insulating material 750 is thick, the folding can be easily done at parts of the first slit portion 57 and the second slit portion 58 formed at both faces of the sheet. Thus, the folding does not cause to break or damage the outer cover material 4 to decrease the heat insulating performance. It is possible to obtain the vacuum heat insulating material with a high reliability, which is able to suppress the degradation of the heat insulating performance, and with a high degree of freedom of arrangement, which is foldable regardless of the thickness.

For the vacuum heat insulating material 750, like the present embodiment, having the folding part 59 constituted by the plurality of concave parts 751 and 752 formed by the first slit portion 57 and the second slit portion 58 and the substantially trapezoidal projected part 753 formed at the first slit portion 57 and the second slit portion 58, the folding is confirmed in cases where the thickness t is 5 mm, 7 mm, 10 mm, and 30 mm, resulting in no problems in any of the cases. However, when the thickness t of the vacuum heat insulating material 7 is thick (for example, in case of t=30 mm), as shown in FIG. 12 or FIG. 13, when the number of laminating sheets of the organic fiber assembly 1 and the continuous sheet-shaped fiber assembly 1J (the first (organic) fiber assembly 1K and the second (organic) fiber assembly 1H) is two (in FIG. 12, two sheets of the first (organic) fiber assembly 1K and the second (organic) fiber assembly 1H), since there are two slit portions for one folding part 59, the concave parts 751 and 752 are also two parts, and the folding is not easy. Thus, it is preferable that the number of laminating sheets should be made at least three so as to make the number of slit portions for one folding part 59 at least three to form at least three concave parts by the slits. The number of laminating sheets can be appropriately selected according to the thickness t of the vacuum heat insulating material 750, material or features of the organic fiber assembly 1, material or the tension strength of the outer cover material 4, etc.

As discussed above, like the present embodiment, the core material 5 or 550 is made by laminating at a plurality of times a plurality of sheets (for example, two sheets) of the organic fiber assembly 1 and the continuous sheet-shaped fiber assembly 1J while being displaced in the width direction by the predetermined length (the lapping area Xb). The number of slits for one folding part becomes the number of laminating sheets of the organic fiber assembly 1 and the continuous sheet-shaped fiber assembly 1J (a plurality of slits, for example, in case of laminating three sheets while being displaced, three slits for one folding part). Even if the thickness of the vacuum heat insulating material 750 is thick, it is possible to easily fold to both sides of the sheet face using the folding part 59 constituted by the concave parts 751 and 752 formed by the slit portions (for example, the first slit portion 57 and the second slit portion 58) provided at the both sides of the sheet face.

Figure 18:
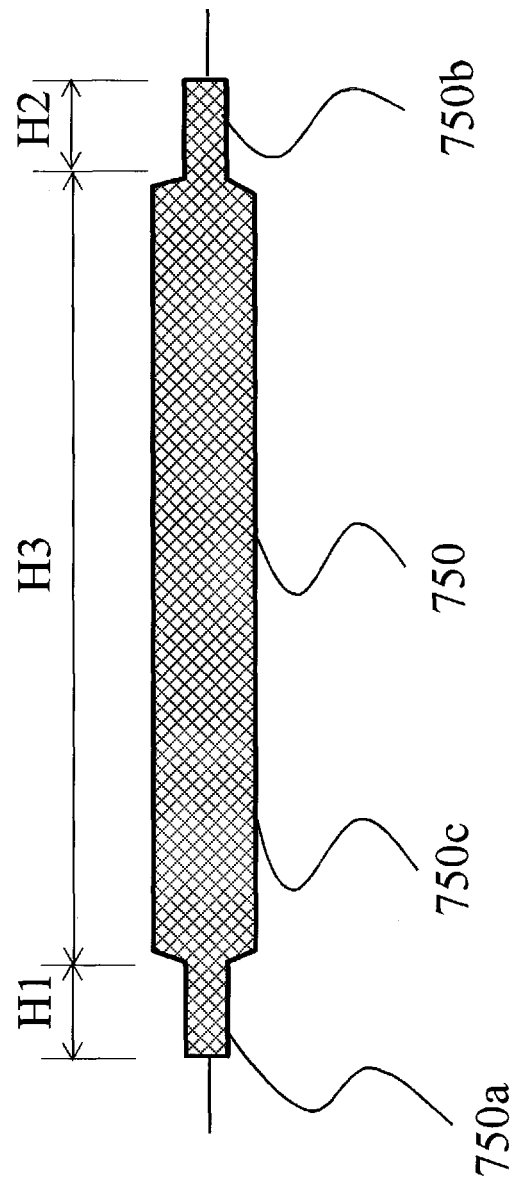
FIG. 18 shows the first embodiment and is a diagram of the vacuum heat insulating material 750 when viewed from a width direction.

Here, when the lapping area Xb is large, as shown in FIG. 18, a part with a thin thickness having substantially the same length with the lapping area Xb is generated at both end portions in the width direction of the vacuum heat insulating material 750. FIG. 18 shows the first embodiment and is a diagram of the vacuum heat insulating material 750 when viewed from the width direction. The vacuum heat insulating material 750 includes a predetermined thickness part 750c having the predetermined thickness t and thin parts 750a and 750b having a substantially half thickness of the predetermined thickness t and provided at both sides of the predetermined thickness part 750c in the width direction. In the thin parts 750a and 750b, since the thickness of the heat insulation is thinner than the predetermined thickness part 750c, the heat insulating performance is slightly degraded compared with the predetermined thickness part 750c. Therefore, when the lapping area Xb is large, widths H1 and H2 (substantially the same length with the length of the lapping area Xb) of the thin parts 750a and 750b become large, and thus the lapping area should not be too large. That is, when the vacuum heat insulating material 750 is folded and used, it is preferable the lapping area Xb should be at least 7 mm and no more than around 30 mm.

Further, when the vacuum heat insulating material 750 is used without folding, it is preferable the lapping area Xb should be at least 7 mm, preferably at least 10 mm, since the larger the lapping area Xb is, the larger the frictional force becomes and also the higher the reliability becomes. It is also preferable the lapping area Xb should be no more than around 30 mm, since the larger the lapping area Xb is, the larger the length of the thin parts 750a and 750b becomes and the larger a part where the heat insulating performance is slightly degraded becomes. Further, since the lapping area Xb is also influenced by the thickness t of the vacuum heat insulating material 750, it is preferable the lapping area Xb should be around at least once and also no more than five times (preferably no more than three times) of the predetermined thickness t of the vacuum heat insulating material 750. In the present embodiment, the predetermined amount Xb is made at least 7 mm to suppress dispersing of the core material 550, and the predetermined amount Xb is made no more than around three times of the thickness t of the core material 550 which is in a substantially vacuum state in the outer cover material 4. Thus, the foldability of the vacuum heat insulating material is good, and moreover, the width of the both end portions in the width direction of the core material 550 is made small so as to suppress the degradation of the heat insulating performance. Further, if the range of the lapping area Xb is set by the thickness of the core material 550 in the decompressed state, the reliability can be obtained (the core material 550 would not be detached or dispersed at the slit portion), and further, the core material 550 or the vacuum heat insulating material 750 with easy foldability and good heat insulating performance can be obtained.

In the present embodiment, the example is shown in which the folding is done by two steps at the two slit portions (the first slit portion 57 and the second slit portion 58). If a plurality of, instead of using two, combined original fabric rolls, each of which made by combining a plurality of original fabric rolls, are used and the winding on the reel is done by laminating the plurality of combined original fabric rolls while being displaced by the predetermined amount Xb, there exist a plurality of slit portions, and thus the folding can be done with multiple steps. The folding angle at one slit portion can be made small, and the core material 550 and the outer cover material 4 can be easily folded at the predetermined angle without being pressed by the unreasonable force. Further, since the folding can be done at one folding part 59 with multiple steps, the folding with an acute angle also can be done, so that the embodiment can be applied to the heat insulating material of all kinds of equipment. Therefore, it is possible to carry out the heat insulation of the piping of the condensation pipe, etc. of the equipment such as the refrigerator or the air-conditioner. Further, since the vacuum heat insulating material of the present embodiment is excellent in the folding workability, when the heat insulation is done by inserting the piping of the condensation pipe, etc. between the vacuum heat insulating material and the vacuum heat insulating material, it is possible to curve or deform the vacuum heat insulating material along the shape of piping, thereby suppressing the heat leakage from a gap between the vacuum heat insulating material and the piping, and further suppressing the degradation of the heat insulating performance.

That is, the vacuum heat insulating material 7, 702, or 750 of the present embodiment include: the first (organic) fiber assembly 1K made by arranging a plurality of sheets of the sheet-shaped organic fiber assembly 1 and the continuous sheet-shaped fiber assembly 1J which are continuous in the length direction so as to be next to each other in the width direction; the second (organic) fiber assembly 1H made by arranging a plurality of sheets of the sheet-shaped organic fiber assembly 1 and the continuous sheet-shaped fiber assembly 1J which are continuous in the length direction so as to be next to each other in the width direction, and provided so as to overlap in the up-and-down, back-and-forth, or the left-and-right direction with respect to the first (organic) fiber assembly 1K; and the core material 5 or 550 constituted by the laminated structure of the continuous sheet-shaped fiber assembly 1J formed in a flat plate shape by winding up the first (organic) fiber assembly 1K and the second (organic) fiber assembly 1H continuously from the inside toward the outside while being displaced by the predetermined amount Xb in the width direction; and the gas-barrier outer cover material 4 containing the core material 5 or 550 in an inside, and having a sealing part a periphery of which is sealed while the inside is decompressed, and the outer cover material 4 is hermetically sealed by sealing the sealing part while the inside of the outer cover material is substantially vacuum. It is possible to form the core material 5 or 550 having the large width by combining the plurality of the continuous sheet-shaped fiber assemblies 1J (the fiber assembly wound on the main part of the original fabric roll) having the small width. Further, the number of the plurality of the organic fiber assemblies 1 and the continuous sheet-shaped fiber assemblies 1J and the width of the plurality of the organic fiber assemblies 1 and the continuous sheet-shaped fiber assemblies 1J are appropriately selected, thereby setting freely the width of the core material 5 or 550 regardless of the width of the continuous sheet-shaped fiber assembly 1J. The degree of freedom of designing the core material 5 or 550 and the vacuum heat insulating material 7, 702, or 750 is increased. Further, in order to laminate a plurality of layers of the continuous sheet-shaped fiber assembly 1J, there is no need to purposely cut the assembly into the predetermined size and laminate the sheets one by one. Cutting equipment and laminating equipment, etc. are unnecessary, and thus the core material 5 or 550 can be easily produced with simple equipment for only winding up the continuous sheet-shaped fiber assembly 1J in a short time.

Further, the width of the organic fiber assembly 1 and the continuous sheet-shaped fiber assembly 1J (the width of the main body part of the original fabric roll) can be selected appropriately so as to arrange the slit portion (the neighboring part) at the part to be folded, and further the lapping area (predetermined amount Xb) of the first (organic) fiber assembly 1K and the second (organic) fiber assembly 1H can be also appropriately selected, and thus a specific processing for folding is unnecessary. Further, since the folding parts 59 are formed at both back and front faces with respect to the sheet face, the folding can be easily done in both back and front directions with respect to the sheet face using the first slit portion 57 and the second slit portion 58.

Further, since the folding can be done at the connecting part between the neighboring fiber assemblies 1J (the main body part A 1301a, the main body part B 1301b, the main body part C 1301c, and the main body part D 1301d) of the first (organic) fiber assembly 1K or the second (organic) fiber assembly 1H, there is no need to carry out a specific process for creating a concave part for folding, etc. The folding can be easily done using the concave parts 751 and 752 made by the first slit portion 57 and the second slit portion 58 which are formed in the process of producing the core material 550. Further, the concave parts 751 and 752 formed by the first slit portion 57 and the second slit portion 58 are created at both sides in the thickness direction of the vacuum heat insulating material 750 (the back and front faces of the sheet), so that, for example, even if the thickness of the core material 550 is thick, since the first slit portion 57 and the second slit portion 58 are created at the both sides of the sheet face, the folding can be easily done compared with the case of forming at only one side. Thus at the time of folding, the core material 550 or the outer cover material 4 is not broken or damaged, thereby suppressing the degradation of the heat insulating performance.

Further, if the predetermined amount (the lapping area) Xb is assumed to be at least 7 mm and no more than three times of the thickness t of the core material 5 which is in the substantially vacuum state inside the outer cover material 4, since the lapping area Xb is at least 7 mm, the dispersing of the core material 5 can be suppressed, and moreover, the degradation of the heat insulating performance caused by the dispersing can be also suppressed. Further, since the lapping area Xb is no more than three times of the thickness t of the core material 5 which is in the substantially vacuum state inside the outer cover material 4, an excellent foldability can be provided at the folding part 59. Therefore, it is possible to easily apply the present embodiment to the heat insulating material of the equipment having two wall faces connected with the predetermined angle such as the refrigerator, etc., and moreover, it is possible to suppress the degradation of the heat insulating performance.

Further, if the ear part fiber assembly which has the ragged ridge line (not cutoff face) at the end side in the width direction is used for at least one of the plurality of fiber assemblies 1J (for example, the first (organic) fiber assemblies 1Ka to 1Kd and the second (organic) fiber assemblies 1Ha to 1Hd) which constitute the first (organic) fiber assembly 1K or the second (organic) fiber assembly 1H, the ear part fiber assembly having the ear part (the fiber assembly wound on the ear part original fabric roll), which has been conventionally disposed of, can be used, thereby generating no waste of material. Therefore, the core material 5 or 550, or the vacuum heat insulating materials 7, 702, or 750 can be obtained with a low cost.

Further, in the refrigerator or the equipment to which the vacuum heat insulating material of the present embodiment is applied, the vacuum heat insulating material is folded with the predetermined angle (substantially 90 degrees, for example) at the connecting part (the slit portion) between the fiber assemblies which are located next to the first (organic) fiber assembly 1K or the second (organic) fiber assembly 1H, and is arranged at least two continuous wall faces of the heat insulating box having a top face, both side faces, a rear face, and a bottom face. It has been conventionally difficult to fold freely the vacuum heat insulating material with the necessary predetermined angle, and is also difficult to apply the heat insulating material to two continuous wall faces. However, the use of the vacuum heat insulating material of the present embodiment 750 facilitates the folding at the necessary position, and thus the vacuum heat insulating material can be applied to two continuous wall faces connected with the predetermined angle. Therefore, since the vacuum heat insulating material can be continuously arranged at a corner part having the predetermined angle between two continuous wall faces, it is possible to largely improve the coverage of the vacuum heat insulating material with respect to the outer surface area of a box body (an external box) except for doors of the equipment such as the refrigerator, etc. For example, in case of the refrigerator, the coverage can be at least 80% with respect to the outer surface area of the external box, which has been conventionally difficult to cover with the heat insulating material:

(Manufacturing Method 4 of Core Material)

In the above discussion, explanation has been carried out for: a case in which the core material 5 is made by cutting the sheet-shaped fiber assembly 1 into the predetermined size and laminating a plurality of sheets of the fiber assembly to manufacture the vacuum heat insulating material 7, or the core material 5 is made by laminating a plurality of layers of the sheet-shaped fiber assembly 1 and cutting the end face 5a into the predetermined size to manufacture the vacuum heat insulating material 7 (the first manufacturing method of the core material); the method in which the core material 5 is manufactured by continuously winding up the continuous sheet-shaped fiber assembly 1J (for example, the organic fiber assembly) to form a coiled shape (the second manufacturing method of the core material); and the method in which the core material 5 or 550 are manufactured by combining a plurality of combined original fabric rolls made by combining a plurality of original fabric rolls in the width direction to form one combined original fabric roll having a large width (for example, the combined original fabric roll 1305 or 1306) and overlapping at substantially right angles to the sheet face and winding up (the third manufacturing method of the core material).

In the above third manufacturing method of the core material, the manufacturing method of the core material 5 has been explained, in which at least one first original fabric roll (the upper side original fabric roll) 1305 which is one combined original fabric roll having the predetermined width by aligning a plurality of original fabric rolls in the width direction, and at least one second original fabric roll (the lower side original fabric roll) 1306 which is one combined original fabric roll having the predetermined width by aligning a plurality of original fabric rolls in the width direction are used, and the fiber assembly 1K of the first original fabric roll 1305 and the fiber assembly 1H of the second original fabric roll 1306 are overlapped at substantially right angles to the sheet face (in the radial direction of the reel 1311) and wound up on the reel 1311 to manufacture the core material 5; here, another case will be explained, in which instead of the second original fabric roll 1306 which is the combined original fabric roll, the third original fabric roll 1307 which is a single original fabric roll having the first predetermined width is used.

That is, a manufacturing method of a core material 560 will be explained with reference to FIG. 20 to FIG. 23. The fiber assembly 1 or 1J of the third original fabric roll 1307 having the first predetermined width is made by continuously winding up into a coiled shape the continuous sheet-shaped fiber assembly 1 or 1J (for example, the organic fiber assembly) composed of at least one original fabric roll having the predetermined width. The fiber assembly 1K of the first original fabric roll 1305 which is the combined original fabric roll is made by combining a plurality of continuous sheet-shaped fiber assemblies having the width smaller than the first predetermined width in the width direction so as to have substantially the first predetermined width. The core material 560 is manufactured by overlapping the fiber assembly 1 or 1J of the third original fabric roll 1307 and the fiber assembly 1K of the first original fabric roll 1305 at substantially right angles to the sheet face and winding up, so that the first original fabric roll 1305 should be located outside the third original fabric roll 1307 in the radial direction of the reel 1311.

Figure 20:
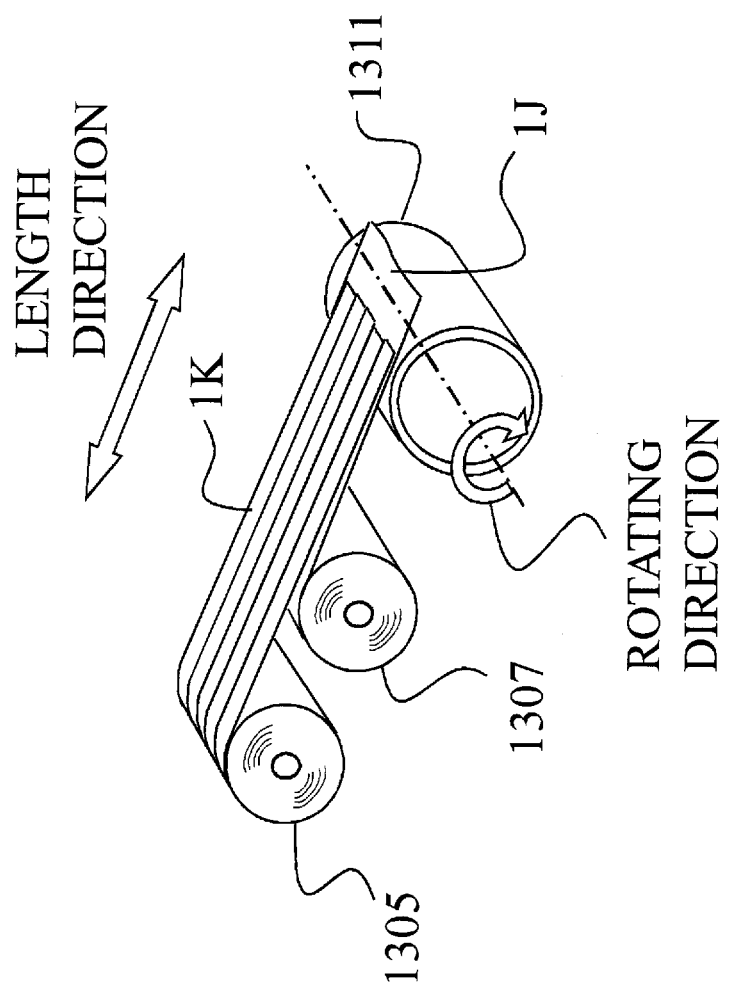
FIG. 20 shows the first embodiment and is a pattern diagram of the winding device when the winding device winds up on the reel 1311 at least one original fabric roll 1307 having the first predetermined width and at least one combined original fabric roll 1305 made by combining original fabric rolls having a width smaller than the first predetermined width so as to have substantially the same width as the first predetermined width, which is a diagram showing a manufacturing method of another core material of the present embodiment.
Figure 21:
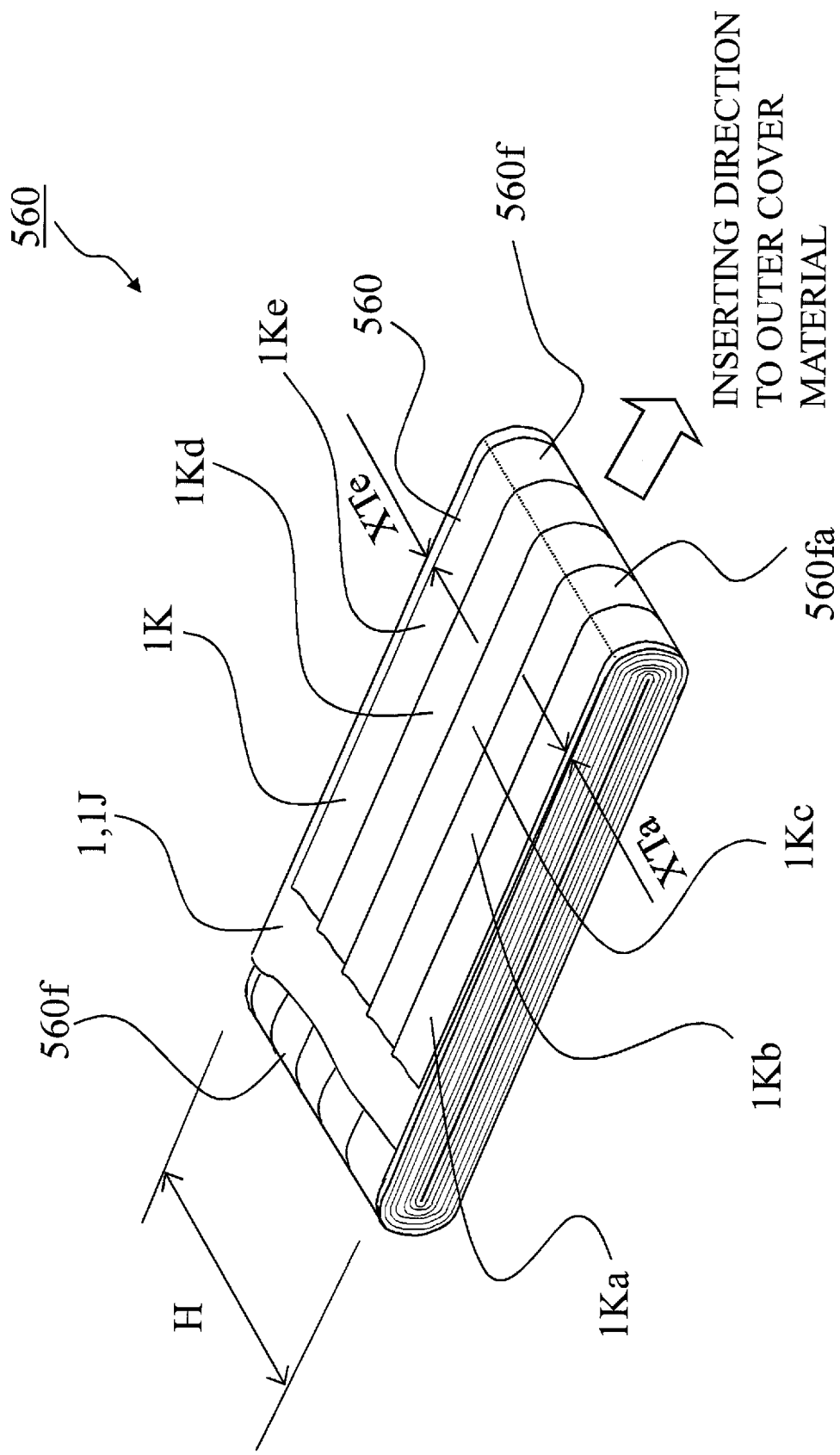
FIG. 21 shows the first embodiment and is a perspective view of the core material manufactured by using and winding up on a reel at least one original fabric roll 1307 having the predetermined width and at least one combined original fabric roll.
Figure 22:
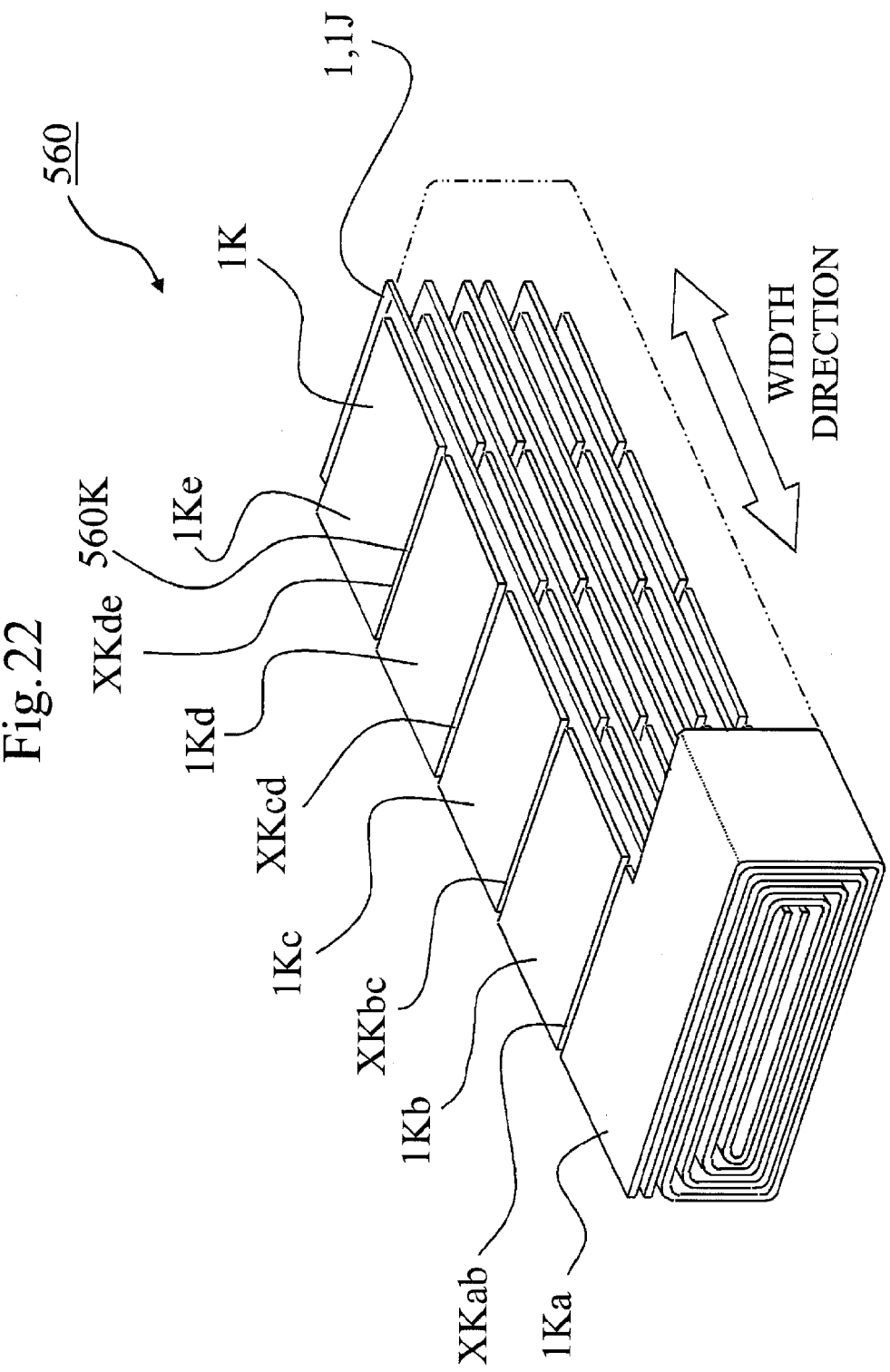
FIG. 22 shows the first embodiment and is a cross sectional view of the core material manufactured by using and winding up on the reel at least one original fabric roll having the predetermined width and at least one combined original fabric roll.
Figure 23:
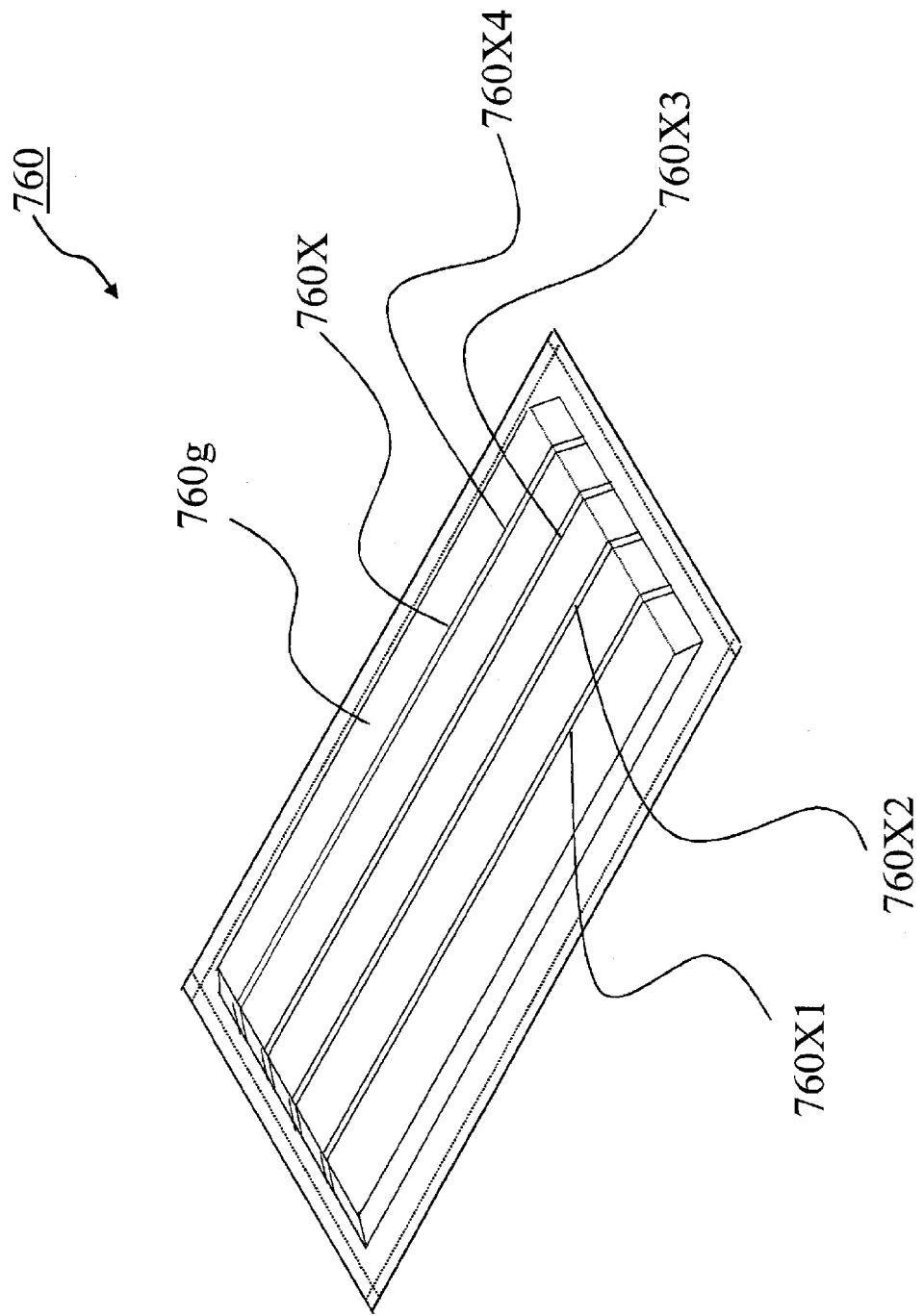
FIG. 23 shows the first embodiment and is a perspective view of the vacuum heat insulating material using the core material produced by using and winding up on the reel at least one original fabric roll having the predetermined width and at least one combined original fabric roll.

FIG. 20 is a pattern diagram of the winding device when the winding device winds up on the reel 1311 at least one original fabric roll 1307 having the first predetermined width and at least one combined original fabric roll 1305 made by combining original fabric rolls having a width less than the first predetermined width so as to have substantially the same width as the first predetermined width. FIG. 20 shows another manufacturing method of core material of the present embodiment. FIG. 21 is a perspective view of a core material manufactured by using and winding up on the reel at least one original fabric roll 1307 having a predetermined width and at least one combined original fabric roll. FIG. 22 is a cross sectional view of the core material manufactured by using and winding up on the reel at least one original fabric roll having the predetermined width and at least one combined original fabric roll. FIG. 23 is a perspective view of the vacuum heat insulating material using the core material manufactured by using and winding up on the reel at least one original fabric roll having the predetermined width and at least one combined original fabric roll.

The case of manufacturing the core material 560 will be explained. The third original fabric roll 1307 having the first predetermined width is made by continuously winding up into a coiled shape the sheet-shaped fiber assembly 1 or 1J (for example, the organic fiber assembly) which is continuous in the length direction and composed of a plurality of original fabric rolls including at least one original fabric roll having the first predetermined width. The first original fabric roll 1305 which is at least one combined original fabric roll (for example, a combination of only original fabric rolls having the second predetermined width smaller than the first predetermined width, a combination of the original fabric roll having the second predetermined width and an original fabric roll having the third predetermined width smaller than the second predetermined width, or a combination with the ear part original fabric roll, etc.) is made by combining a plurality of fiber assemblies which have the second predetermined width smaller than the first predetermined width and are continuous in the length direction so as to have substantially the same width as the first predetermined width. The third original fabric roll 1307 and the first original fabric roll 1305 are overlapped at substantially right angles to the sheet face of the fiber assemblies 1, 1J, and 1K and wound up so that the fiber assembly 1 or 1J of the third original fabric roll 1307 should be located inside in the radial direction of the reel 1311 to manufacture the core material 560.

In the figure, the first original fabric roll 1301 is similar to the first original fabric roll 1305 (or the second original fabric roll 1306) explained in FIG. 12, the same signs are assigned to the same parts and detailed explanation will be omitted. The first original fabric roll 1301 is formed to have substantially the same width as the first predetermined width by combining a plurality of substantially cylindrical (or coiled) original fabric rolls (for example, the main body part A 1301a, the main body part B 1301b, the main body part C 1301c, and the main body part D 1301d) being wound at substantially the same number of times (the same number of laminating sheets) to align with gaps (can be aligned so as to be next to each other so that the gaps should be minute gaps, can be aligned without gaps, or can be aligned via spacers so as to have the predetermined gaps) in the width direction.

The third original fabric roll 1307 is similar to the substantially cylindrical original fabric roll 1301 having the predetermined width explained in FIG. 6 to FIG. 9, on which the fiber assembly 1 or 1J which has the predetermined width and is continuous in the length direction is wound, and the same signs are assigned to the same parts and detailed explanation will be omitted. The third original fabric roll 1307 is formed to have the first predetermined width by continuously winding into a coiled shape the fiber assembly 1 or 1J which has the first predetermined width and is continuous in the length direction. Here, the fiber assembly 1 or 1J wound on the third original fabric roll 1307 is made to be continuous in the width direction and have the same size as the width H of the core material 560. Here, the third original fabric roll 1307 can be wound up the fiber assembly 1 or 1J having the first predetermined width, or can be made by after winding up the fiber assembly having the width larger than the first predetermined width substantially cylindrically, cutting the width direction of the fiber assembly so that the width size should be the first predetermined width.

Here, the plurality of substantially cylindrical (or coiled) original fabric rolls of the first original fabric roll 1305 (for example, the main body part A 1301a, the main body part B 1301b, the main body part C 1301c, and the main body part D 1301d) can have the same widths or different widths. Further, the original fabric roll can be the ear part original fabric roll as shown in FIG. 12.

The first original fabric roll 1305 has the same structure with the first original fabric roll 1301 as shown in FIG. 12. The first original fabric roll 1305 is the combined original fabric roll in which the plurality of original fabric rolls (for example, the plurality of main body parts) are aligned so as to be next to each other in the width direction. There exists a minute gap or a predetermined gap between the main bodies located next to each other (for example, between the main body part of A (1301a) and the main body part of B (1301b)), and the main bodies located next to each other are not continuous but intermittent, and thus there exists a slit portion (for example, the slit portion A between the main body part A 1301a and the main body part B 1301b, the slit portion B between the main body part B 1301b and the main body part C 1301c, the slit portion C between the main body part C 1301c and the main body part D 1301d, etc.). Further, in the third original fabric roll 1307, the ear part original fabric roll having the ear part with a ragged ridge line generated by cutting the original fabric roll material into the predetermined width can be used for the original fabric roll arranged at the end side in the width direction of the plurality of original fabric rolls (for example, the main body part A 1301a or the main body part D 1301d, etc.).

Therefore, at least one single original fabric roll (for example, the third original fabric roll 1307) having substantially the same width as the first predetermined width onto which the sheet-shaped fiber assembly having the first predetermined width and continuous in the length direction is wound is provided. At least one combined original fabric roll (for example, the first original fabric roll 1305) made by combining in the width direction a plurality of sheet-shaped fiber assemblies which have the width smaller than the first predetermined width and are continuous in the length direction aligned in the width direction so as to have substantially the same width as the first predetermined width is also provided. The fiber assembly 1 or 1J of the single original fabric roll 1307 having the first predetermined width and the fiber assembly 1K of the combined original fabric roll 1305 are overlapped at substantially right angles to the sheet face and wound up into a coiled shape continuously from the inside toward the outside so that the fiber assembly 1 or 1J of the single original fabric roll 1307 should be located inside in the radial direction of the reel 1311, and the core material 560 is formed.

Therefore, the core material 560 can be easily manufactured simply by overlapping at substantially right angles to the sheet face and winding up the continuous fiber assemblies 1, 1J, and 1K. Further, the ear part original fabric roll which has been conventionally disposed of can be used effectively, thereby obtaining the core material 560 and the vacuum heat insulating material 760 with a low cost without generating waste.

The third sheet-shaped fiber assembly (the fiber assembly 1 or 1J wound on the third original fabric roll 1307) having the first predetermined width and continuous in the length direction is provided. The first fiber assembly (the fiber assembly 1K of the first original fabric roll 1305 which is the combined original fabric roll) made by aligning a plurality of sheet-shaped fiber assemblies, which have the width smaller than the first predetermined width and are continuous in the length direction, with the predetermined gaps in the width direction so as to have substantially the same width as the first predetermined width is also provided.

The core material constituted by the laminated structure of the fiber assembly formed in a flat plate shape by overlapping at substantially right angles to the sheet face of the first fiber assembly 1K or the third fiber assembly 1 or 1J and winding into a coiled shape the first fiber assembly and the third fiber assembly continuously from the inside toward the outside is provided.

The gas-barrier outer cover material containing the core material in the inside, and having the sealing part the periphery of which is sealed while the inside is decompressed is provided.

The outer cover material is hermetically sealed by sealing the sealing part in a state in which the inside of the outer cover material is substantially vacuum, thereby manufacturing the vacuum heat insulating material. Since the leftover material of the ear part original fabric roll, etc. generated by cutting the original fabric roll into the predetermined width can be effectively used, it is possible to effectively use the leftover material of the ear part, etc. which has been conventionally disposed of.

Further, between respective original fabric rolls (for example, between the main body part of A and the main body part of B, between the main body part of B and the main body part of C, between the main body part of C and the main body part of D, etc.) of the first original fabric roll 1305 which is the combined original fabric roll, a spacer having a predetermined width, etc. is provided, so that the predetermined gap is set with the width of the spacer between respective fiber assemblies (for example, between the fiber assemblies 1Ka and 1Kb, between 1Kb and 1Kc, between 1Kc and 1Kd, etc.) of the fiber assembly 1K of the first original fabric roll 1305. That is, the vacuum heat insulating material 560 is also provided with a concave part having a substantially predetermined width, in which the piping can be embedded or at which the positioning can be done. Thus, the working time required for the heat insulation of the piping or the installation of the piping can be reduced, thereby obtaining the vacuum heat insulating material and the equipment with a high efficiency and a low cost.

Here, as shown in FIG. 20, when the first (organic) fiber assembly 1K (the first (organic) fiber assemblies 1Ka, 1Kb, 1Kc, and 1Kd) of the first original fabric roll 1305 which is the combined roll and the third fiber assembly 1 or 1J of the third original fabric roll 1307 are overlapped at substantially right angles to the sheet face and wound up on the reel 1311, it is preferable to arrange the first (organic) fiber assembly 1K (the first (organic) fiber assemblies 1Ka, 1Kb, 1Kc, and 1Kd) of the first original fabric roll 1305 at the outside of the fiber assembly 1 or 1J of the third original fabric roll 1307 in the radial direction with respect to the rotating shaft 1315 of the reel 1311.

As shown in (e) of FIG. 9, the third continuous sheet-shaped fiber assembly 1 or 1J and the continuous sheet-shaped first (organic) fiber assembly 1K (the first (organic) fiber assemblies 1Ka, 1Kb, 1Kc, and 1Kd) are overlapped and wound up on the reel 1311 by the predetermined tensional force into the substantially cylindrical shape (a coiled shape), and after the substantially cylindrical fiber assemblies 1, 1J, and 1K are clamped by the clamp member 1320, the reel 1311 is removed by releasing the tensional force. At this time, it is preferable that the winding should be done by overlapping the fiber assemblies at substantially right angles to the sheet face, so that the fourth fiber assembly having the first predetermined width and without having a break, etc. in the width direction should be arranged at the innermost circumferential side of the substantially cylindrical fiber assembly than the first fiber assembly having a break or a gap, etc. in the width direction made by combining a plurality of fiber assemblies in the width direction so as to be next to each other, and the third fiber assembly should be arranged at the inner side of the first fiber assembly in the radial direction of the reel 1311. Accordingly, when removing the substantially cylindrical fiber assembly from the reel 1311, the fiber assembly would not be dispersed to protrude into the innermost circumferential side or would not be caught by the reel.

That is, in case of overlapping and winding the first fiber assembly and the third fiber assembly, the first fiber assembly and the third fiber assembly are overlapped so that the third fiber assembly should be located at the inner side to the first fiber assembly, and wound up on the reel 1311 from the inside toward the outside. When the substantially cylindrical fiber assembly wound on the reel 1311 is removed from the reel 1311, the third fiber assembly 1 or 1J which has the first predetermined width and is continuous in the width direction is arranged at the innermost side of the substantially cylindrical fiber assembly. Since the fiber assembly arranged at the innermost side is continuous in the width direction, when compared with a case in which the first fiber assembly made by combining the plurality of fiber assemblies having the width smaller than the first predetermined width aligned in the width direction is arranged at the innermost side, the fiber assembly would not be dispersed, or the dispersed fiber assembly would not be caught by the reel 1311 when the fiber assembly is removed from the reel 1311. The removing the fiber assembly can be easily done, which facilitates manufacturing the core material 560, improves the workability, and enables to reduce the manufacturing time. Further, the quality of the core material 560, made by forming the substantially cylindrical fiber assemblies 1, 1J, and 1K removed from the reel 1311 in a flat plate shape, becomes stable.

Here, the width and the number of the plurality of original fabric rolls used for the first original fabric roll 1305 (four including the main body part A 1301a, the main body part B 1301b, the main body part C 1301c, and the main body part D 1301d) can be appropriately set so as to be substantially the same as the first predetermined width of the fiber assembly 1 or 1J of the third original fabric roll 1307 having the first predetermined width. In case of aligning a plurality of rolls in the width direction, it is preferable to set the width of the first original fabric roll 1305 (the total width by adding the plurality of original fabric rolls and the gaps between the original fabric rolls) to the width slightly smaller than the first predetermined width of the third original fabric roll 1305, and it is preferable to overlap at substantially right angles to the sheet face and wind up on the reel 1311 the fiber assembly 1K wound on the first original fabric roll 1305 and the fiber assembly 1 or 1J wound on the third original fabric roll 1307 so that the fiber assembly 1K of the first original fabric roll should be located at the outside of the fiber assembly 1 or 1J of the third original fabric roll. When winding up on the reel 1311, respective fiber assemblies would not be dispersed, which facilitates the winding.

Further, the first original fabric roll 1305 and the third original fabric roll 1307 are overlapped and wound up on the reel 1311, so that the fiber assembly 1K of the first original fabric roll 1305 should be located at the outside of the fiber assembly 1 or 1J of the third original fabric roll 1307 at substantially right angles to the sheet face. The manufacturing method of the vacuum heat insulating material 560 is the same with the one of FIG. 9. In FIG. 9, when instead of one original fabric roll 1301 wound up on the reel 1311, at least two original fabric rolls (for example, in case of overlapping the first original fabric roll 1305 and the second original fabric roll 1306 shown in FIG. 12 to FIG. 18, in case of overlapping the first original fabric roll 1305 and the third original fabric roll 1307 shown in FIG. 20 to FIG. 23, etc.), which are overlapped at substantially right angles to the sheet face, are combined, the winding method, the manufacturing method of the core material, and the manufacturing method of the vacuum heat insulating material, etc. are the same as the processes shown in FIG. 9.

As discussed above, at least one single original fabric roll in the width direction (for example, the third original fabric roll 1307) onto which the fiber assembly that has the first predetermined width and is continuous in the length direction is wound is provided. At least one combined original fabric roll (for example, the first original fabric roll 1305) formed by aligning in the width direction a plurality of original fabric rolls onto which the fiber assembly having the width smaller than the first predetermined width and continuous in the length direction is wound, and combining the plurality of original fabric rolls in the width direction so as to have substantially the same width as the first predetermined width is provided. The leftover material such as the ear part original fabric roll, etc. can be used for the first original fabric roll which is the combined original fabric roll, and thus it becomes unnecessary to dispose of the leftover material, etc. which has been conventionally disposed of thereby efficiently manufacturing the core material and the vacuum heat insulating material with a low cost.

Further, the plurality of sheets of the fiber assembly 1 or 1J of the single original fabric roll 1307 and the fiber assembly 1K of the combined original fabric roll 1305 are overlapped at substantially right angles to the sheet face and wound up on the substantially cylindrical reel 1311 with the predetermined tensional force from the inside toward the outside, and then after being clamped by the clamp member 1320, the substantially cylindrical fiber assembly is removed from the reel 1311 by releasing the tensional force, thereby manufacturing the core material 560; thus the core material can be easily manufactured with simple equipment.

FIG. 21 shows a perspective view of the core material 560 manufactured as discussed above. In FIG. 21, the first (organic) fiber assembly 1K (for example, the first (organic) fiber assemblies 1Ka, 1Kb, 1Kc, 1Kd, and 1Ke) of the first original fabric roll 1305 (the upper side roll) and the third fiber assembly 1 or 1J (the lower side fiber assembly) of the third original fabric roller 1307 (the lower side roll) are wound on the reel 1311 continuously from the inside toward the outside and laminated, while five original fabric rolls are aligned with a predetermined gap XK in the width direction. In the core material 560, since the first fiber assembly which is the combined fiber assembly is lapped over the single third fiber assembly at substantially right angles to the sheet face of the fiber assembly 1 or 1J and wound, on the outer surface of the core material 560, the plurality of first (organic) fiber assemblies 1Ka, 1Kb, 1Kc, 1Kd, and 1Ke which constitute the first fiber assembly which is the combined fiber assembly are arranged so as to align in the width direction with a gap (can be a minute gap or a predetermined gap).

Here, the width of the third fiber assembly can be the substantially same as the width of the first (organic) fiber assembly 1K. As shown in FIG. 21, the width of the third fiber assembly can be made larger than the width of the first (organic) fiber assembly 1K, and the first (organic) fiber assembly 1K can be arranged so as to obtain a predetermined gap corresponding to the length XT (for example, XTa or XTe) at the outside in the width direction of the first (organic) fiber assembly 1K. With this arrangement, at least one end side in the width direction of the third fiber assembly, there is no first (organic) fiber assembly 1K in the part of the length XT, and thus there is only third fiber assembly in the part of the length XT.

Therefore, when the first (organic) fiber assembly 1K and the third fiber assembly are overlapped and wound from the inside toward the outside to form in a flat plate shape, the core material 560 having no first (organic) fiber assembly 1K in the part of the length XT at least one end side in the width direction is manufactured. Accordingly, the core material made by overlapping and winding up the first (organic) fiber assembly 1K and the third fiber assembly from the inside toward the outside so as to form in a flat plate shape is inserted to the outer cover material 4, the outer cover material 4 is sealed in the decompressed state, and the vacuum heat insulating material 760 is manufactured. Similarly to the vacuum heat insulating material 750 shown in FIG. 19, the vacuum heat insulating material 760 has thin parts H1 and H2 at the end sides in the width direction. At this time, the length of the thin part H1 is substantially the same as XTa, the length of the thin part H2 is substantially the same as XTe, and the width H3 of the center part is substantially the same as the width of the first fiber assembly 1K. The thin part can be provided at both sides in the width direction of the vacuum heat insulating material 760; the thin part may be provided at least one side in the width direction.

That is, the width of the third fiber assembly becomes larger than the width of the first (organic) fiber assembly 1K with at least the amount of the length XT (for example, in FIG. 43, a length XTa between one width direction end portion out of two width direction end portions of the third fiber assembly and the end portion at one width direction end portion side of the third fiber assembly of the first (organic) fiber assembly 1Ka which is the width direction end side fiber assembly, or a length XTe between the other width direction end portion of the third fiber assembly and the end portion at the other width direction end side of the third fiber assembly of the first (organic) fiber assembly 1Ke which is the width direction end side fiber assembly) between the first (organic) fiber assemblies 1Ka and 1Ke of the width direction end side which are arranged at both end sides in the width direction out of the plurality of first (organic) fiber assemblies 1Ka, 1Kb, 1Kc, 1Kd, and 1Ke aligned with the predetermined gap XK so as to be next to each other in the width direction in the first (organic) fiber assembly 1K and the end portion in the width direction of the third fiber assembly. In the same manner as the vacuum heat insulating material 750, the thin part H1 (or H2) can be obtained at least one end side in the width direction of the vacuum heat insulating material 760.

That is, in the vacuum heat insulating material 750 or 760, the core material 550 or 560 has the predetermined thickness t when the core material 550 or 560 is decompressed and sealed in the outer cover material 4, and the cross sectional shape of the width direction end portion of the core material 550 or 560 is a thin stepped shape (the thin part H1 or H2) projected toward the outside in the width direction.

As has been discussed, since the vacuum heat insulating material 750 or 760 are provided, without performing a specific processing, etc., at one end side or both sides of the core material 550 or 560 in the width direction, with the thin part (in FIG. 19, H1 and H2) having the thickness thinner than the thickness of the vacuum heat insulating material 750 or 760 (the thickness t of the core material 5, 550, or 560). When, in case of folding one vacuum heat insulating material 750 or 760 cylindrically, etc., the end faces (the thin part (H1 or H2)) in the width direction are overlapped in the thickness direction and used continuously, or when end faces (the thin parts) in the width direction of the plurality of at least two, vacuum heat insulating materials 750 or 760 are overlapped in the thickness direction and used continuously, if the end faces in the width direction of the plurality of vacuum heat insulating materials 750 or 760 are overlapped so that surfaces in the thickness direction of the thin parts should be contacted with each other, the plurality of vacuum heat insulating materials 750 or 760 can be made to contact each other at the part where the core material 550 or 560 exists. Moreover, since the thin parts having the thin thickness (around a half of the thickness if one sheet is displaced in the two-sheet lamination) are overlapped, the jointing thickness of the contacting part can be made small, and further, the heat leakage from the contacting part can be reduced, thereby obtaining the vacuum heat insulating material 750 or 760 with high performance and the equipment which mounts the vacuum heat insulating material 750 or 760 such as the compressor, the refrigerator, the water heater, etc.

Further, a cross sectional shape of a cross section at substantially right angles to the width direction of the end faces in the length direction of the plurality of vacuum heat insulating materials 7, 700, 701, 750, or 760 is a substantially triangular shape of which a thickness becomes smaller toward the outside in the length direction. If slope face parts of the substantially triangular shape (a slope face part having the length L2 in FIG. 11) are connected so as to contact with each other, it is possible to make the plurality of vacuum heat insulating materials contact at the part where the core material 550 or 560 exists. Further, the jointing thickness of the contacting part can be made small, and moreover, the heat leakage from the contacting part can be reduced, thereby obtaining the vacuum heat insulating materials 7, 700, 701, 750, or 760 with a high performance and the equipment which mounts the vacuum heat insulating material 7, 700, 701, 750, or 760 such as the refrigerator, etc.

Here, as for the shape of the end portion in the length direction, the organic fiber assembly 1 or the continuous sheet-shaped fiber assembly 1J is not necessarily continuous in the length direction, but it is sufficient that the organic fiber assembly 1 or the continuous sheet-shaped fiber assembly 1J should have a substantially triangular cross sectional shape when the fiber assembly is laminated. That is, in the vacuum heat insulating material 7, 700, 701, 750, or 760 having the predetermined length L, the predetermined width H, and the predetermined thickness t, in which the core material 5, 550, or 560 are decompressed and hermetically sealed inside the outer cover material 4, it is sufficient that the core material 5, 550, or 560 should be constituted by a laminated structure of the organic fiber assembly 1 or the continuous sheet-shaped fiber assembly 1J, and the cross section of at least one end portion in the length direction or in the width direction should be a substantially triangular shape of which the thickness becomes smaller toward the outside. Further, when the core material 5, 550, or 560 is a laminated structure being wound up the sheet-shaped organic fiber assembly 1 or the continuous sheet-shaped fiber assembly 1J which has the predetermined width H and is continuous in the length direction continuously from the inside toward the outside, and the core material 5, 550, or 560 is hermetically sealed in the outer cover material 4, if the end portion in the length direction of the core material 5, 550, or 560 has a substantially triangular shape, the same effect can be obtained.

Further, also in the thin part shape in the width direction (a shape of thin projection), the organic fiber assembly 1 or the continuous sheet-shaped fiber assembly 1J is not necessarily continuous in the length direction, or a plurality of layers of fiber assembly having the length L can be laminated. That is, in the vacuum heat insulating material 7, 700, 701, 750, or 760 having the predetermined length L, the predetermined width H, and the predetermined thickness t, in which the core material 5, 550, or 560 is decompressed and hermetically sealed in the outer cover material 4, at either of the end portions in the length direction and in the width direction, it is sufficient that the thin parts 750*a* and 750*b* having thin thickness should be provided, and the thin parts 750*a* and 750*b* should be projected toward the outside. Further, if the core material 5, 550, or 560 is a laminated structure made by overlapping and laminating the plurality of sheet-shaped organic fiber assemblies 1 or the continuous sheet-shaped fiber assembly 1J having the predetermined width H, and the thin part 750*a* is made by laminating the plurality of layers of the plurality of organic fiber assembly 1 or the continuous sheet-shaped fiber assembly 1J while at least one of the plurality of organic fiber assemblies 1 and the continuous sheet-shaped fiber assembly 1J is displaced by a predetermined amount in the width direction, the same effect can be obtained.

As discussed, the vacuum heat insulating material 750 or 760 of the present embodiment is the flat plate shape having the predetermined thickness, the cross sectional shape of the end portion in one direction (for example, in the length direction) of the flat plate shape is a substantially triangular shape, of which the thickness becomes smaller toward the outside, or the cross sectional shape of the end portion in another direction (for example, in the width direction) is a stepped shape having the thin part of which the thickness is thin. The vacuum heat insulating material 750 or 760 can be easily manufactured by a simple method of overlapping and winding up the core material 550 or 560, and the leftover material can be effectively used.

Further, since the shape of end portion can be made a connectable shape without performing a specific processing, etc. in the length direction or the width direction, if the end portions are contacted and connected, the jointing thickness of the contacting part can be reduced, and moreover, the heat leakage from the contacting part can be reduced, thereby obtaining the vacuum heat insulating material 750 or 760 with a high performance or the equipment which mounts the vacuum heat insulating material 750 or 760 such as the compressor, the refrigerator, the water heater, etc.

Here, in the same manner as the core material 5 or the core material 550 shown in FIG. 9, since the two clamp members 1320 are moved in the opposite directions (alienating directions) while the core material 560 is clamped at two positions by the two clamp members 1320, the fiber assembly is bended (folded) by a folding end portion 560f at the clamped part, and the core material 560 is formed in a flat plate shape. The core material 560 folded at the folding end portion 560f which is the end portion in the length direction of the core material 560 is, similarly to the core material 5 shown in FIG. 9, inserted into the opening part 4a of the outer cover material 4 from an upstream side 560fa in the winding direction of the fiber assemblies 1, 1J, and 1K, and the sealing is done while the inside is decompressed, thereby completing the vacuum heat insulating material 760.

FIG. 22 shows a cross sectional shape in the width direction of the core material 560 which is folded into a flat plate shape. The core material 560 is made by overlapping at substantially right angles to the sheet face and winding up continuously from the inside toward the outside the fiber assembly 1 or 1J, which is single and continuous in the width direction and also continuous in the length direction, and the first (organic) fiber assemblies 1K, which are plural in the width direction, that is, divided into a plurality in the width direction and continuous in the length direction, and is folded into a flat plate shape. Then, the fiber assembly 1 or 1J which is single and continuous in the width direction and the first (organic) fiber assembly 1K made by aligning the plurality of fiber assemblies in the width direction are overlapped so that the fiber assembly 1 or 1J should be located at the inner side of the first (organic) fiber assembly 1K and wound into a coiled shape from the inside. Thus, the winding is done so as to arrange the first (organic) fiber assembly 1K (the first (organic) fiber assemblies 1Ka, 1Kb, 1Kc, 1Kd, and 1Ke) at the outer surface of the core material 560. At this time, a gap between the respective first (organic) fiber assemblies 1Ka, 1Kb, 1Kc, 1Kd, and 1Ke of the first (organic) fiber assembly 1K is set to a predetermined gap XK, and a slit portion 560K (the third slit portion) is formed. The predetermined gaps XK are respectively predetermined gaps XKab, XKbc, XKcd, and XKde, and the respective predetermined gaps XKab, XKbc, XKcd, and XKde can be the same or different.

FIG. 23 shows the hermetically sealed vacuum heat insulating material 760, in which the core material 560 is inserted into the inside of the outer cover material 4, the inside is decompressed, and the opening part 4a of the outer cover material 4 is sealed in that state. The vacuum heat insulating material 760 is provided with, in the width direction, a plurality of concave parts 760x being continuous in the length direction and having substantially the same width as the predetermined gap XK provided at the core material 560 (which is a groove part, for example, the first concave part 760x1, the second concave part 760x2, the third concave part 760x3, and the fourth concave part 760x4) in the width direction. Here, the widths of the first concave part 760x1, the second concave part 760x2, the third concave part 760x3, and the fourth concave part 760x4 can be the same or different, which can be appropriately set according to the size of the piping, etc.

Here, the predetermined gap XK is continuous in the winding direction (the length direction) of the core material 560. When the vacuum heat insulating material 760 is manufactured using the core material 560, a concave part 560X (a groove part) which has substantially the same width as the predetermined gap XK, is continuous in the length direction, and has the depth being around ¼ of the thickness of the vacuum heat insulating material 760 is formed at both sides of the flat face of the flat-plate-shaped vacuum heat insulating material 760 (the depth becomes around a half (around ½) of the thickness of the vacuum heat insulating material 760 when the depths of the concave at the both sides are added). At least a part of the piping (for example, a condensation pipe, a suction pipe, a discharge pipe, etc.) or the lead wire, etc. is arranged in the concave part, thereby easily carrying out the heat insulation of the piping and the storage of the lead wire without using a separate member. Further, as for the positioning of the piping and the lead wire, etc., the positioning can be done simultaneously only by arranging the piping and the lead wire, etc. in the concave part 760x. A separate member for the positioning is unnecessary, and the workability can be also largely improved. Further, it is unnecessary to separately provide a concave part for folding using laser processing, etc., and the folding can be easily done with the concave part 760x.

As explained above, the vacuum heat insulating material manufacturing apparatus according to the present invention includes: the reel 1311 for winding up the organic fiber assembly 1 having the predetermined width wound on the substantially cylindrical original fabric roll 1301 which is cut into the predetermined width and the continuous sheet-shaped fiber assembly 1J at a predetermined number of times R; cutting means for cutting the organic fiber assembly 1 and the continuous sheet-shaped fiber assembly 1J wound up on the reel 1311; a forming member (for example, the clamp member 1320) for removing from the reel 1311 the organic fiber assembly 1 and the continuous sheet-shaped fiber assembly 1J wound up on the reel 1311 at the predetermined number of times R and cut, and then forming the organic fiber assembly 1 and the continuous sheet-shaped fiber assembly 1J into the flat core material 5, 550, or 560. It is possible to easily manufacture the core material 5, 550, or 560 by a simple structure, and also to reduce the manufacturing time. Further, since the winding is done continuously in the winding direction, there is no need to cut the end face in the length direction, and further it is unnecessary to cut the core material 5, 550, or 560, since the original fabric roll is used, in which the width direction has been previously cut. Further, the manufacturing facility to cut the end face of the core material 5, 550, or 560 is unnecessary, and also the time to cut is unnecessary, and thus the manufacturing facility can be provided with a low cost, thereby obtaining the core material 5, 550, or 560, and the vacuum heat insulating material 7, 702, 750, or 760 with a low cost. Further, the plurality of main body parts of (fiber assembly) of the original fabric roll having the small width are combined, thereby manufacturing the core material 550 or 560 having the large width. Further, the widths of the number of the plurality of original fabric rolls or the plurality of original fabric rolls are appropriately selected, so that the width of the core material 550 or 560 can be freely set regardless of the width of the original fabric roll, and thus a degree of freedom of designing the core material 5, 550, or 560 increases. Further, since the core material 550 or 560 having the large width can be manufactured from the original fabric rolls having the small width, the storage space of the original fabric roll can be small; there is no need to have a large storage space. Further, it is not necessary to purposely cut the respective sheets for laminating the plurality of fiber assemblies into the predetermined size, or to laminate the sheets one by one. Further, compared with a case in which the core material is formed by folding continuous belt-like sheet-shaped member alternatively in different directions and laminating with folding lines, an expensive apparatus, etc. for folding with folding lines is unnecessary. Therefore, as for the manufacturing the core material 5, 550, or 560, the laminating equipment, etc. is unnecessary, and thus it is possible to easily manufacture the core material 5, 550, or 560 in a short time with simple equipment for only winding up the continuous sheet-shaped fiber assembly 1J.

Further, in the manufacturing apparatus of the vacuum heat insulating material 7, 702, 750, or 760 of the present invention, the reel 1311 includes the plurality of divided circumferential members 1312, and at least one (for example, movable circumferential members 1312a and 1312b) of the plurality of circumferential members 1312 is made movable in the direction of the center of rotation (the rotating shaft 1315). After winding up the organic fiber assembly 1 and the continuous sheet-shaped fiber assembly 1J on the reel 1311, the movable circumferential members 1312a and 1312b are moved in the direction of the center of rotation, and the tensional force of the organic fiber assembly 1 and the continuous sheet-shaped fiber assembly 1J is released. Then, the organic fiber assembly 1 and the continuous sheet-shaped fiber assembly 1J are removed from the reel 1311. It is possible to easily remove the continuous sheet-shaped fiber assembly 1J wound substantially cylindrically from the reel 1311 after releasing the tensional force of the continuous sheet-shaped fiber assembly 1J which is wound on the reel 1311, for example, substantially cylindrically with the predetermined tensional force. That is, the tensional force of the continuous sheet-shaped fiber assembly 1J which is wound on the reel 1311 with the predetermined tensional force is released, and thereby the continuous sheet-shaped fiber assembly 1J which is wound on the reel 1311 can be easily removed from the reel 1311.

Further, in the manufacturing apparatus of the vacuum heat insulating material 7, 702, 750, or 760 of the present invention, when the organic fiber assembly 1 and the continuous sheet-shaped fiber assembly 1J are removed from the reel 1311, the fiber assembly is removed after clamped by the clamp member 1320. Thus, the organic fiber assembly 1 and the continuous sheet-shaped fiber assembly 1J can be removed from the reel 1311 with a simple structure. Further, while the continuous sheet-shaped fiber assembly 1J is clamped at two positions using the two clamp members 1320 (the clamp members 1320c and 1320d), the two clamp members 1320c and 1320d are made movable or moved in the opposite sides of the substantially straight line direction (with substantially 180 degrees in the opposite directions). At this time, the continuous sheet-shaped fiber assembly 1J being wound up at a plurality of times and laminating a plurality of layers is pulled in the opposite directions by the two clamp members 1320c and 1320d and formed in a flat plate shape with being folded at the clamped parts. Accordingly, the flat core material 5, 550, or 560 can be easily formed with simple equipment by continuously winding up the continuous sheet-shaped fiber assembly 1J from the inside toward the outside for laminating a plurality of layers.

Further, the manufacturing method of the vacuum heat insulating material 7, 702, 750, or 760 of the present invention includes: a winding step for winding up on the reel 1311 the continuous sheet-shaped fiber assembly 1J having the predetermined width wound on the substantially cylindrical original fabric roll 1301 cut into the predetermined width at a predetermined number of times R; a cutting step for cutting the continuous sheet-shaped fiber assembly 1J wound up on the reel 1311; a removing step for removing the continuous sheet-shaped fiber assembly 1J, which is wound up on the reel 1311 at the predetermined number of times R and cut, from the reel 1311; a forming step for forming the continuous sheet-shaped fiber assembly 1J removed from the reel 1311 at the removing step into the flat core material 5, 550, or 560; and an outer cover material sealing step for containing the core material 5, 550, or 560 in an inside of the outer cover material 4 having gas-barrier property, decompressing the inside, and sealing in that state, thereby manufacturing the core material 5, 550, or 560 with a simple method in a short time. Further, since the winding is carried out continuously in the winding direction, it becomes unnecessary to cut the end face in the length direction, and since the original fabric roll of which the width direction has been previously cut is used, it also becomes unnecessary to cut the width direction, and thus there is no need to cut the core material 5, 550, or 560. Therefore, the manufacturing facility to cut the end face of the core material 5, 550, or 560 is also unnecessary, and the time to cut is unnecessary, and thus the core material 5, 550, or 560 and the vacuum heat insulating material 7, 702, 750, or 760 can be obtained with a low cost.

Further, according to the manufacturing method of the vacuum heat insulating material 7, 702, 750, or 760 of the present invention, the removing step includes: a clamping step for clamping by the clamp member the continuous sheet-shaped fiber assembly 1J which is wound up on the reel 1311 at the predetermined number of times R and cut; a fiber assembly tensional force releasing step for releasing the tensional force, with respect to the reel 1311, of the continuous sheet-shaped fiber assembly 1J clamped by the clamping step; and a reel removing step for removing from the reel 1311 the continuous sheet-shaped fiber assembly 1J of which the tensional force is released at the tensional force releasing step, thereby removing the continuous sheet-shaped fiber assembly 1J from the reel 1311 with a simple method.

Further, according to the manufacturing method of the vacuum heat insulating material 7, 702, 750, or 760 of the present invention, at the forming step, the continuous sheet-shaped fiber assembly 1J is clamped at two positions using two clamp members 1320 (the clamp members 1320c and 1320d), and the core material is formed in a flat plate shape by moving the two clamp members (the clamp members 1320c and 1320d) in the substantially opposite directions, thereby manufacturing the sheet-shaped core material 550 with a simple method only using the clamp member 1320.

Further, since the continuous sheet-shaped fiber assembly 1J is formed by the continuous organic fiber into a sheet-shape, compared with the case where the glass fiber which is inorganic fiber is used, harmful effect to the human body due to the powder dust can be suppressed, and the core material 550, and the vacuum heat insulating material 7, 702, 750, or 760 can be obtained with a good recyclability.

In the present embodiment, the manufacturing apparatus and the manufacturing method can use a continuous organic fiber 2 for the fiber and can manufacture the core material 5, 550, or 560 or the vacuum heat insulating material 7, 702, 750, or 760, etc. by using the organic fiber assembly 1 and the continuous sheet-shaped fiber assembly 1J, winding up on the reel continuously from the inside toward the outside. In the manufacturing apparatus of and the manufacturing method of the present embodiment, the fiber to be used is not always a continuous long fiber. However, it is sufficient that the fiber assembly is continuous sheet-shaped, and that the continuous sheet-shaped fiber assembly 1J may not be broken, etc. when wound up on the reel 1311 with the predetermined tensional force. Therefore, the fiber assembly is not necessarily the organic fiber assembly 1, or the continuous sheet-shaped fiber assembly 1J, but can be inorganic fiber assembly. In the manufacturing apparatus and the manufacturing method of the present embodiment, the same effect can be achieved if it is the continuous sheet-shaped fiber assembly. Here, the continuous sheet-shaped fiber assembly can be used as it is; it is more preferable that the continuous sheet-shaped fiber assembly is in the state of the original fabric roll wound on the original fabric roller, since the manufacturing is easy, and moreover, the usability can be further improved.

Here, when the organic fiber assembly 1 and the continuous sheet-shaped fiber assembly 1J are overlapped and wound up to manufacture the core material 550, it is also possible to manufacture the core material by winding up without being overlapped with the predetermined amount Xb. If the number of sheets of the organic fiber assembly 1 and the continuous sheet-shaped fiber assembly 1J to be overlapped is increased, it is possible to change the number of kinds of the fiber assemblies correspondingly to the number of sheets to be overlapped. That is, since it is possible to use fiber assembly of which the fabric weight is different or mix fiber assemblies in which fibers having different kinds to be used for the fiber assembly (for example, fibers having different temperature characteristics, fibers having different fiber diameters, fibers having good tension strength, fibers having different heat conductivities, etc.) according to the environment of usage of the equipment, the core material and the vacuum heat insulating material suitable to the type of usage can be obtained. Therefore, it is possible to acquire both the heat insulating performance and high temperature proof strength, both to acquire the heat insulating performance and to avoid harmful effect to human body, and to improve the recyclability. At this time, even if a plurality of sheets of the fiber assembly are used, it is not necessary to overlap the respective sheets while being displaced by the predetermined amount Xb, and the core material 5 can be formed by winding up the fiber assemblies having the same width without being displaced. Further, the core material 5 can be also formed by winding up the fiber assemblies having different widths.

Here, when the vacuum heat insulating material used for the heat insulation for the hot-water tank storing hot water of the water heater or the hot temperature parts (for example, at least 70 degrees Celsius) of the equipment having parts of high temperature such as a compressor, etc. is required, fibers having the high temperature proof strength (the heat-resistant property) should be used for at least one sheet of fiber (fibers using one of or combining LCP or PPS which is the organic fiber, or the glass fiber which is the inorganic fiber, etc.). At this time, fiber assembly using the fiber having the high temperature proof strength (the heat-resistant property) is arranged so as to be located at the surface side when the core material is formed to manufacture the vacuum heat insulating material. In the above discussed manner, as the vacuum heat insulating material, the fiber assembly using the fiber having the high temperature proof strength (the heat-resistant property) is arranged at the surface side, so that the heat insulation of the equipment having the high temperature part is made possible by arranging the vacuum heat insulating material of which the fiber assembly using the fiber having the high temperature proof strength (the heat-resistant property) should be located at the high temperature part side of the equipment.

Further, in case of the vacuum heat insulating material used for the heat insulation of the equipment such as the refrigerator, etc. which is necessary to have the high heat insulating performance and the heat insulating box, etc., since the heat insulating performance is required, the fiber of which the solid heat conductivity is small and the improvement of the heat insulating performance can be expected (for example, polystyrene which is organic fiber, or the glass fiber which is the inorganic fiber, etc.) should be used for at least one sheet of fiber.

Further, in case of the vacuum heat insulating material used for the heat insulation of the equipment which requires the recyclability such as the refrigerator, the air-conditioner, or the water heater, etc., if the glass fiber which is the inorganic fiber is used, for example, in case of the refrigerator, since the refrigerator is demolished for each product in a recycle factory, and the glass fiber is mixed with urethane waste, etc. and supplied to thermal recycle; however, the recyclability of the glass fiber is not good such that it causes to degrade the combustion efficiency, to remain as residue, etc., and thus it is preferable to use organic fiber such as polyester, polystyrene, or LCP, etc.

Further, when considering environment problem or harmful effect to the human body, since the glass fiber is stiff and brittle, at the time of manufacturing or destructing the vacuum heat insulating material, powder dust may scatter to cause to stick to skin/mucous membrane of a worker, which may cause stimulus, and a problem exists in the usability and workability; and thus it is preferable to use organic fiber.

(Refrigerator)

Figure 19:
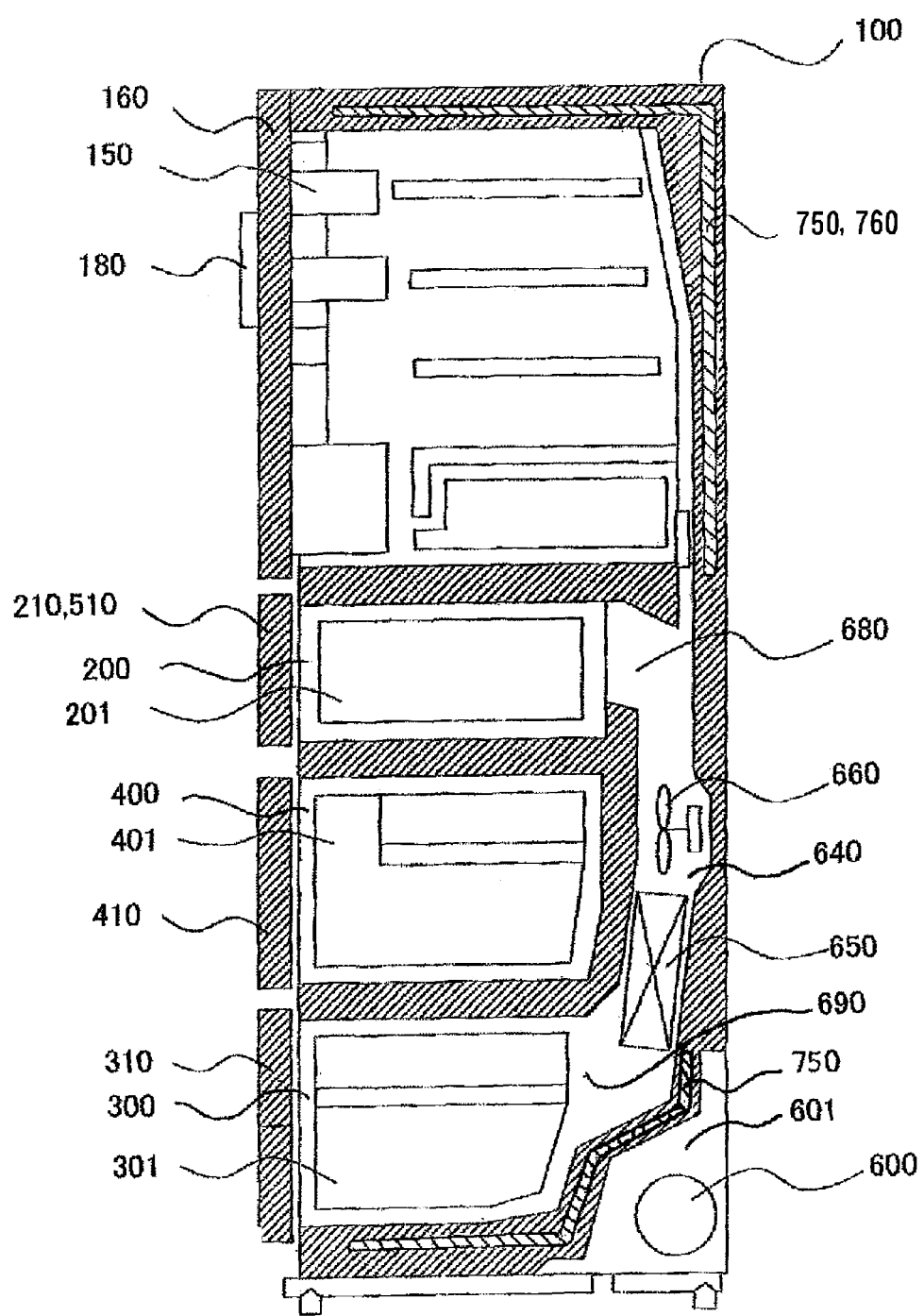
FIG. 19 shows the first embodiment and is a cross sectional view of a refrigerator 100.

FIG. 19 shows the first embodiment and is a cross sectional view of the refrigerator 100. In FIG. 19, a food storage room of the refrigerator 100 includes a refrigerating room 150 arranged at the topmost part and provided with a refrigerating room door 160 which is the opening/closing door, a switching room 200 which is able to switch the temperature band from the one for frozen storage (−18 degrees Celsius), for cool storage, for vegetables, for chilled storage, for softly freezing (−7 degrees Celsius), etc. arranged at lower to the refrigerating room 150 and provided with a switching room door 210 which is a drawer type door; an ice making room 500 arranged in parallel to the switching room 200 and provided with an ice making room door 510 which is a drawer type door; a freezing room 300 arranged at the lowermost part and provided with a freezing room door 310 which is a drawer type door; and a vegetable room 400 arranged between the freezing room 300 and the switching room 200 and the ice making room 500 and provided with a vegetable room door 410 which is a drawer type door, and so on. On the surface of the front face side of the refrigerating room door 160 of the refrigerator 100 is provided with an operation panel 180 constituted by an operation switch for adjusting temperature or setting of each room and a liquid crystal for displaying a temperature of each room at that time, and so on.

At a lower part of the rear face side of the refrigerator 100, a machine room 601 provided with a compressor 600 which forms a refrigerating cycle, and a cooler room 640, in which a cooler 650 and a fan 660 for blowing air cooled by the cooler 650 to the refrigerating room 150 or the switching room 200, and so on are arranged.

From the cooler room 640, a cooling air passage 680 for introducing the cooling air cooled by the cooler 650 to the refrigerating room 150 and an air passage 690 for introducing the cooling air cooled by the cooler 650 to the freezing room 300, and so on are provided.

Further, at the top part of the refrigerator 100, on the rear face of the heat insulating wall arranged at the rear face of the refrigerating room 150, a control board 900 (not shown) is contained in a control board containing room 910 (not shown). The control board 900 is provided with control lead wires and power source wires connected to the compressor 600 and a damper, etc. which opens/closes the cooling air passages for controlling temperatures of the storage rooms such as the refrigerating room 150 or the freezing room 300, etc. by opening/closing control of the compressor 600 and the cooling air passages.

Here, the switching room 200 is provided with a containing case 201, the freezing room 300 with a containing case 301, and the vegetable room 400 with a containing case 401, respectively, and it is possible to store food in these cases.

Here, a vacuum heat insulating material 750 or 760 is provided at the heat insulating wall between the machine room 601 located at the lower part of the refrigerator 100 and the cooler room 640. The vacuum heat insulating material 750 or 760 can be provided as a single unit or it also can be embedded or arranged in the foam insulation 11.

Namely, the refrigerator 100 of the present embodiment includes a plurality of storage rooms including the refrigerating room 150 provided with the opening/closing refrigerating room door 160, the switching room 200, the freezing room 300, the vegetable room 400, and the ice making room 500, respectively provided with the switching room door 210, the freezing room door 310, the vegetable room door 410, and the ice making room door 510 which are drawer type doors, and so on; the cooler 650 arranged at the rear face side of the storage rooms through the partition wall for generating cooling air to be blown to the storage rooms; the internal fan 660 for blowing the cooling air generated by the cooler 650 to each storage room; the cooler room 640 arranged at the rear face side of the storage rooms through the partition wall for containing the cooler and the internal fan; the machine room 601 arranged at the lower part or the upper part of the refrigerator for containing the compressor 600 which forms the refrigerating cycle; the first heat insulating wall arranged between the machine room 601 and the cooler room 640; the second heat insulating wall arranged between the machine room and storage rooms; and the vacuum heat insulating material 7, 702, 750, or 760 which is provided at either of the doors of the storage rooms, the first heat insulating wall, or the second heat insulating wall, and constituted by laminated structure of the organic fiber assembly 1 made by the sheet-shaped organic fiber 2, and formed by inserting the core material 5 or 550 having a cutting part, of which the end face has been cut, into the outer cover material 4, and sealing the sealing part of the outer cover material 4 around a periphery of the sheet so as to hermetically seal the inside in a substantially vacuum state.

The vacuum heat insulating material 750 provided at the heat insulating wall between the machine room 601 and the cooler room 640 has a W-shaped complex structure, in which the vacuum heat insulating material is folded at three positions by the folding part 59 formed by the first slit portion 57, the second slit portion 58, etc. as shown in FIG. 17. In the vacuum heat insulating material 750, the core material 5 or 500 made by laminating the organic fiber assembly 1 made of long fibers is inserted to the outer cover material 4 in the state of the sheet having the predetermined size, and the end face of which is cut (cutoff). After drying and vacuuming, the vacuum heat insulating material 750 is completed by sealing the inserted part of the outer cover material 4 with heat deposition, etc.

Further, the vacuum heat insulating material 750 is, as shown in FIG. 17, folded by the folding part 59 formed by the first slit portion 57, the second slit portion 58, etc. into an L shape and arranged so as to bridge the top face wall and the rear face wall of the refrigerator 100, and further, as has been discussed, folded into a W shape and arranged so as to bridge the rear face wall and the bottom face wall of the refrigerator 100. Further, as shown in FIG. 23, since the vacuum heat insulating material 760 is provided with the concave part 760X which is a groove part continuous in the length direction, and thus the vacuum heat insulating material 760 can be folded by the concave part 760X into the L shape or the W shape, similarly to the core material 750. As discussed above, if the vacuum heat insulating material 750 or 760 explained in the present embodiment is used by folding, etc., the vacuum heat insulating material 750 or 760 can be easily applied to the wall face having a complicated shape such as the machine room 601 containing the compressor 600 of the refrigerator.

Here, in the present embodiment, when a plurality of sheets (for example, two sheets) of the organic fiber assembly 1 and the continuous sheet-shaped fiber assembly 1J are overlapped while being displaced by the predetermined length (the lapping area Xb) in the width direction and laminated at a plurality of times to manufacture the core material 5 or 550, the number of slits for one folding part becomes the number of overlapped sheets (a plurality, in case of overlapping three sheets with displacement, three slits for one folding part) of the organic fiber assembly 1 and the continuous sheet-shaped fiber assembly 1J, so that even if the thickness of the vacuum heat insulating material 750 is thick, it is possible to easily fold to both sides of the sheet face at the folding part 59 (the first slit portion 57, the second slit portion 58). Further, trapezoidal parts are formed, of which parts of the first slit portion 57 and the second slit portion 58 are concaved, and moreover, are provided at both sides of the vacuum heat insulating material 750 in the thickness direction, for example, even if the thickness is thick, the vacuum heat insulating material 750 can be easily folded at the folding parts of the first slit portion 57 and the second slit portion 58 formed at both sides of the sheet, and thus the outer cover material 4 is not broken or damaged.

Therefore, the vacuum heat insulating material 750 of the present embodiment is folded at the connecting part (the slit portion) between the fiber assemblies which are located next to each other of the first (organic) fiber assembly 1K or the second (organic) fiber assembly 1H with a predetermined angle (around 90 degrees, for example), and the vacuum heat insulating material can be arranged at, for example, at least two continuous wall faces of the heat insulating box having the top face, the both side faces, the rear face, and the bottom face of the refrigerator 100. Specifically, in case of the refrigerator 100, when the vacuum heat insulating material is folded into an L shape by assuming the predetermined angle is around 90 degrees, the vacuum heat insulating material can be applied to two continuous wall faces such as (1) the side wall and the rear face wall, (2) the top face wall and the rear face wall, (3) the top face wall and the side wall, (4) the bottom face wall and the side wall, (5) the bottom face wall and the rear face wall, etc. Further, when the vacuum heat insulating material is folded into a U shape by folding at two positions, the vacuum heat insulating material can be applied to three continuous wall faces such as (1) the rear face wall and both side walls, (2) the top face wall and both side walls, (3) the bottom face wall and both side walls, (4) the top face wall, the rear face wall, and the bottom face wall, etc.

As explained above, the vacuum heat insulating material 760 can be used instead of the vacuum heat insulating material 750. If the vacuum heat insulating material 760 is used, similarly to the folding part 59 (the first slit portion 57 or the second slit portion 58) of the vacuum heat insulating material 750, the vacuum heat insulating material 760 can be easily folded at the concave part 760X, further, similarly to the first slit portion 57 or the second slit portion 58 of the vacuum heat insulating material 750, the piping (the condensation pipe or the suction pipe), etc. is arranged and contained in the concave part 760X, and thus the heat insulation of the piping can be easily carried out. Moreover, fixing or positioning of the piping on the outer surface of the vacuum heat insulating material, which has been conventionally difficult, can be easily carried out only by containing the piping in the concave part 760X without providing separately the containing part of the piping by the laser processing, etc. Further, the positioning is enabled without providing a separate fixing member. It can be easily done without any member, etc. Further, when the wiring (a controlling lead wire, etc.) is contained in the concave part 760X, the wiring can be stored without providing a separate containing part of the wiring, and further, the positioning is enabled without providing a separate fixing member. At this time, the width of the concave part 760X can be set according to the size of the piping or the wiring to be contained. That is, since the width of the concave part 760X is substantially the same as the predetermined gap XK (for example, the predetermined gaps XKab, XKbc, XKcd, and XKde) between the respective first (organic) fiber assemblies 1Ka, 1Kb, 1Kc, 1Kd, and 1Ke of the first (organic) fiber assembly 1K, the predetermined gap XK can be set appropriately.

Further, it is needless to say, the vacuum heat insulating material 750 or 760 of the present embodiment can be easily applied to, other than the refrigerator 100, the heat insulation around the cylindrical container such as the compressor or the hot-water tank or the heat insulation of the housing (container) of the outdoor unit of the air-conditioner or the heat source equipment of the water heater.

In the present embodiment, the application examples to the refrigerator 100 have been explained, and the application is possible to the equipment such as the cooling/air-conditioning apparatus other than the refrigerator 100. Further, in the present embodiment, the vacuum heat insulating material 750 with a complicated structure such as "L" shape with one folded position or "W" shape with three folded positions have been explained; however, the vacuum heat insulating material 750 can be also easily applied to "Z" shape with two folded positions, and further "U" shape with two folded positions or "C" shape or "J" shape with a plurality of curving positions. Therefore, the vacuum heat insulating material of the present embodiment can be applied to the part with a complicated shape (a part of "Z" shaped, "U" shaped, "C" shaped, "J" shaped, or "W" shaped, etc., or a part with a projection or a piping, etc.) to which it has been difficult to mount the vacuum heat insulating material since the bending work is difficult, and thus it is possible to mount the vacuum heat insulating material to all the equipment. The equipment such as the refrigerator, etc. which mounts the vacuum heat insulating material of the present embodiment is excellent in the recyclability, there is no harmful effect to the human body, and thus it is expected to improve the heat insulating performance.

Namely, the refrigerator 100 of the present embodiment includes a plurality of storage rooms (the refrigerating room 150, the switching room 200, the freezing room 300, the vegetable room 400, and the ice making room 500) including the refrigerating room 150 and the freezing room 300, etc. provided with the opening/closing or drawer type doors (the refrigerating room door 160, the switching room door 210, the freezing room door 310, the vegetable room door 410, and the ice making room door 510); the cooler 650 arranged at the rear face side of the storage rooms through the partition wall for generating cooling air to the storage rooms; the internal fan 660 for blowing the cooling air generated by the cooler 650 to each storage room; the cooler room 640 arranged at the rear face side of the storage rooms through the partition wall for containing the cooler and the internal fan; the machine room 601 arranged at the lower part or the upper part of the refrigerator main body for containing the compressor 600 which forms the refrigerating cycle; the heat insulating wall arranged between the machine room 601 and the cooler room 640; the vacuum heat insulating material 750 or 760 which is provided at either of the doors of the storage rooms and the heat insulating wall, constituted by laminated structure of the organic fiber assembly 1 made by the sheet-shaped organic fiber 2, and formed by inserting the core material 5 having a cutting part, of which the end face has been cut, into the outer cover material 4, and sealing the sealing part of the outer cover material around the periphery of the sheet so as to hermetically seal the inside in the substantially vacuum state. In the above, the long fiber having at least the same length as the organic fiber assembly 1 is used for the organic fiber 2. Therefore, the heat insulating performance of the heat insulating material 750 or 760 is good, the recyclability is excellent, the sealing fault, etc. may not occur, and thus the reliability is high. Accordingly, equipment such as the refrigerator 100, etc. using this vacuum heat insulating material 750 or 760 has also high performance for a long term and good recyclability.

Here, the example case shows the vacuum heat insulating material 750 or 760 is provided at the heat insulating wall between the machine room 601 and the cooler room 640; however, a vacuum heat insulating material opening part 71 can be applied to a cooling air passage. In this case, the vacuum heat insulating material 750 or 760 can be used for a section wall, a partition wall, or a heat insulating wall having a cooling air passage. Further, the vacuum heat insulating material can be provided at the heat insulating wall which forms the cooler room 640.

Reference Signs List

1: an organic fiber assembly; 1a: an end face; 1J: a continuous sheet-shaped fiber assembly; 1Je: an end-winding end portion; 1K: a first (organic) fiber assembly; 1Ka: a first (organic) fiber assembly; 1Kb: a first (organic) fiber assembly; 1Kc: a first (organic) fiber assembly; 1Kd: a first (organic) fiber assembly; 1H: a second (organic) fiber assembly; 1Ha: a second (organic) fiber assembly; 1Hb: a second (organic) fiber assembly; 1Hc: a second (organic) fiber assembly; 1Hd: a second (organic) fiber assembly; 2: an organic fiber; 2a: a remaining fiber; 2b: a cutoff fiber; 2x: an organic fiber; 2y: an organic fiber; 3: an air layer; 4: an outer cover material; 4a: an opening part; 5: a core material; 5a: an end face; 5f: a folding end portion; 5g: a flat part; 6: an adsorption agent; 7: a vacuum heat insulating material; 8: a spacer; 9: an external box; 10: an internal box; 11: a foam insulation; 12: a heat insulating wall; 41: an outer cover material opening part; 45: a sealing part; 51: a core material opening part; 52: a through hole; 53: a notch; 55: a folded part; 56: a folded part; 57: a first slit portion; 58: a second slit portion; 59: a folding part; 71: a vacuum heat insulating material opening part; 72: a through hole; 73: a notch; 75: a vacuum heat insulating material opening part sealing area; 100: a refrigerator; 110: an embossing; 150: a refrigerating room; 160: a refrigerating room door; 200: a switching room; 201: a containing case; 210: a switching room door; 300: a freezing room; 301: a containing case; 310: a freezing room door; 400: a vegetable room; 401: a containing case; 410: a vegetable room door; 500: an ice making room; 510: an ice making room door; 550: a core material; 551f: a folding part; 551g: a flat part; 551Je: an end-winding end portion; 600: a compressor; 601: a machine room; 640: a cooler room; 650: a cooler; 660: a fan; 680: a cooling air passage; 690: an air passage; 702: a vacuum heat insulating material; 750: a vacuum heat insulating material; 750a: a thin part; 750b: a thin part; 750c: a predetermined thickness part; 751: a concave part; 752: a concave part; 753: a projected part; 760: a vacuum heat insulating material; 760X: a concave part; 900: a control board; 910: a control board containing room; 1301: an original fabric roll; 1301a: a main body part A; 1301b: a main body part B; 1301c: a main body part C; 1301d: a main body part D; 1305: a first original fabric roll; 1306k: a second original fabric roll; 1311: a reel;

1312: a circumferential member; 1313: a clamp member setting part; 1315: a rotating shaft; 1316: a circumferential member retaining shaft; 1316a: a circumferential member retaining shaft; 1316b: a circumferential member retaining shaft; 1316c: a circumferential member retaining shaft, 1316d: a circumferential member retaining shaft; and 1320: a clamp member.

The invention claimed is:

1. A manufacturing apparatus of a core material of a vacuum heat insulating material comprising:
   a reel for winding up a fiber assembly which is wound on an original fabric roll; and
   a forming member for retaining the fiber assembly on the reel and for forming the wound fiber assembly into a flat-plate-shaped core material after removing from the reel the fiber assembly which has been wound up on the reel at a predetermined number of times,
   wherein the reel comprises:
      a plurality of divided circumferential members; and
      at least one retaining shaft configured to retreat and extend in a radial direction for moving at least one of the plurality of circumferential members radially,
      wherein after winding up the fiber assembly on the reel, the retaining shaft is retracted and the circumferential member is moved inwardly in the radial direction to release tensional force of the fiber assembly for removing the fiber assembly from the reel.

2. The manufacturing apparatus of the core material of the vacuum heat insulating material of claim 1, wherein the reel winds up a different fiber assembly wound on a different original fabric roll while overlapping the fiber assembly and the different fiber assembly.

3. The manufacturing apparatus of the core material of the vacuum heat insulating material of claim 1, further comprising:
   cutting means for cutting the fiber assembly which has been wound up on the reel from the original fabric roll.

4. A manufacturing apparatus of a core material of a vacuum heat insulating material comprising:
   a reel for winding up a fiber assembly which is wound on an original fabric roll; and
   a forming member for retaining the fiber assembly on the reel and for forming the wound fiber assembly into a flat-plate-shaped core material after removing from the reel the fiber assembly which has been wound up on the reel at a predetermined number of times,
   wherein the forming member comprises two clamp members arranged at opposite sides of the reel.

5. The manufacturing apparatus of the core material of the vacuum heat insulating material of claim 4, wherein the reel winds up a different fiber assembly wound on a different original fabric roll while overlapping the fiber assembly and the different fiber assembly.

6. The manufacturing apparatus of the core material of the vacuum heat insulating material of claim 4, further comprising:
   cutting means for cutting the fiber assembly which has been wound up on the reel from the original fabric roll.

* * * * *